United States Patent [19]

Huettner et al.

[11] 3,771,134

[45] Nov. 6, 1973

[54] COMMUNICATION CONTROL DEVICE UTILIZED AS AN INPUT/OUTPUT MODULE FOR A REMOTE TERMINAL SYSTEM

[75] Inventors: Robert E. Huettner, Acton; Edward B. Tymann, Natick; Richard Nolin, North Andover, all of Mass.

[73] Assignee: Honeywell Information Systems Inc., Waltham, Mass.

[22] Filed: Feb. 12, 1971

[21] Appl. No.: 114,852

[52] U.S. Cl. .................. 340/172.5

[51] Int. Cl. .................. G06f 3/04

[58] Field of Search .................. 340/172.5

[56] References Cited

UNITED STATES PATENTS

| | | | |
|---|---|---|---|
| 3,359,543 | 12/1967 | Corr et al. | 340/172.5 |
| 3,623,010 | 11/1971 | Burkhalter | 340/172.5 |
| 3,609,698 | 9/1971 | McCormick | 340/172.5 |
| 3,539,998 | 11/1970 | Belcher et al. | 340/172.5 |
| 3,374,464 | 3/1968 | Brothman et al. | 340/172.5 |
| 3,308,439 | 3/1967 | Tink et al. | 340/172.5 |
| 3,407,387 | 10/1968 | Looschen et al. | 340/172.5 |

OTHER PUBLICATIONS

7080 Data Processing System Reference Manual F22-6560-1, 1961; IBM Corp., Poughkeepsie, N.Y., pp. 5-7 and 13-18.

*Primary Examiner*—Harvey E. Springborn
*Attorney*—Ronald T. Reiling and Fred Jacob

[57] ABSTRACT

A modular input/output communication device permits a remote terminal to operate either on-line to a data processing system or off-line as a free standing unit. The remote terminal operates in at least selectable first and second data processing modes with a plurality of input/output devices connected to a common bus system.

21 Claims, 27 Drawing Figures

ROBERT E. HUETTNER
EDWARD B. TYMANN
RICHARD NOLIN

INVENTORS

BY Faith F. Driscoll

ATTORNEY

| PRESENT STATE: IDLE STATE | READY STATE | ON-LINE STATE | OFF-LINE STATE | AUDIT TRAIL STATE | NEXT STATE: IDLE STATE | READY STATE | ON-LINE STATE | OFF-LINE STATE | AUDIT TRAIL STATE | VARIABLES: IDLE STATE SWITCH | ON-LINE STATE SWITCH | AUDIT TRAIL STATE SWITCH | OFF-LINE STATE SWITCH | GDCA CHECK CONDITION | DEVICE DATA READY | EXECUTE PUSHBUTTON | NORMAL MEMORY RELEASE | CHECK RELEASE MEMORY | SELECTION OR POLLING ADDRESS | OFF-LINE CYCLE | BUS STROBE | BUS BUSY LINE | REMARKS |
|---|---|---|---|---|---|---|---|---|---|---|---|---|---|---|---|---|---|---|---|---|---|---|---|
| | | | | | | | | | | OUTPUT DEVICE CONTROL AREA | | | | | | | | | | | | | |
| 1 | 0 | 0 | 0 | 0 | 0 | 0 | 0 | 1 | 0 | | | | 1 | 0 | | 1 | | | | | 1 | | OPERATOR ACTION |
| 0 | 1 | 0 | 0 | 0 | 0 | 0 | 0 | 1 | 0 | | | | 1 | 0 | | | | | | 1 | 1 | | " " |
| 0 | 0 | 1 | 0 | 0 | 0 | 0 | 0 | 1 | 0 | | | | 1 | 0 | 1 | | 1 | | | | 1 | | " " |
| 0 | 0 | 1 | 0 | 0 | 0 | 0 | 0 | 1 | 0 | | | | 1 | 0 | 1 | | | | | | 1 | | " " |
| 0 | 0 | 0 | 0 | 1 | 0 | 0 | 0 | 1 | 0 | | | | 1 | 0 | 1 | | | | | | 1 | | " " |
| 0 | 1 | 0 | 0 | 0 | 0 | 0 | 1 | 0 | 0 | | 1 | | | 0 | | | | | 1 | | 1 | 0 | SELECTION ADDRESS |
| 0 | 0 | 0 | 0 | 1 | 0 | 0 | 1 | 0 | 0 | | | 1 | | 0 | | | | | 1 | | 1 | 0 | " " |
| 1 | 0 | 0 | 0 | 0 | 0 | 0 | 0 | 0 | 1 | | | 1 | | 0 | | 1 | | | | | 1 | | OPERATOR ACTION |
| 0 | 1 | 0 | 0 | 0 | 0 | 0 | 0 | 0 | 1 | | | 1 | | 0 | | | | | | 1 | 1 | | " " |
| 0 | 0 | 1 | 0 | 0 | 0 | 0 | 0 | 0 | 1 | | | 1 | | 0 | 1 | | 1 | | | | 1 | | " " |
| 0 | 0 | 1 | 0 | 0 | 0 | 0 | 0 | 0 | 1 | | | 1 | | 0 | 1 | | | | | | 1 | | " " |
| 0 | 0 | 0 | 1 | 0 | 0 | 0 | 0 | 0 | 1 | | | 1 | | 0 | 1 | | | | | | 1 | | " " |
| 1 | 0 | 0 | 0 | 0 | 0 | 1 | 0 | 0 | 0 | | 1 | | | 0 | | 1 | | | | | 1 | | OPERATOR ACTION |
| 0 | 0 | 1 | 0 | 0 | 0 | 1 | 0 | 0 | 0 | | 1 | | | 0 | 1 | | 1 | | | | 1 | | SCANNER RELEASE |
| 0 | 0 | 1 | 0 | 0 | 0 | 1 | 0 | 0 | 0 | | 1 | | | 0 | 1 | | | | | | 1 | | OPERATOR ACTION |
| 0 | 0 | 0 | 1 | 0 | 0 | 1 | 0 | 0 | 0 | | 1 | | | 0 | 1 | | | | | | 1 | | " " |
| 0 | 0 | 0 | 0 | 1 | 0 | 1 | 0 | 0 | 0 | | 1 | | | 0 | 1 | | | | | 1 | 1 | | " " |
| 0 | 1 | 0 | 0 | 0 | 1 | 0 | 0 | 0 | 0 | 1 | | | | | | | | | | 1 | 1 | | OPERATOR ACTION |
| 0 | 1 | 0 | 0 | 0 | 1 | 0 | 0 | 0 | 0 | | | | | 1 | | | | | | 1 | 1 | | GDCA LOGIC |
| 0 | 0 | 1 | 0 | 0 | 1 | 0 | 0 | 0 | 0 | | | | | 1 | | | 1 | | | | 1 | | SCANNER RELEASE |
| 0 | 0 | 1 | 0 | 0 | 1 | 0 | 0 | 0 | 0 | 1 | | | | | 1 | | 1 | | | | 1 | | OPERATOR ACTION |
| 0 | 0 | 1 | 0 | 0 | 1 | 0 | 0 | 0 | 0 | 1 | | | | | 1 | | | | | | 1 | | " " |
| 0 | 0 | 0 | 1 | 0 | 1 | 0 | 0 | 0 | 0 | 1 | | | | | 1 | | | | | | 1 | | " " |
| 0 | 0 | 0 | 0 | 1 | 1 | 0 | 0 | 0 | 0 | 1 | | | | | 1 | | | | | | 1 | | " " |
| 0 | 0 | 0 | 0 | 1 | 1 | 0 | 0 | 0 | 0 | | | | | 1 | | | | | | 1 | 1 | | GDCA LOGIC |
| | | | | | | | | | | INPUT DEVICE CONTROL AREA | | | | | | | | | | | | | |
| 1 | 0 | 0 | 0 | 0 | 0 | 0 | 0 | 1 | 0 | | | | 1 | 0 | | 1 | | | | 1 | 1 | 0 | OPERATOR ACTION |
| 0 | 1 | 0 | 0 | 0 | 0 | 0 | 0 | 1 | 0 | | | | 1 | 0 | | | | | | 1 | 1 | 0 | " " |
| 0 | 0 | 1 | 0 | 0 | 0 | 0 | 0 | 1 | 0 | | | | 1 | 0 | 1 | | 1 | | | 1 | 1 | 0 | " " |
| 0 | 1 | 0 | 0 | 0 | 0 | 0 | 1 | 0 | 0 | | 1 | | | 0 | | | | | 1 | | 1 | 0 | POLLING ADDRESS |
| 1 | 0 | 0 | 0 | 0 | 0 | 1 | 0 | 0 | 0 | | 1 | | | 0 | | 1 | | | | | 1 | | OPERATOR ACTION |
| 0 | 0 | 1 | 0 | 0 | 0 | 1 | 0 | 0 | 0 | | 1 | | | 0 | 1 | | 1 | | | | 1 | | SCANNER RELEASE |
| 0 | 0 | 0 | 1 | 0 | 0 | 1 | 0 | 0 | 0 | | 1 | | | 0 | 1 | | | | | | 1 | | OPERATOR ACTION |
| 0 | 1 | 0 | 0 | 0 | 1 | 0 | 0 | 0 | 0 | 1 | | | | | | | | | | 1 | 1 | | OPERATOR ACTION |
| 0 | 1 | 0 | 0 | 0 | 1 | 0 | 0 | 0 | 0 | | | | | 1 | | | | | | 1 | 1 | | GDCA LOGIC |
| 0 | 0 | 1 | 0 | 0 | 1 | 0 | 0 | 0 | 0 | 1 | | | | | 1 | | 1 | | | | 1 | | OPERATOR ACTION |
| 0 | 0 | 1 | 0 | 0 | 1 | 0 | 0 | 0 | 0 | | | | | 1 | | | 1 | | | | 1 | | OPERATOR ACTION REQ. |
| 0 | 0 | 0 | 1 | 0 | 1 | 0 | 0 | 0 | 0 | 1 | | | | | 1 | | | | | | 1 | | OPERATOR ACTION |

GDCA STATE TRANSITION TABLE

Fig. 5.

PATENTED NOV 6 1973 3,771,134

SHEET 10 OF 44

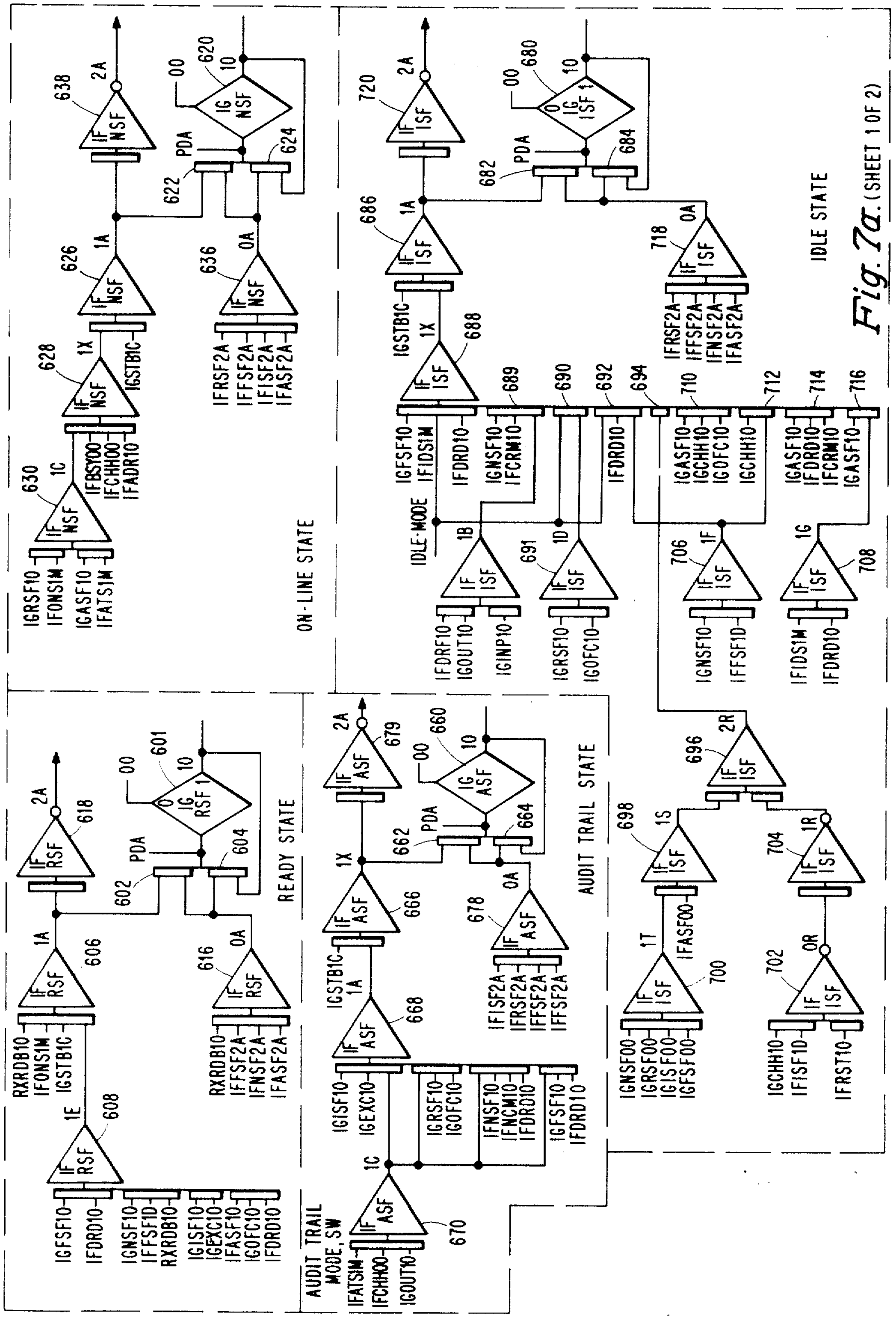
Fig. 7a. (SHEET 1 OF 2)

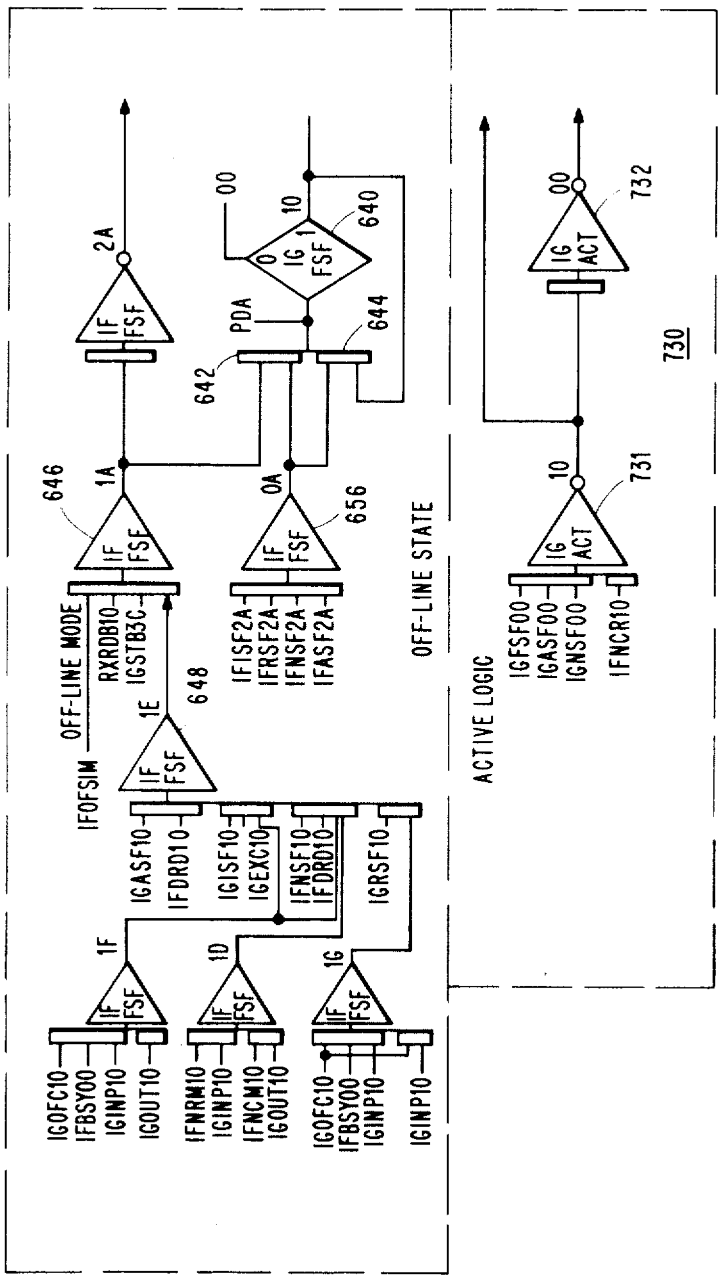
Fig. 7a. (SHEET 2 OF 2)

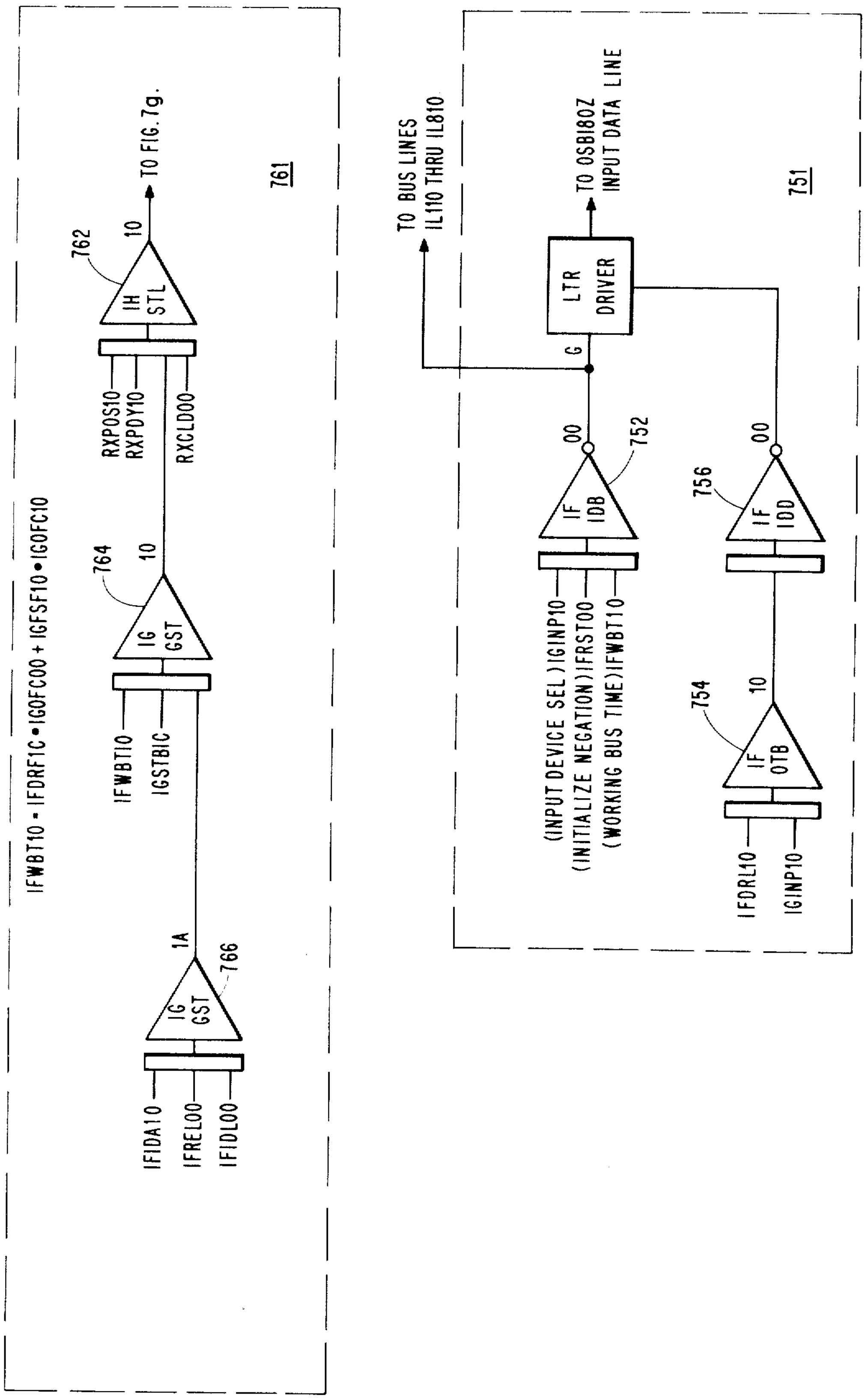
Fig. 7b. (SHEET 1 OF 4)

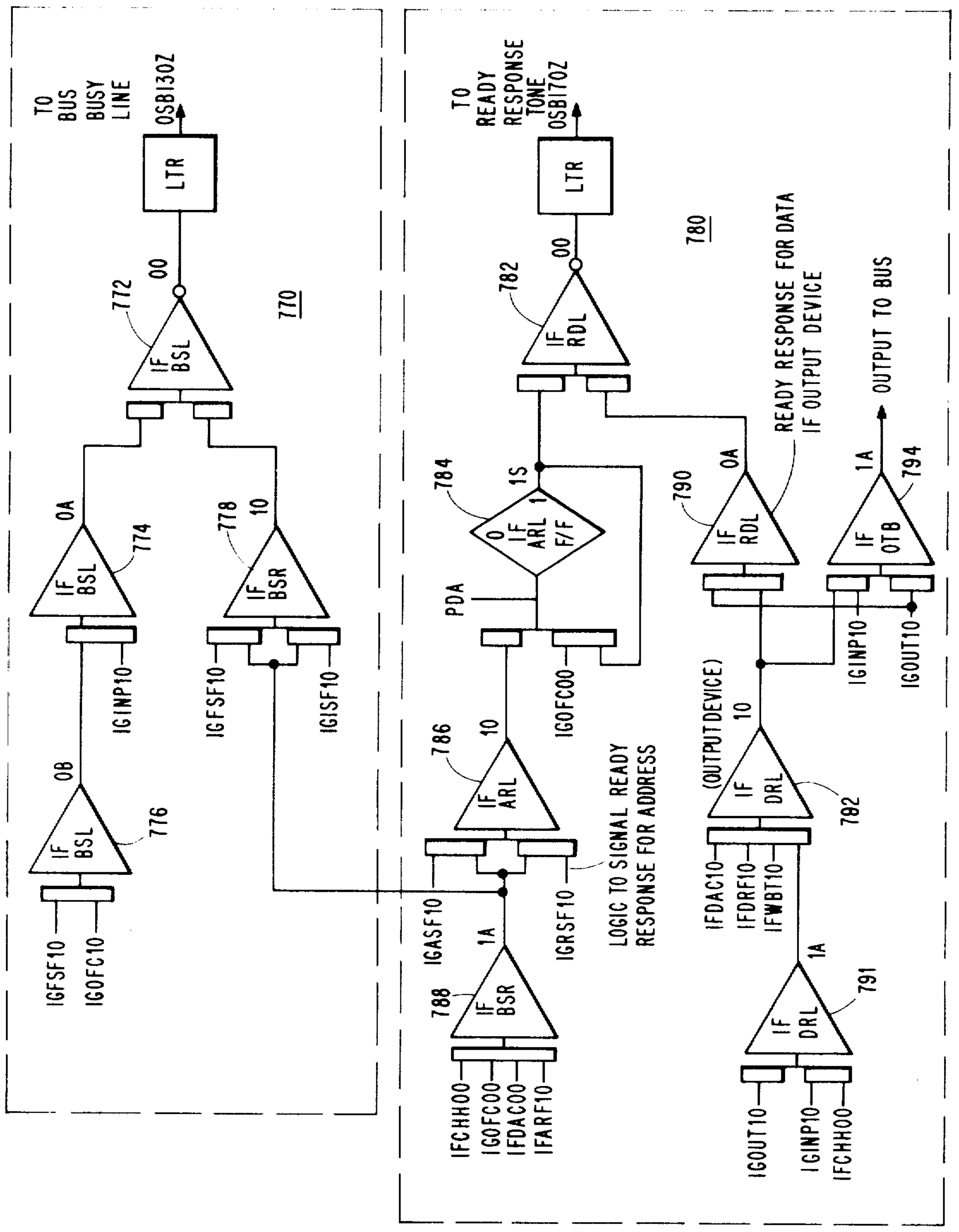
Fig. 7b. (SHEET 2 OF 4)

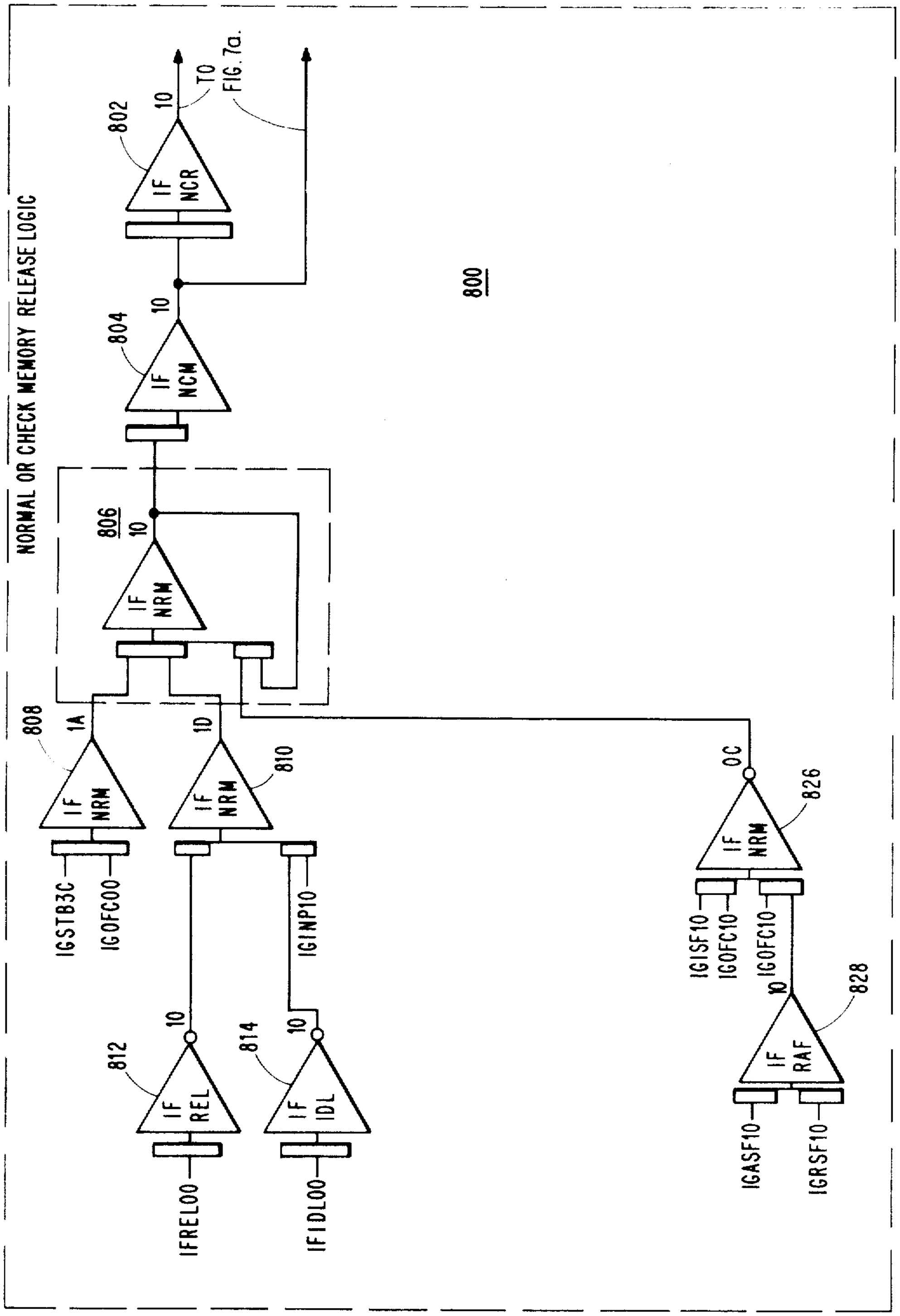
Fig. 7b. (SHEET 3 OF 4)

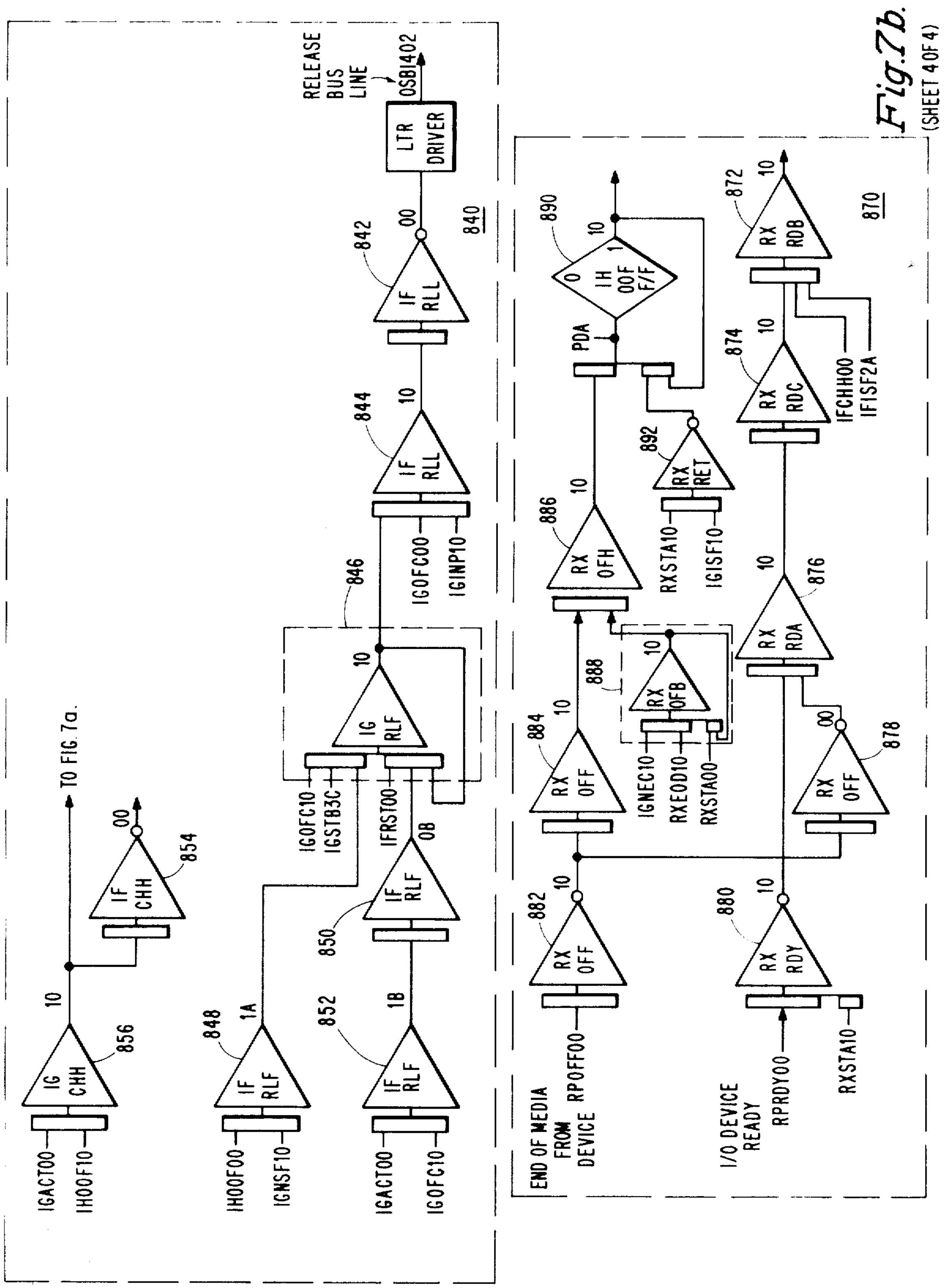
Fig. 7b. (SHEET 4 OF 4)

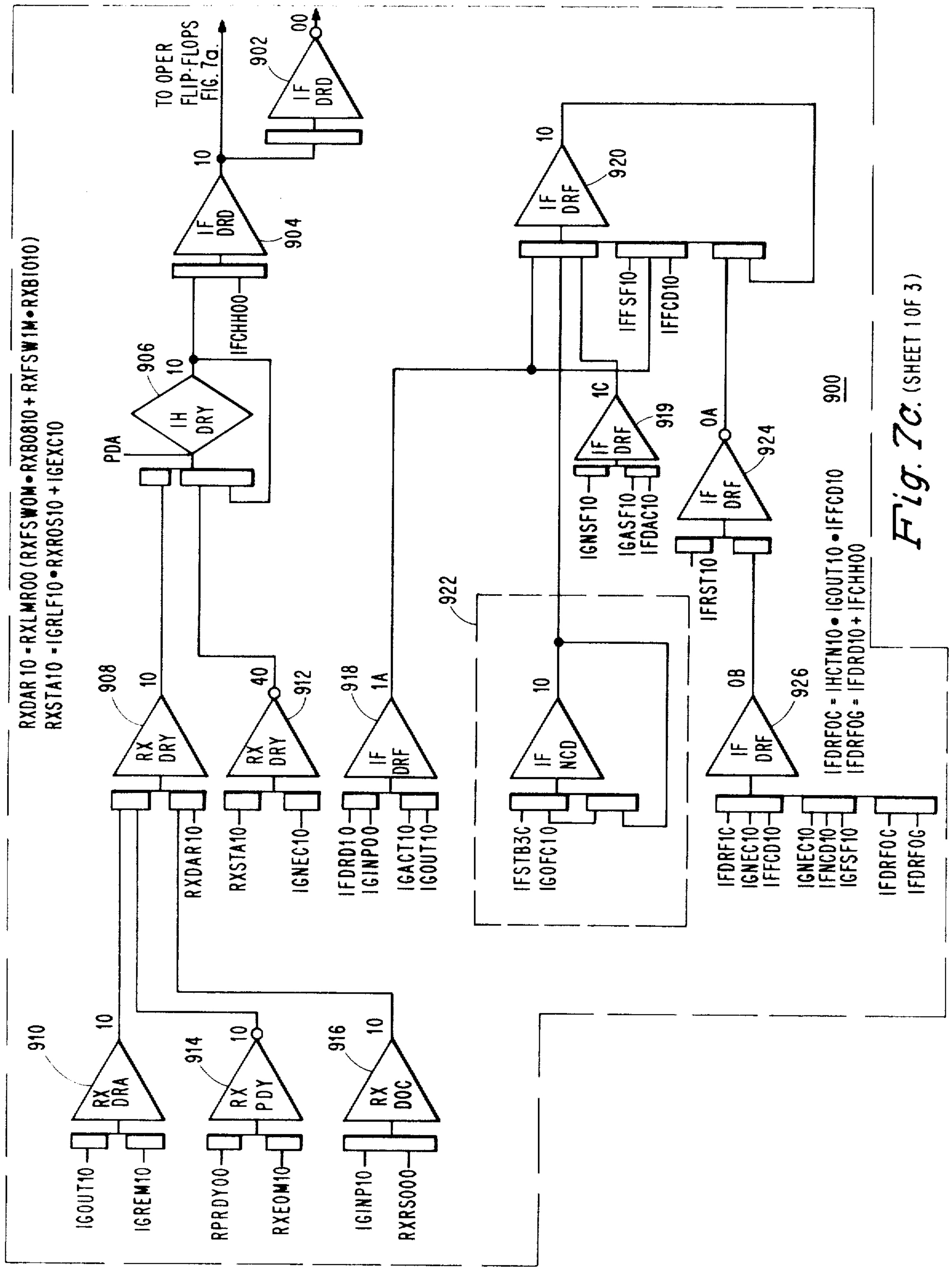
Fig. 7c. (SHEET 1 OF 3)

(SHEET 2 OF 3)

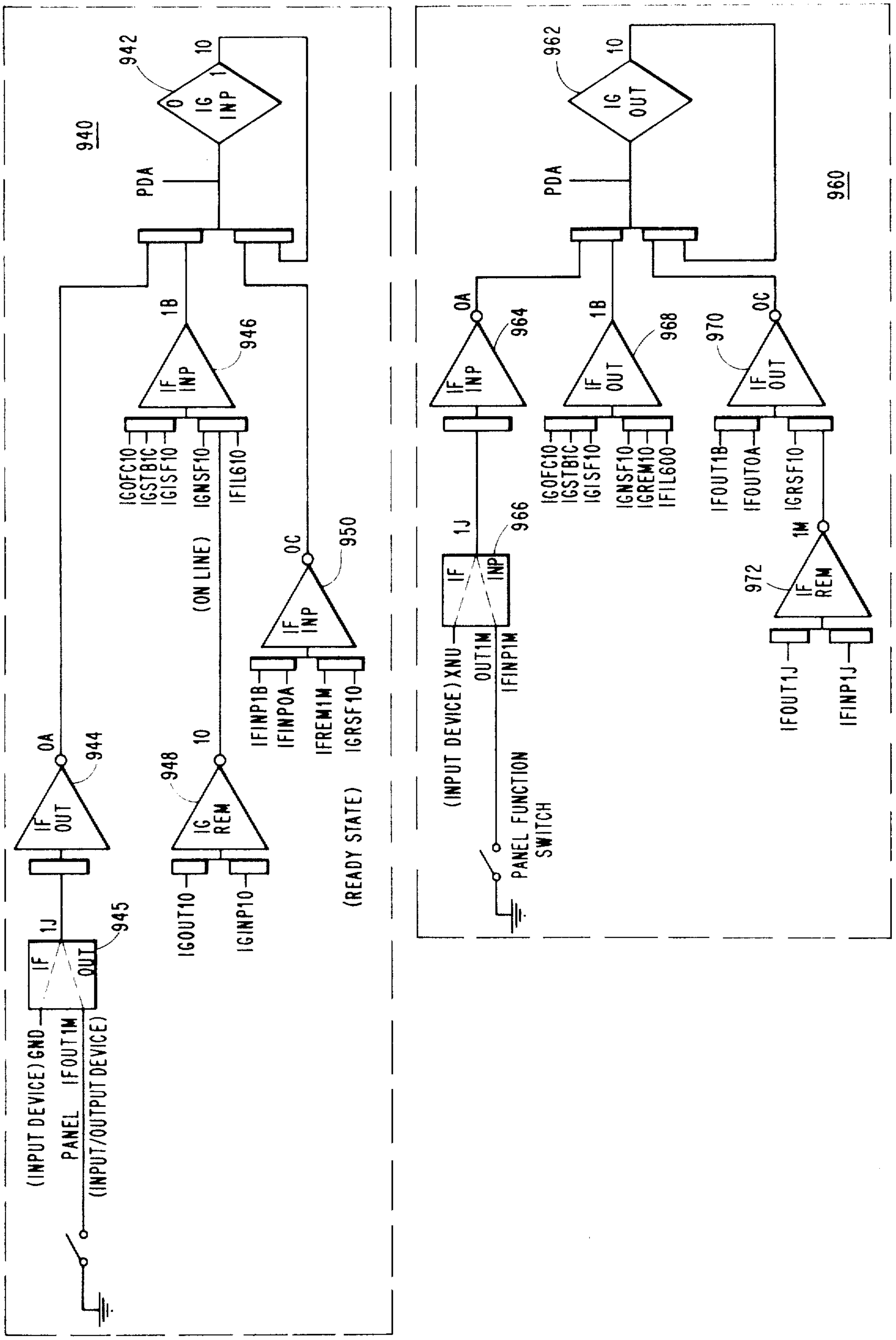
Fig. 7c. (SHEET 3 OF 3)

(SHEET 1 OF 2)

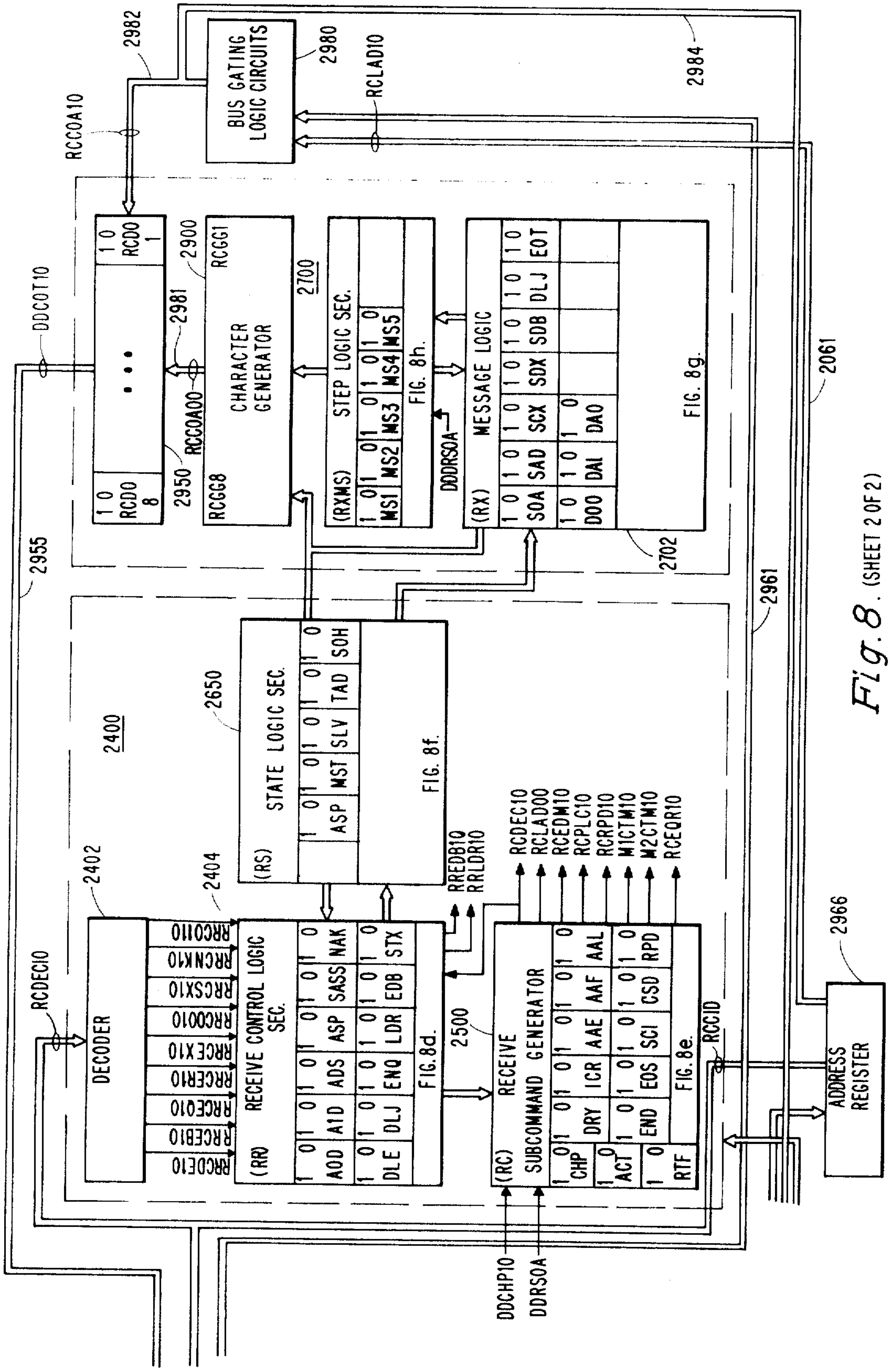
Fig. 8. (SHEET 2 OF 2)

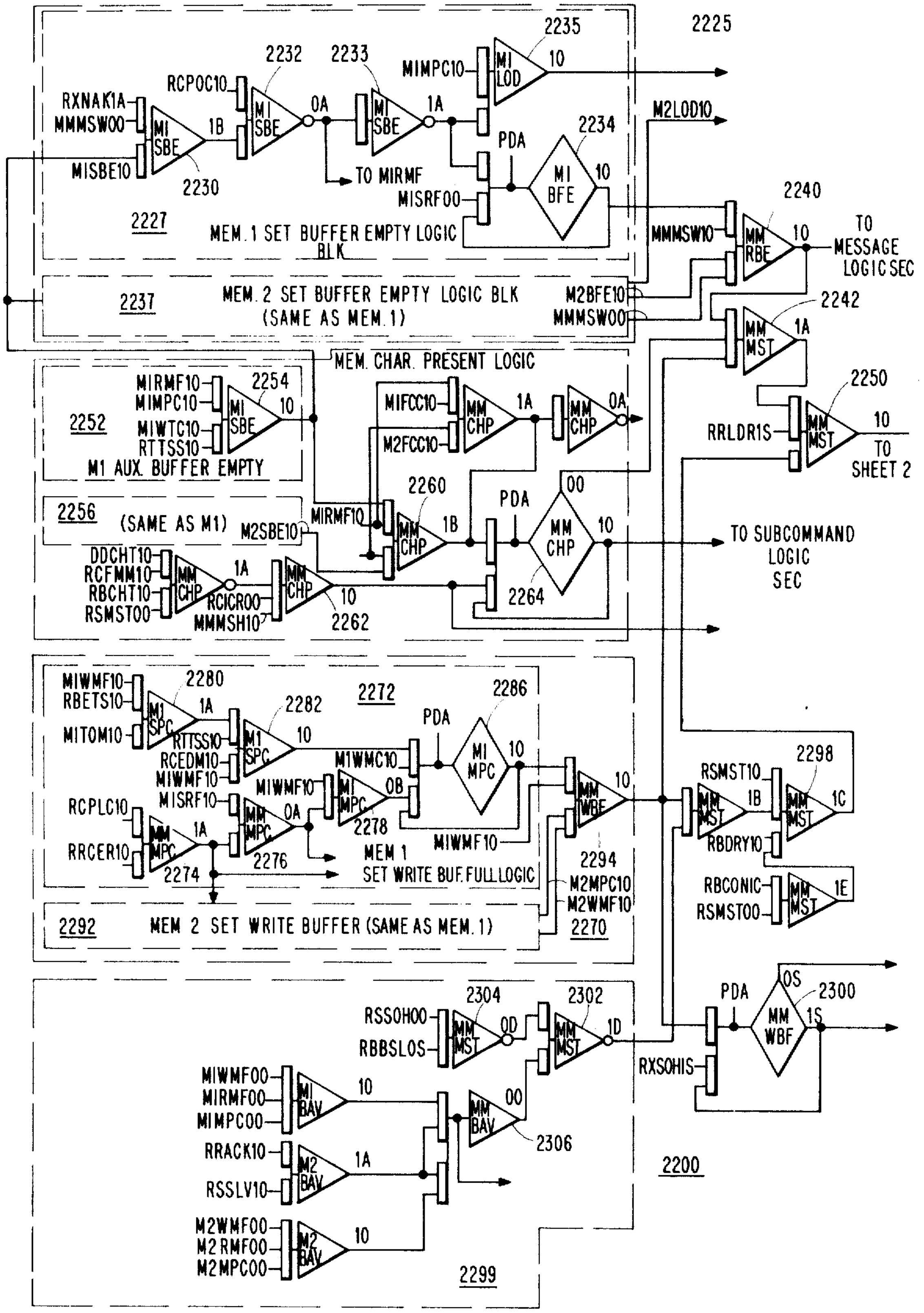
Fig. 8b. (SHEET 1 OF 2)

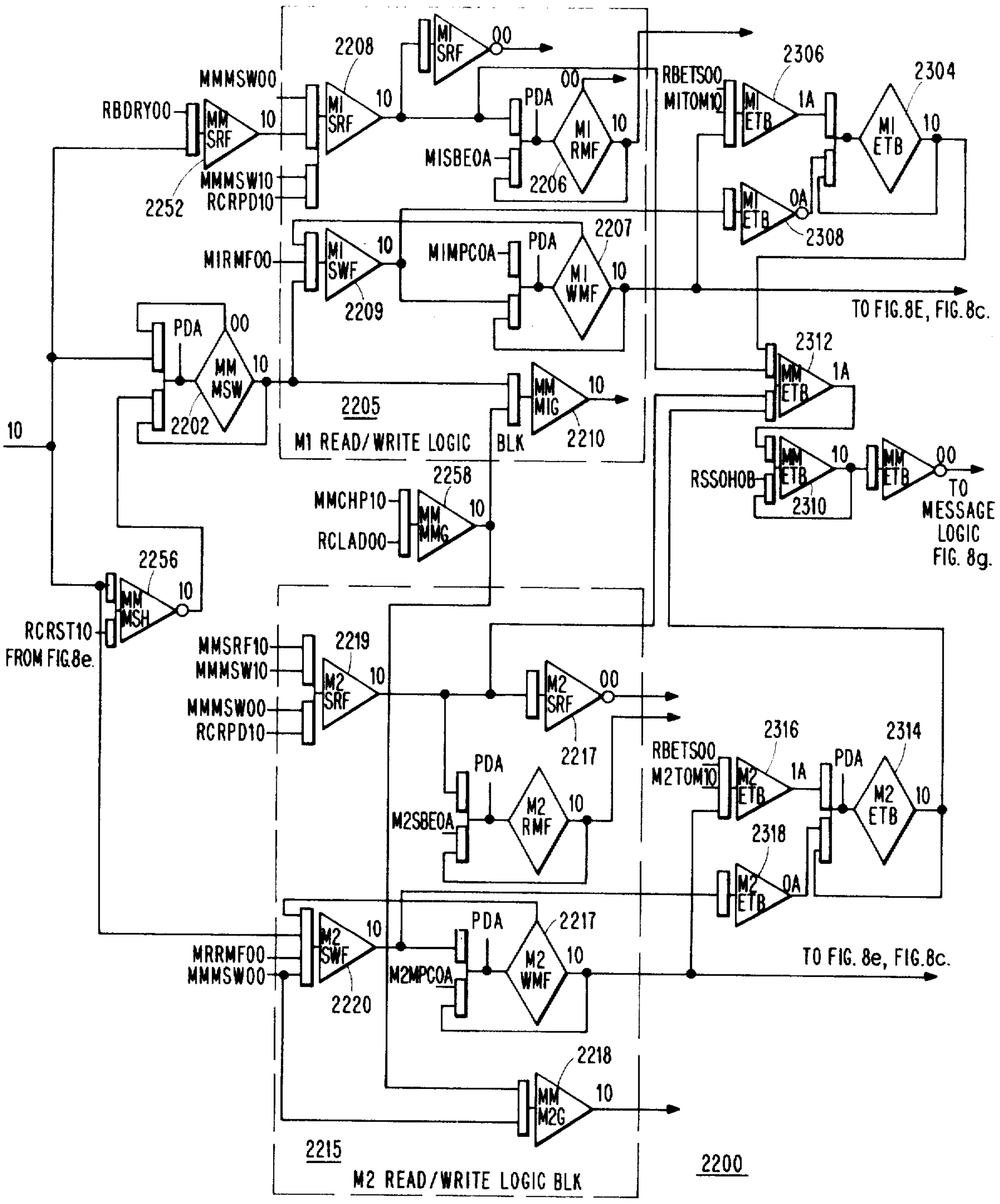
Fig. 8b. (SHEET 2 OF 2)

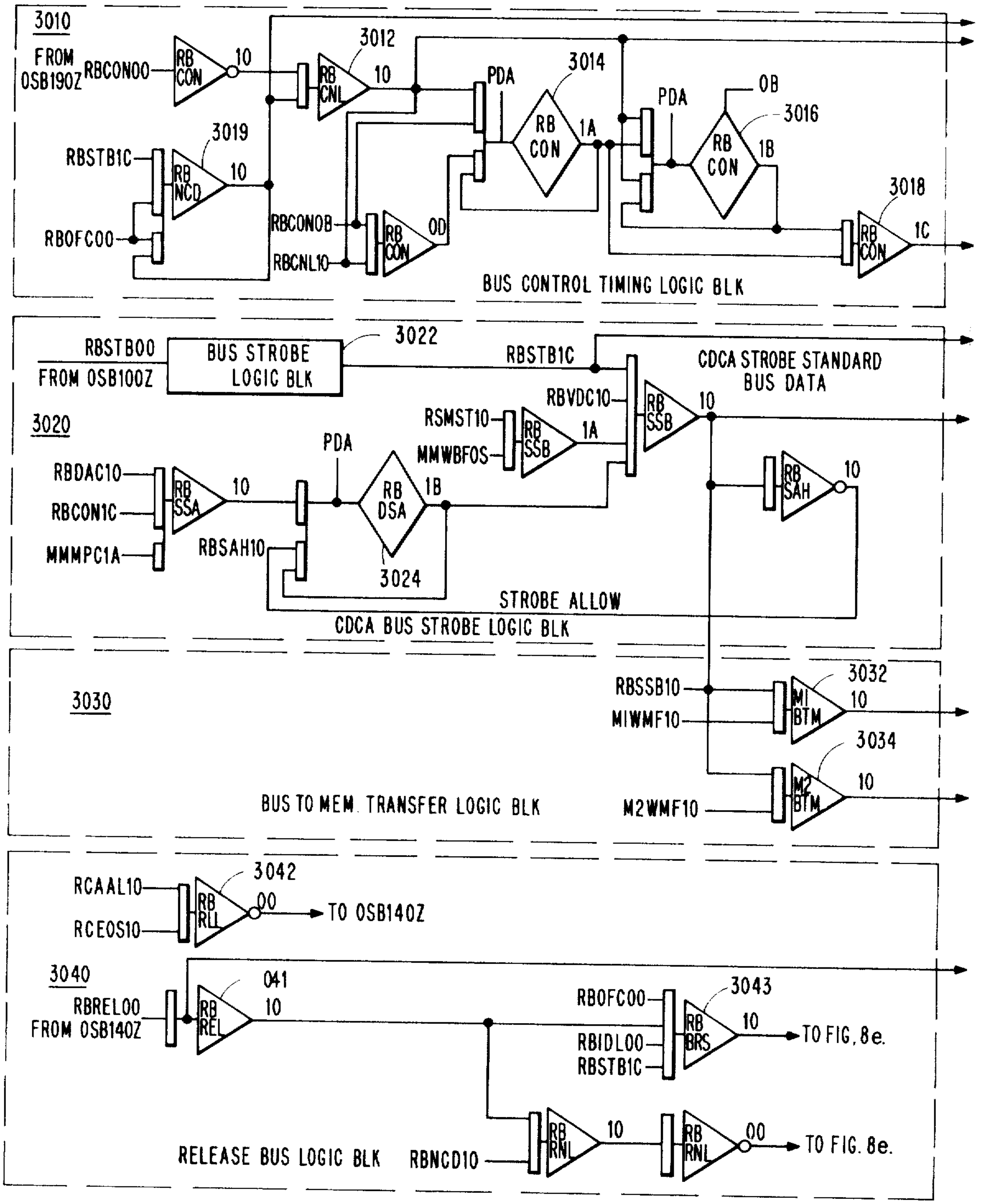
Fig. 8c. (SHEET 1 OF 4)

(SHEET 2 OF 4)

(SHEET 3 OF 4)

(SHEET 4 OF 4)

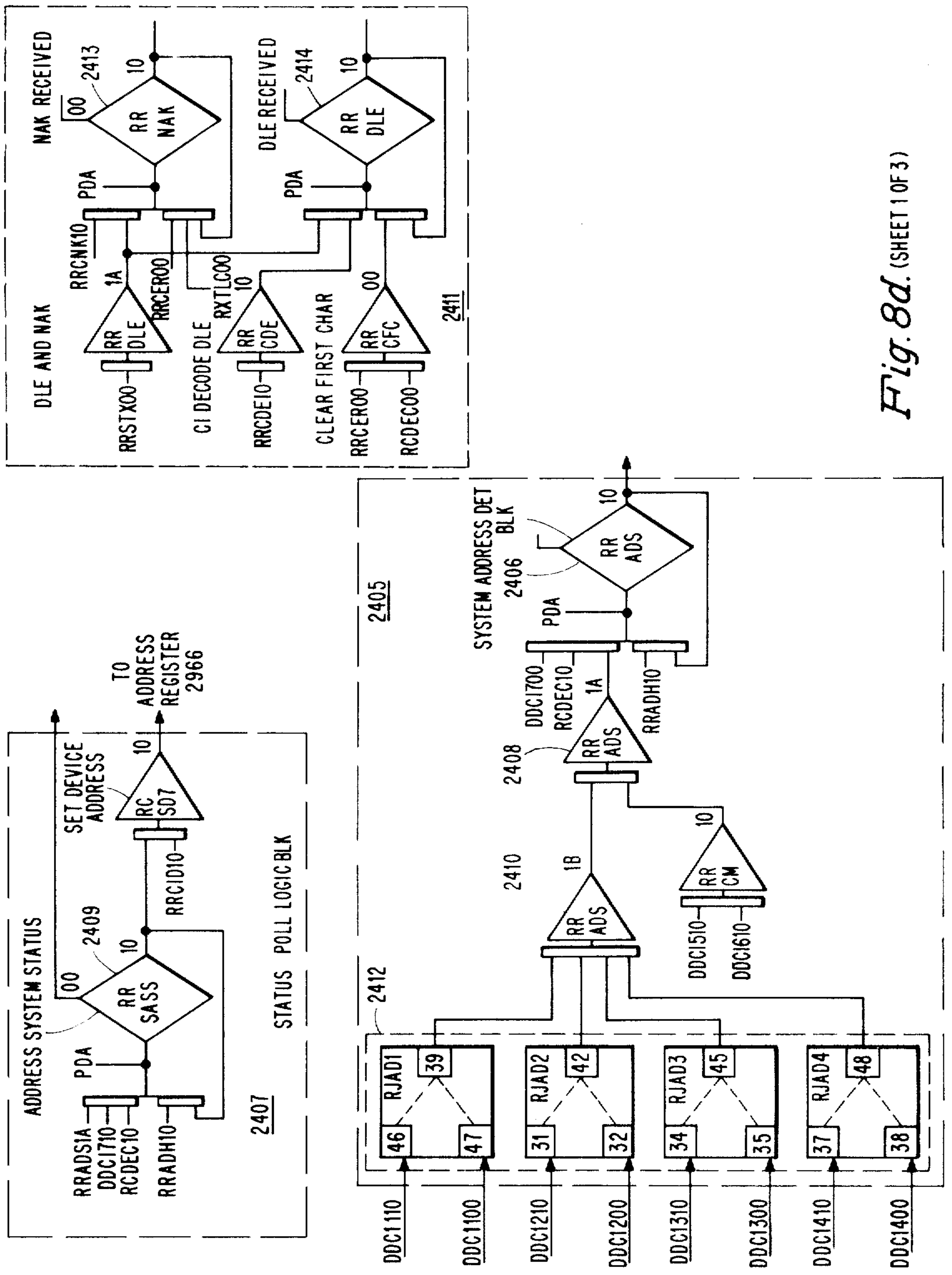
Fig. 8d. (SHEET 1 OF 3)

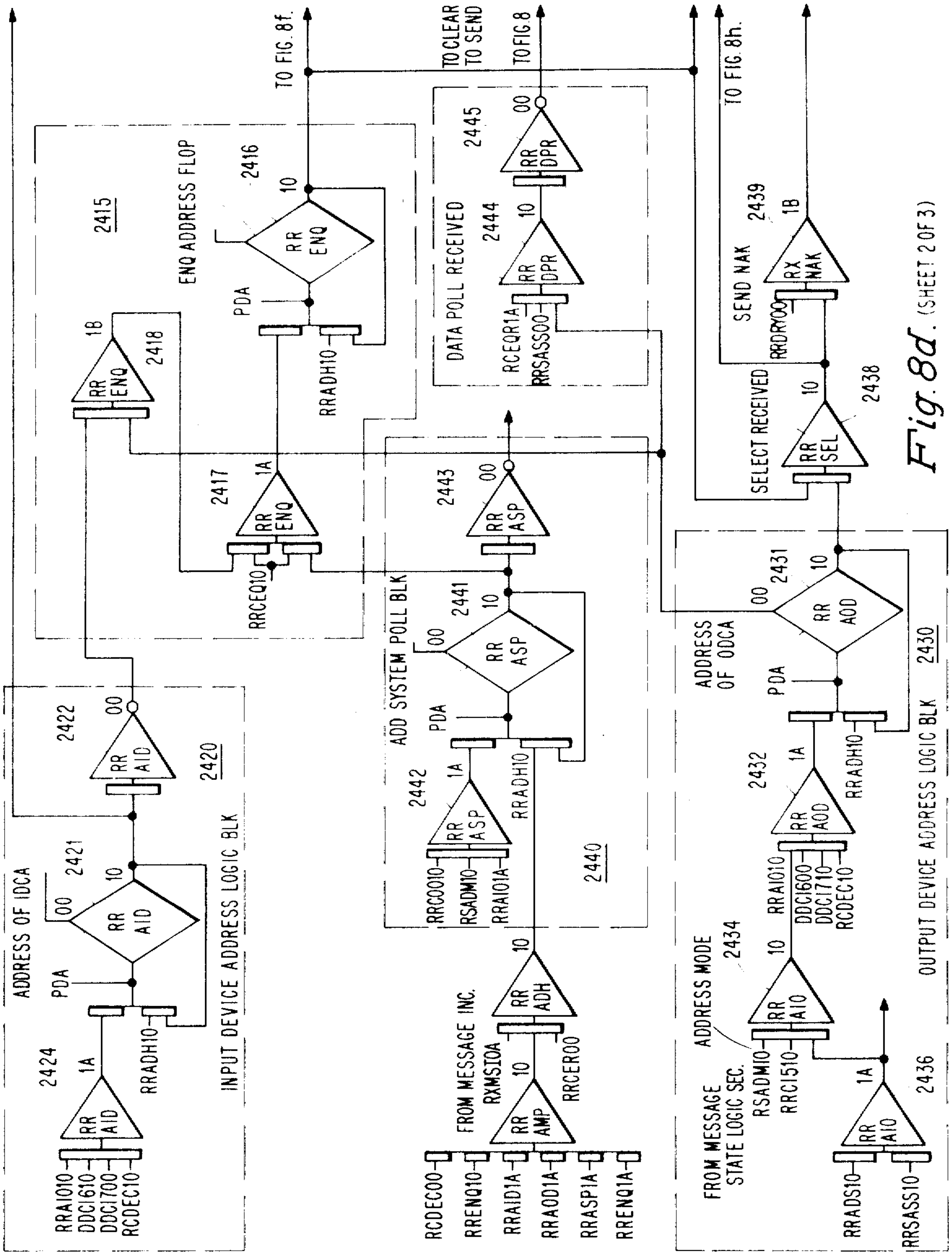
Fig. 8d. (SHEET 2 OF 3)

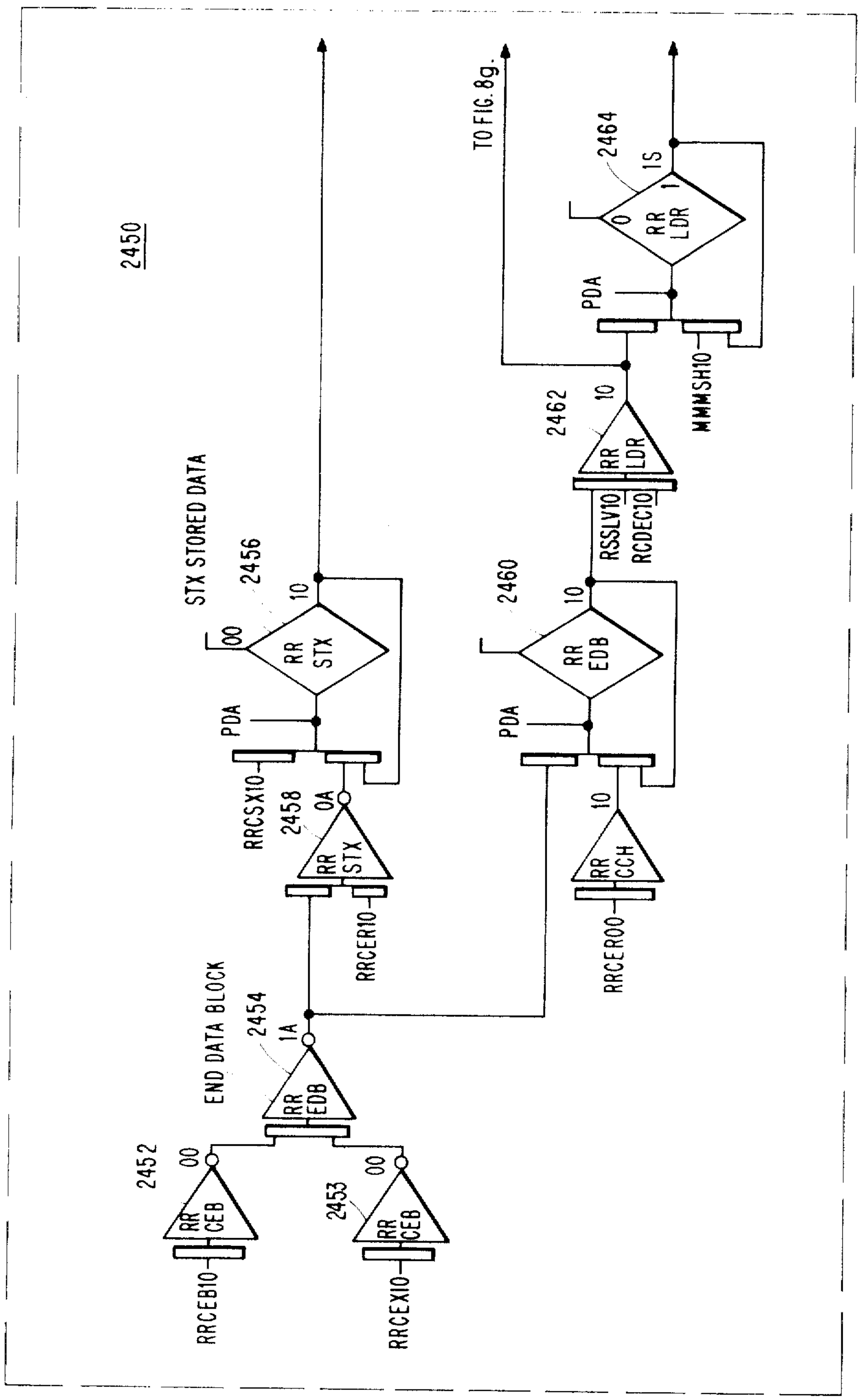
Fig. 8d. (SHEET 3 OF 3)

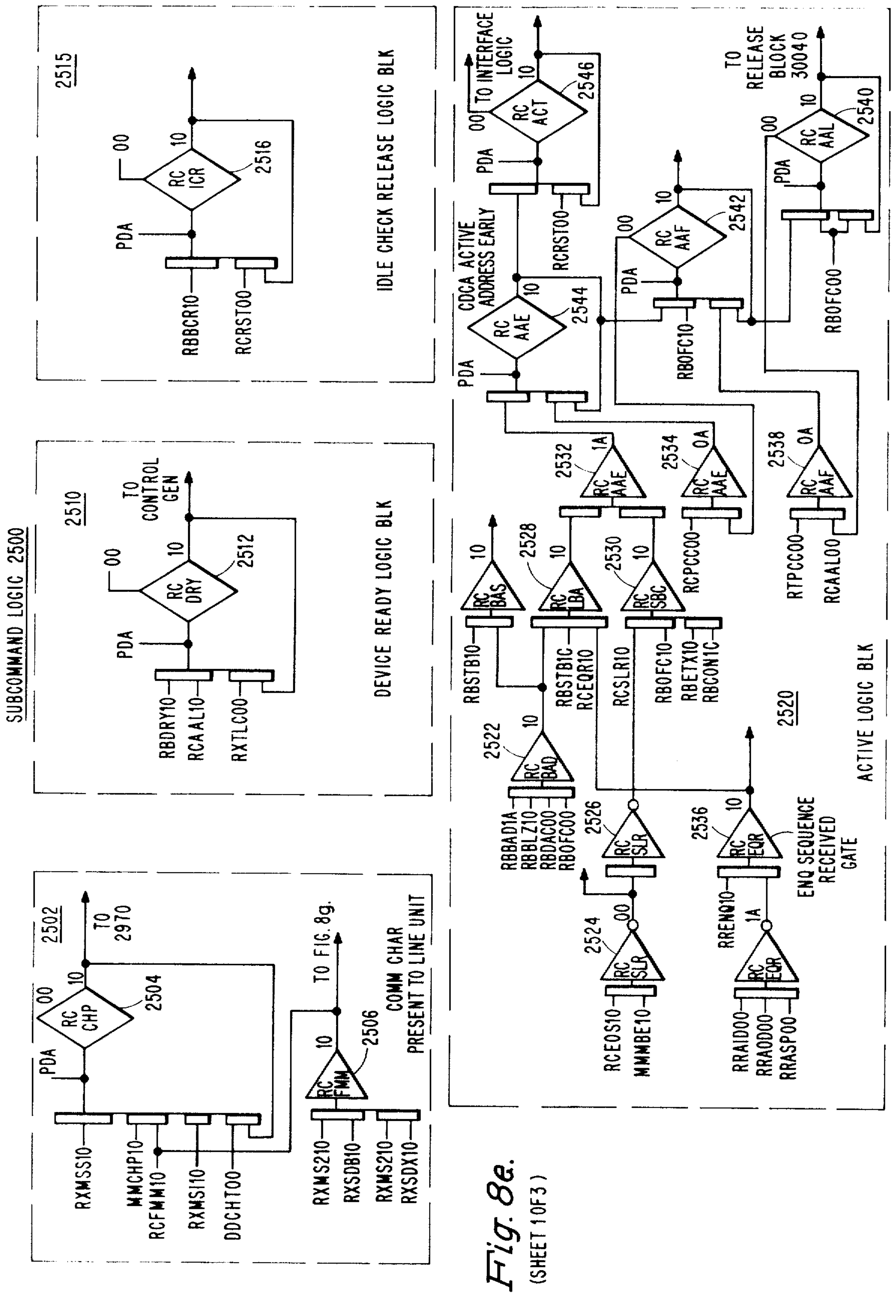
Fig. 8e. (SHEET 1 OF 3)

(SHEET 2 OF 3)

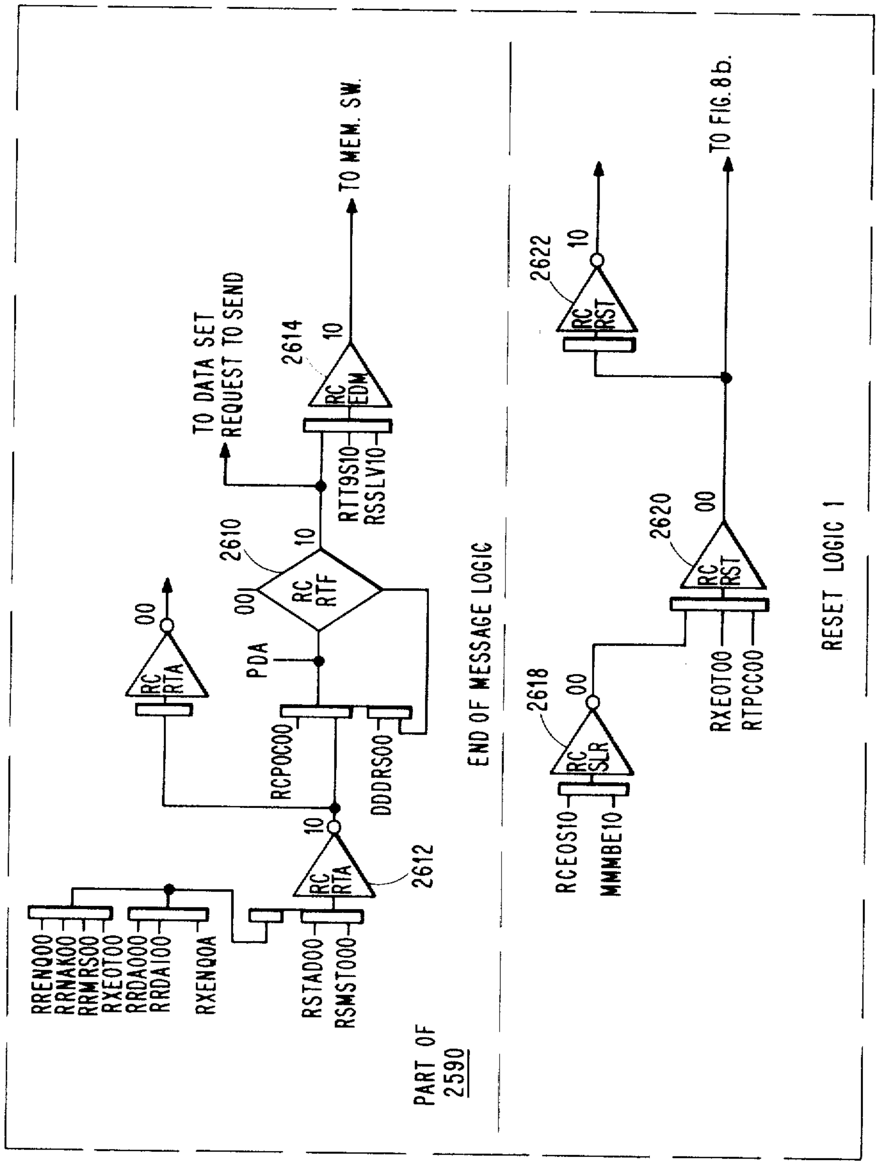
Fig. 8a. (SHEET 3 OF 3)

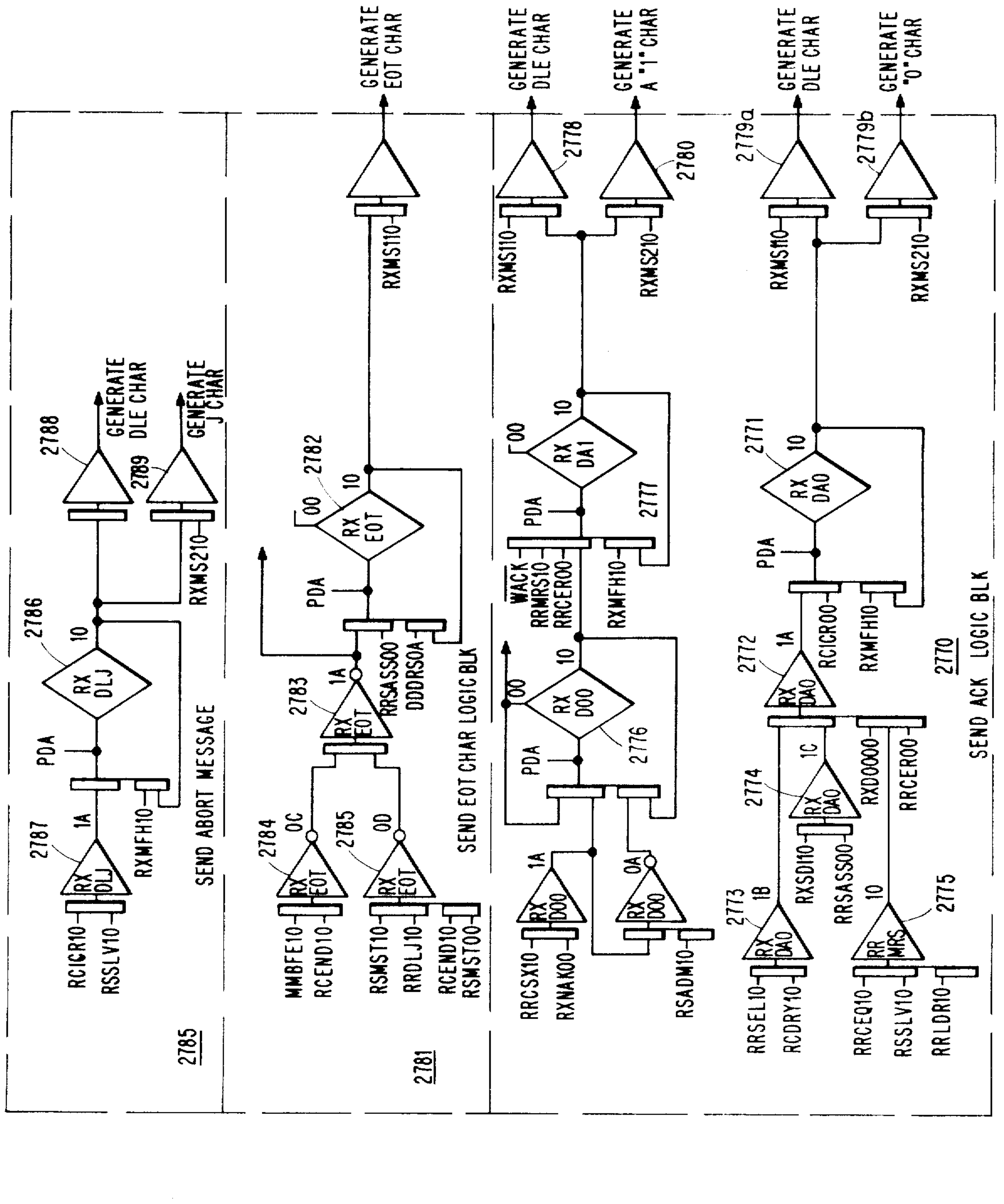
Fig. 8g. (SHEET 3 OF 3)

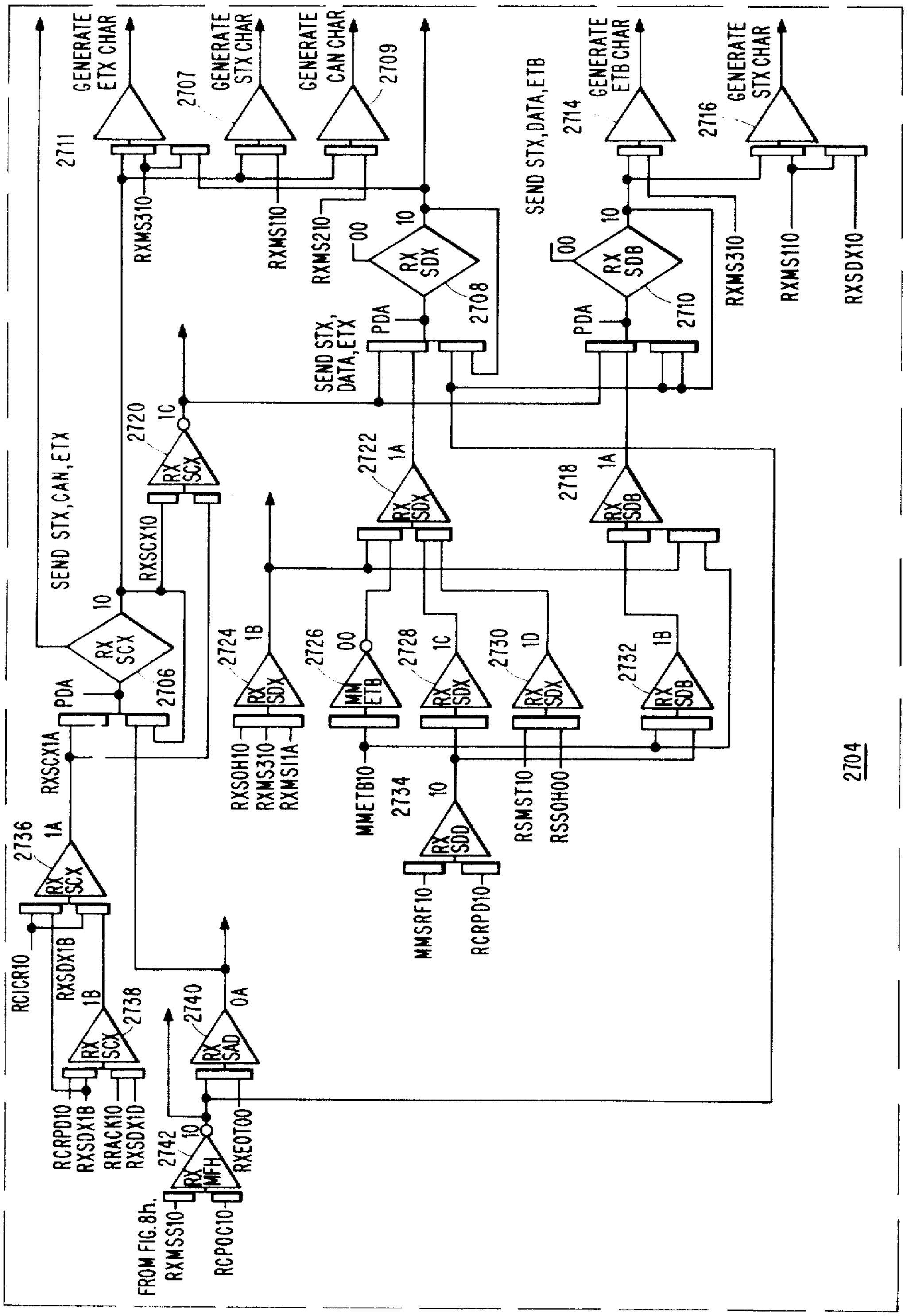
*Fig. 8g.* (SHEET 2 OF 3)

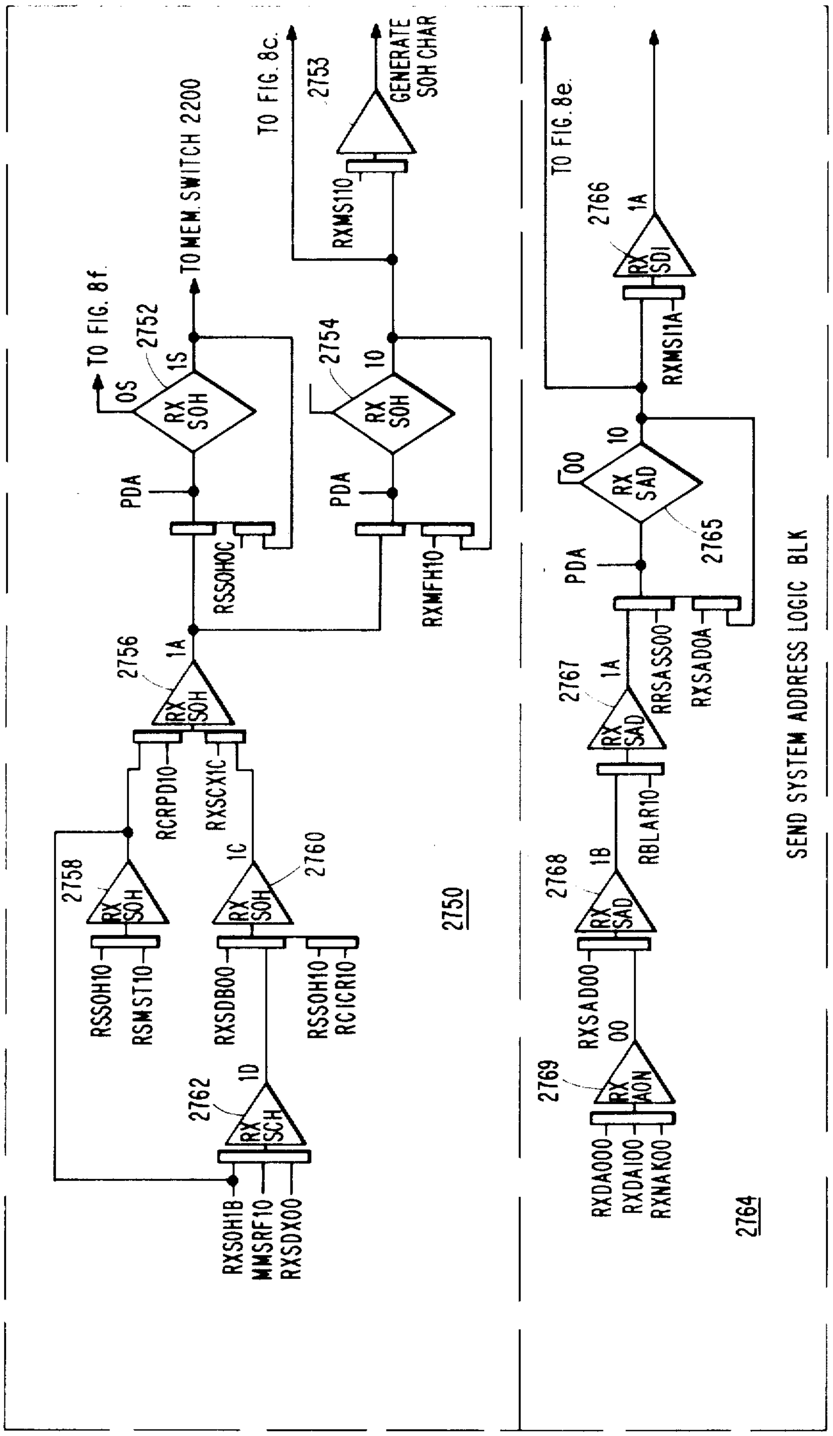
Fig. 8g. (SHEET 1 OF 3)

(SHEET 2 OF 2)

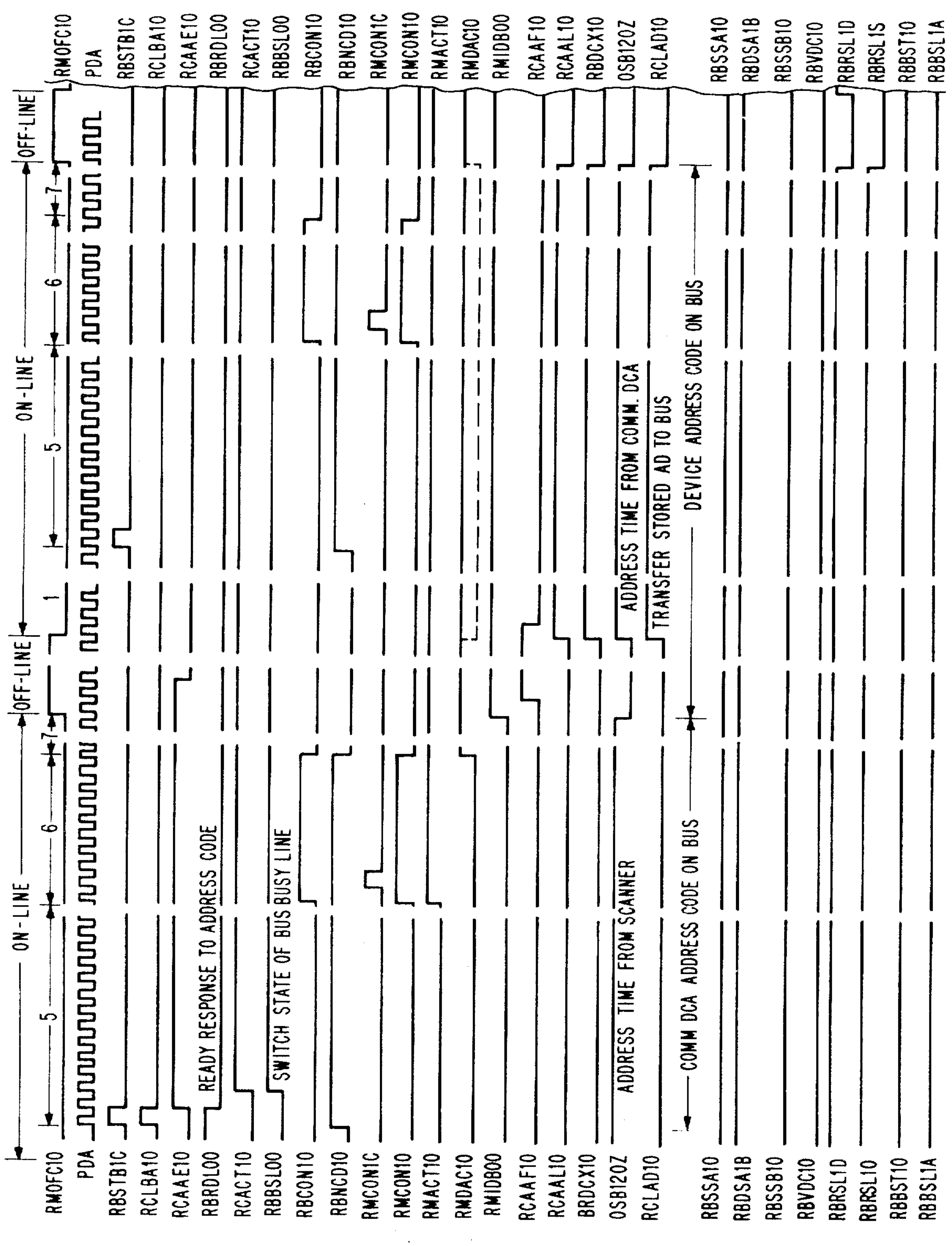
Fig. 9a. (SHEET 1 OF 2)

CHARACTER TO BUS TIMING

COMMUNICATION CONTROL DEVICE UTILIZED AS AN INPUT/OUTPUT MODULE FOR A REMOTE TERMINAL SYSTEM

RELATED APPLICATIONS

1. "A Remote Terminal System" invented by Robert E. Huettner and Edward B. Tymann, filed on even date with this application, Ser. No. 114,912 and assigned to the same assignee named herein.

2. "A Multifunction Polling Technique" invented by Robert E. Huettner, Edward B. Tymann and Richard Nolin filed on Feb. 11, 1971 with this application, Ser. No. 114,431 and assigned to the same assignee named herein.

3. "An Automatic Terminal Deactivation Device" invented by Robert E. Huettner and Edward B. Tymann, filed on even date with this application, Ser. No. 114,876 and assigned to the same assignee named herein.

BACKGROUND OF THE INVENTION

Field of Use

This invention relates to data processing systems and more particularly, to communications systems which permit a terminal system to operate on-line to a data processing system.

In general, the terminals of the prior art have been arranged to operate either "on-line" or "off-line." That is, the terminals operate either through a communication data set (modem) in conjunction with a central processing unit or the terminal operates without any communication transmitting capabilities for preparing preprocessed data. Further, terminals having data communication capabilities integrate communication control functions and local transfer control functions within a single control unit. Accordingly, each change in the communication facility necessitates a redesign of the central control unit.

From the foregoing, it is an object of the invention to provide a modular communication apparatus which can be attached to a terminal system and operate as an input/output device.

It is a further object of the invention to provide an improved communication device which permits changes in the communication facilities required for a terminal system without necessitating redesign of the terminal system.

It is still a further object of this invention to provide a communication input/output modular device which can be eliminated and still permit the terminal system to operate off-line for local data exchange between input/output devices connected thereto.

It is a further object of the invention to provide a communications input/output device which is able to transmit data from a terminal operating in at least first and second selectable data processing modes.

It is still a further object of the invention to provide a communication device which can establish the size of the input data automatically.

It is a more specific object of the invention to provide a communication device which automatically blocks data from an input device at selectable sizes and transfers the data in accordance with user requirements.

SUMMARY OF THE INVENTION

The above and other objects are provided according to the basic concept of the invention through a communication device which is operative to establish whether a scanning device of the terminal system will address or poll the input devices connected to the bus system. In accordance with the preferred embodiment, when no polling or device requests have been initiated for on-line operation, the communication control device inhibits all input device requests by a single control line which is shared by the device scanner and all input devices. When there is activity in the form of either a polling or selection request, the communication device assumes the roll of either an output device or input device respectively whereafter it is operative to either initiate or permit a device request.

The above arrangement provides the facility of permitting the communication characteristics of the terminal system to be changed by substituting one communication facility for another without necessitating any change in design of the system. A further feature of the invention is that the communication controlled device can be eliminated totally from the terminal system whereafter the terminal system will provide off-line operation for local data transfers between input and output devices connected to the bus.

The communication device of the preferred embodiment includes a two memory arrangement which facilitates the processing of input and output data transfers simultaneously. That is, the memory system is so arranged that input devices may transfer data characters on to the bus into one memory while at the same time the communication device is transferring data characters to its associated communication facility.

A further feature of the arrangement is that each memory may be adjusted to establish a predetermined block size for the data received from input devices. Alternately, the memory system includes means for detecting when a block size less than the preestablished amount which has been defined by the user. In particular, in accordance with the preferred embodiment, the user may code the data so as to include a special control character (end of text character) which automatically establishes the size of the block of data to be transmitted by the communication device. As mentioned, in the absence of this coding, the communication device will automatically transmit the preestablished block size. This arrangement eliminates the need for having to establish the size of the data block for each device of the terminal system.

The above and other objects of the present invention are achieved in an illustrative embodiment described hereinafter. Novel features which are believed to be characteristic of the invention, both as to its organization and method of operation, together with further objects and advantages thereof will be better understood from the following description considered in connection with accompanying drawings. It is to be expressly understood however, that these drawings are intended for the purpose of illustration and description only and are not intended as a definition of the limits of the invention.

BRIEF DESCRIPTION OF THE DRAWINGS

FIG. 5 summarizes the states of pertinent control functions included within the general device control area (GDCA) of FIG. 1;

FIG. 7a shows in greater detail the mode selection logic of the FIG. 7;

FIG. 7b shows in greater detail the bus interface logic of FIG. 7;

FIG. 8b shows in greater detail the memory switching logic section of FIG. 8;

FIG. 8d shows details of the Receive Control logic section which forms part of the command logic section of FIG. 8;

FIG. 8g shows in greater detail the message logic which forms a part of the control character generation logic section of FIG. 8;

DESCRIPTION OF THE PREFERRED EMBODIMENT

In General

In the terminal system of the present invention, data is processed in a plurality of operator selectable modes depending on the particular application. For example, in data collection and merging operations, it becomes desirable to process a block or a data record from each input device. This mode, termed herein as a transaction mode, permits one transaction or one block of data to be read from each input device.

On the other hand, in other applications where tasks require extensive volumes of data to be moved to and from a remote site in large groups of batches, it becomes particularly desirable to have a single input device transfer data until it has exhausted its supply of data. This mode of operation is referred to as a "batch" mode of operation.

In addition to the above mentioned operator selectable data modes, the system of the present invention may operate "on-line" to a remotely located data processing system. When operated on-line, the remote data processing system can request and receive data from the input devices of the system or the data processing system can transmit data which will be transcribed by selected output devices of the system. Accordingly, the communications device for on line operation, is able to assume the control functions heretofore performed by the systems device scanner and initiate data transfers to and from the system in accordance with the data processing system requests.

While the system of the present invention can initiate a plurality of control procedures in response to different types of requests made by the remote data processing system, this procedure is not described herein but is described in the copending application titled "A Multifunction Polling Technique" referenced above assigned to the same assignee named herein and filed on even date herewith.

Figure 1:
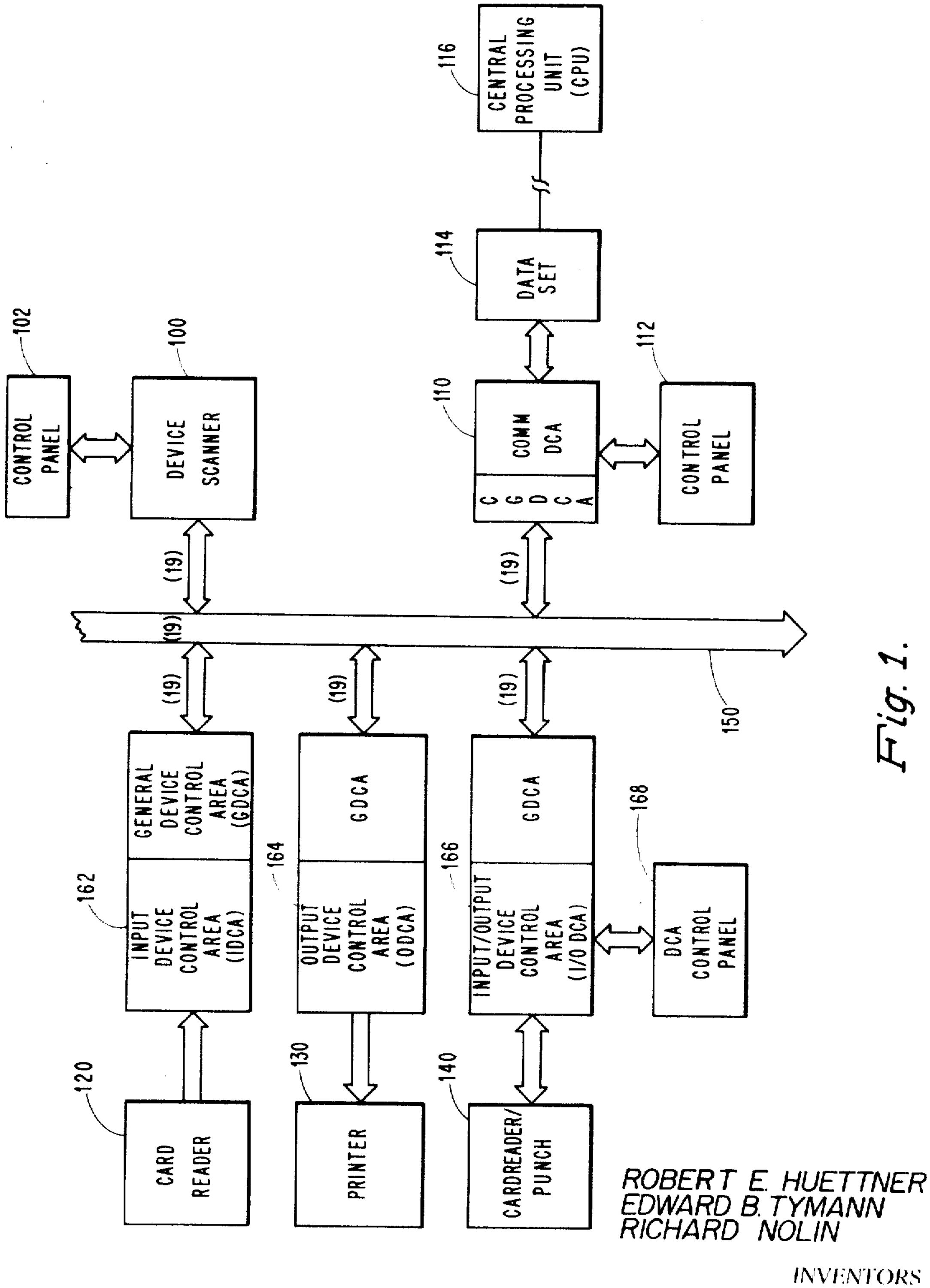
FIG. 1 is a diagramatic illustration of a terminal system employing the principles of the present invention.

FIG. 1 is a block diagram of the system of the present invention which includes input device control apparatus in the form of a device scanner 100, a communications control unit referenced as COMM DCA 110 and a plurality of peripheral input and output devices 120, 130, and 140 all of which connect in common to a bus 150.

As shown, the peripheral devices which include a card reader, a printer, a card reader/punch, communicate with the bus 150 to their respective control units 162, 164, and 166. These control units labeled input DCA, output DCA, and input/output DCA respectively include control logic, individual buffer storage, interface circuits and power supplies required to regulate the operation of its associated peripheral device.

Each of the peripheral control units have a standard logic interface area termed herein as a general device control area (GDCA) which provides an interface to the bus 150. The bus 150 consists of 19 lines that include eight information lines for transferring address and data information, cycle timing signal lines, and several control lines. The lines which form a part of the interface is disclosed in FIG. 2 and will be described herein.

The device scanner 100 is operative to regulate the transfer of data from each of the input devices by generating the requisite timing cycles used in conjunction with such data transfers and the pertinent control signals for controlling these transfers. When the scanner 100 causes an input device to be activated, it then is operative to monitor the activity of the bus 150 during the transfer operation.

In particular, when the system operates in a transaction mode, the device scanner 150 is operative to terminate a transfer of a block of data by generating a release control signal over the bus 150 when it detects that a special control character has been placed on the bus by the input device. Additionally, the scanner 100 monitors the data transfer operation and in the event of its detecting a failure in either a sending or receiving peripheral device from the terminal bus 150. The manner in which the device scanner accomplishes it is described in the copending application titled "An Automatic Terminal Deactivation Device" invented by Robert E. Huettner and Edward M. Tyman assigned to the assignee named herein filed on even date herewith.

In general, the COMM DCA 110 in accordance with the present invention provides a modular interface between the remote terminal system and a communications channel or facility (i.e. a modulator-demodulator unit-modem). This unit allows the terminal system to operate efficiently on line to a remotely located data processing system. In particular, the unit operates as either an input or output unit for transferring data from the remotely located data processing system to the output devices of the terminal system. This is facilitated through the use of a memory buffer system which provides for simultaneous processing of transfers from devices to the buffer memory and from the buffer memory to the communications facility and vice versa. Moreover, the COMM DCA 110 is operative to provide the requisite checking and automatic blocking of messages. In particular, DCA 110 will transfer segments of blocks of information of a size established by the user or alternately will transfer automatically blocks of information of a predetermined size.

The detail logic for each of the blocks of FIG. 1 will only be described in as much detail as is necessary to understand the present invention. Specifically, the scanner logic disclosed in FIGS. 3*a* through 3*c* will be described very generally. Similarly, the FIGS. 4 through 7 and 7*a* through 7*f* will also be described only as is necessary to the understanding of the present invention. For a detailed description, reference may be made to the copending application of Robert Huettner and Edward Tymann titled "Remote Terminal System" which by this reference is incorporated herein by reference to the extent necessary for an understanding of this invention.

THE DESCRIPTION OF DEVICE SCANNER LOGIC

General

The device scanner 100 as mentioned establishes the timing for the system wherein it generates the "ON" and "OFF" LINE bus cycles which define the time interval during which a single data character may be transferred over the terminal bus 150 during on-line and off-line operation. The "ON" and "OFF" LINE bus cycles are equally divided and can be varied in frequency by switches provided on a control panel 102 associated with the device scanner 100. Additionally, the scanner 100 is operative to generate a strobe pulse occurring midway between each ON-LINE and OFF-LINE bus cycle for defining a time period during which information on the bus 150 may be accurately sampled. Also, the scanner 100 generates a four bit binary address code which is received by the general device control area (GDCA) of the input/output device controllers 120,130,140 and the communication general device control area (GDCA) of the COMM DCA 110.

Figure 3:
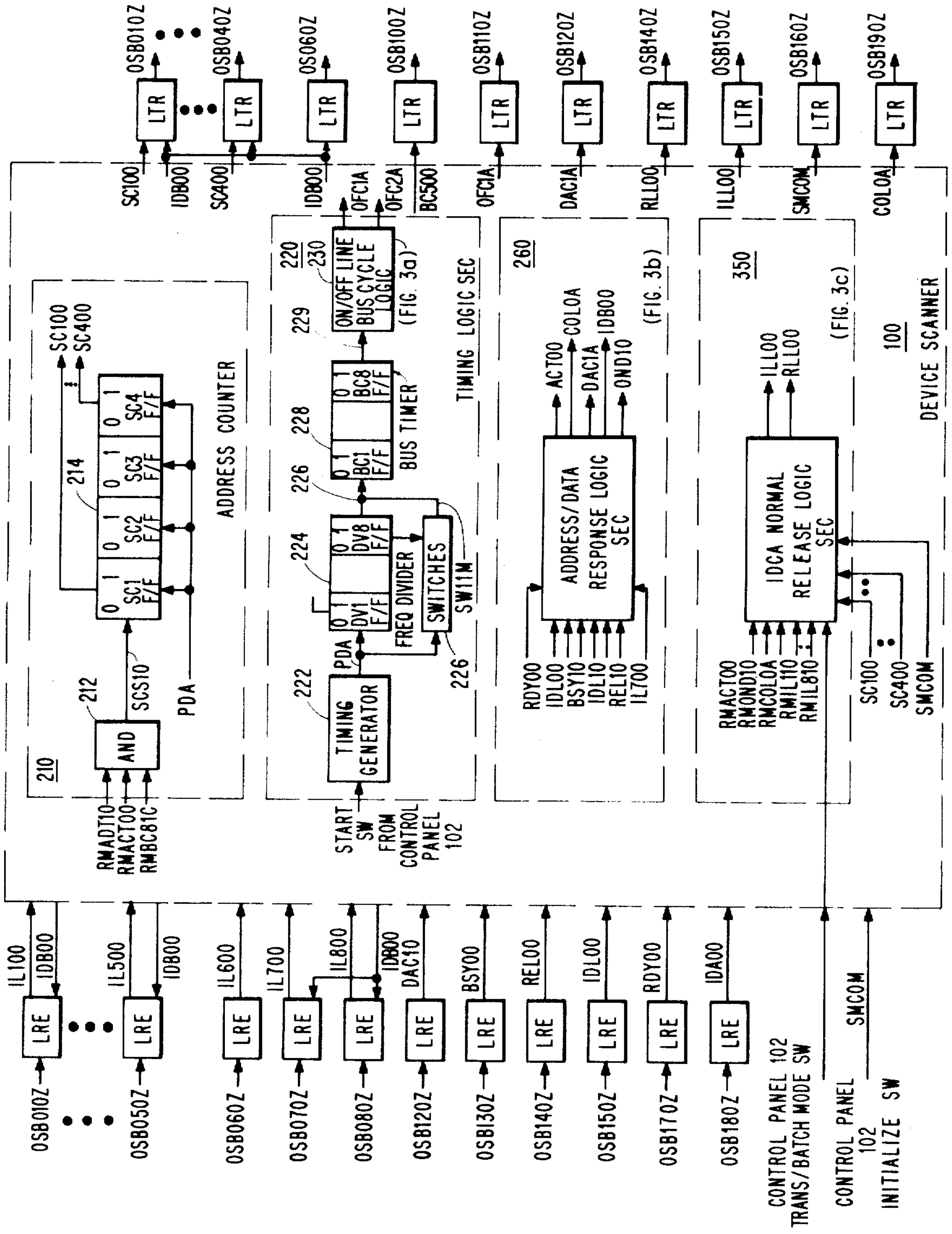
FIG. 3 is a block diagram of the device scanner of FIG. 1.

With reference to FIG. 3, it is seen that the scanner 100 comprises four sections. These sections include a Device Scanner Address Counter Section 210, a Timing Logic Section 220, an Address/Data Response Logic Section 260, and a Release Logic Section 350. These sections are illustrated in greater detail in the FIGS. 3*a* through 3*c* as designated in each of the section blocks of FIG. 3.

TERMINAL BUS 150

Figure 2:
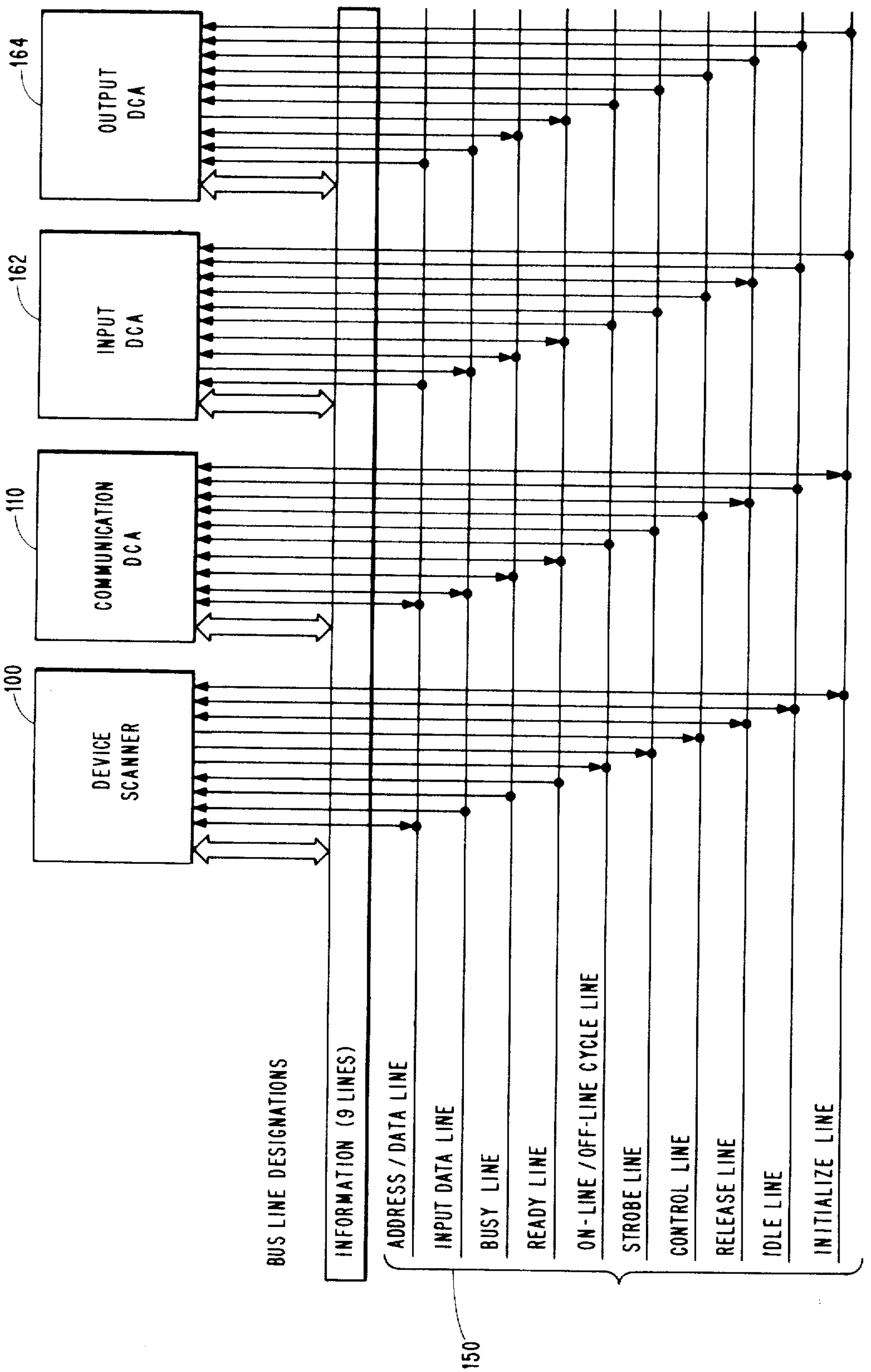
FIG. 2 shows the terminal bus of FIG. 1 in greater detail.

Before discussing the above Figures, reference is made to FIG. 2 mentioned above. A general description of each bus line which forms the bus 150 is summarized in the following table.

TABLE

INTERCONNECTING LINES

| FUNCTION | SIGNAL LINE INFORMATION | DESCRIPTION |
|---|---|---|
| 1L110/1L100 Through 1L910/1L900 | (OSB010Z Through OSB09OZ) | Lines 1 through 9 are used to transfer both data and address information. During On-Line cycles, the condition of the ADDRESS/DATA line specifies the content of the information lines. During OFF-LINE cycles, the lines are used only for data transfer. When used for address information, line $I_1$ through $I_4$ contain the DCA address, line $I_6$ specifies whether the addressed DCA is to operate as an IDCA or an ODCA, and line $I_7$ specifies either an activation address or status poll address. When used for data transfer, input DCA's place data on line $I_1$ through $I_8$ and output DCA's receive data from these lines. Line $I_9$ is a spare line provided for future expansion. |
| OFCOO/ OFC10 | ON/OFF LINE CYCLE OSB11OZ | The ON/OFF LINE signal is generated continuously by the Device Scanner and provides time sharing of the bus **150**. The On-line condition allows addressing, address response, and On-line data transfers. The off-line conditions allows Off-line data transfer only. |
| DAC00/ DAC10 | ADDRESS/DATA OSB12OZ | The condition of this line specifies the content of the Information lines during On-line operation. The address condition allows all DCA's to recognize and respond to addresses on the information lines. The data condition allows On-line DCA's to transfer |

| | | |
|---|---|---|
| | | data over the information lines. |
| STB10/ STBOO | STROBE (OSB10OZ | The Strobe signal is generated by the Device Scanner during each ON-LINE and OFF-LINE cycle. This signal specifies the valid interval for all signals appearing on the SB. DCA's sample the Information, Idle, and Release lines during the Strobe Interval. This signal also provides timing for internal DCA functions. |
| BSY10/ BSY00 | BUSY OSB13OZ) | The Busy signal inhibits On-line activation of DCA's while the COMM DCA is in the quiescent (receive) state. It is also used for On-line address/status response, to inhibit On-line data timeout, and to prevent more than one IDCA from entering the Off-line mode. A signal on the Busy line inhibits address recognition in all IDCA's. DCA's addressed while in the Idle, Off-line, or On-line mode respond by generating a Busy signal. An Off-line IDCA will maintain a signal on the Busy line to prevent any other IDCA from entering the Off-line state. |
| IDA10/ IDA00 | INPUT DATA (OSB18OZ) | An activated IDCA will transfer a character to the Information lines and then maintain the Input Data signal on this line until a signal on the CONTROL line is detected. The activated IDCA then resets the Input Data signal until the next character is ready for transfer. Activated ODCA's will accept data from the information lines only when the Input Data signal is present. |
| RDY10/ RDY00 | READY (OSB17OZ) | Used to indicate that addressed DCA's are activated and to ackowledge single character transfer during On-line and Off-line operation. The Scanner senses the transition and generates a signal on the CONTROL line indicating |

| | | |
|---|---|---|
| | | affirmative response to an IDCA or COMM DCA. |
| SMC10/ SMC00 | INITIALIZE (OSB16OZ) | Used to interrupt all activity and initialize the terminal. The Initialize signal switches all DCA's to the Idle State. |
| CONOO/ CON00 | CONTROL (OSB19OZ) | Generated by the Device Scanner to indicate affirmative address response or Next Character Requested in response to a a change in state in READY line |
| REL10/ REL00 | Release (OSB14OZ) | The condition of this line determines when all DCA's in an On-line state will be switched to their ready state except for DCA's in the audit trail mode which remain in the On-line mode. |
| | | ON-LINE IDCA's change the condition of this line to indicate transmission of an input data transfer operation when the system is operating in the batch mode. |
| | | The device scanner changes the condition of this line to indicate to an IDCA the termination of an input data transfer operation when the system is operating in the block mode. |
| IDL10/ IDL00 | Idle (OSB15OZ) | The conditions of both the Idle and Release line are used to deactivate DCA's by switching them from the on-line or other active state to the idle state. Both lines when switched to the same state will switch an IDCA from the on-line state to the idle state. Both lines when switched to the same state will switch an IDCA from the on-line state to the idle state. When the idle line is in a predetermined state, it will switch an ODCA in either the on-line or audit trail mode which has not generated a Ready response from that state to the state. ODCA's which have generated a ready response are switched to the ready state. |

As previously mentioned, the device scanner 100 interconnects with the various other portions of the system through the terminal bus 150. The lines which comprise the bus are shown in FIG. 2 and a description of the function each line performs is summarized in the above mentioned table.

In general, the standard bus 100 includes all required data and control signals with the exception of power and indicator lines. The bus 150 represents binary information by two direct current levels (i.e. two wire balanced system). Some of the lines are arranged for bidirectional transfers of information whereby a device may receive and transmit signals along the same line. More particularily, some (13) of the bus lines are employed in transmit operations such as transferring information to the COMM DCA, IDCA's or ODCA's and are designated as follows:

1. OSB010Z through OSB040Z;
2. OSB080Z through OSB020Z;
3. OSB140Z through OSB160Z; and,
4. OSB190Z.

Also some (14) lines including some of the above lines, are used for receiving information from the COMM DCA, CONTROL PANEL and/or DCA's and these lines are designated as follows:

1. OSB010Z through OSB080Z;
2. OSB120Z through OSB150Z; and,
3. OSB170Z through OSB180Z.

Referring to FIG. 3, it will be noted that each of the above transmit-receive lines are preceded and followed respectively by a block in the form of a logic circuit labeled LTR. This circuit, as shown, has a transmit or data input applied thereto and a gate input which determines whether the circuit operates as a transmitter or as a receiver. When operated only as a receiver, it is labeled LRE. This circuit may be conventional in design and comprise a pair of differential amplifiers. Also, this unit may take the form of a driver/receiver circuit invented by Nelson W. Burke disclosed in a copending application titled "Bidirectional Line Driver-Receiver Circuit" filed on Oct. 6, 1969 bearing Ser. No. 863,807, assigned to the same assignee named herein.

Moreover, it should be noted that as concerns the internal logic of this system a binary ONE corresponds to a positive voltage level (e.g. 5 volts) while a binary ZERO corresponds to low voltage level (e.g. 0 volts). In the system when none of the devices connected to the bus have enabled their transmitting circuits the bus lines are at zero volts level. Accordingly, each of the internal logic levels are inverted before they are applied to the LTR circuit and they are inverted after they are received from an LRE circuit. Therefore, in this arrangement a binary ZERO is defined as a ZERO volts level on the bus and a binary ONE is defined as a negative voltage level (−2 volts).

The device scanner 100 as shown by FIG. 3 also receives inputs from a control panel 116. The controls which are important to the operation of the device scanner 100 include a BATCH/BLOCK switch and an INITIALIZE switch. As FIG. 3 shows, the BATCH/BLOCK switch when in the BLOCK position causes a function BAC10 to be generated while depressing the INITIALIZE switch produces the function SMCOM. For further details as to the other controls and indicators this panel could include, reference may be made to the article titled "H-2440 Remote Transmission Terminal" which appears in Volume Four-Number Two issue of the Honeywell Computer Journal, Copyright 1970.

Before referring to the logic diagrams herein, it should be noted that in order to facilitate the explanation of how various gates and storage elements are enabled and are switched, Boolean or logic equations are given either together with the logic or in place of the logic. It will be evident that these equations may be implemented using AND and OR gates or equivalents thereof wherein the dot symbol (.) indicates the use of an AND gate and the plus, (+) indicates the use of an OR gate.

It will be noted that most of the flip-flops disclosed are clocked or synchronous flip-flops and are designated by a diamond shaped block in the drawings. These symbols and other symbols for AND gates, OR gates amplifiers, inverters and storage devices are summarized in FIG. 6.

Figure 6:
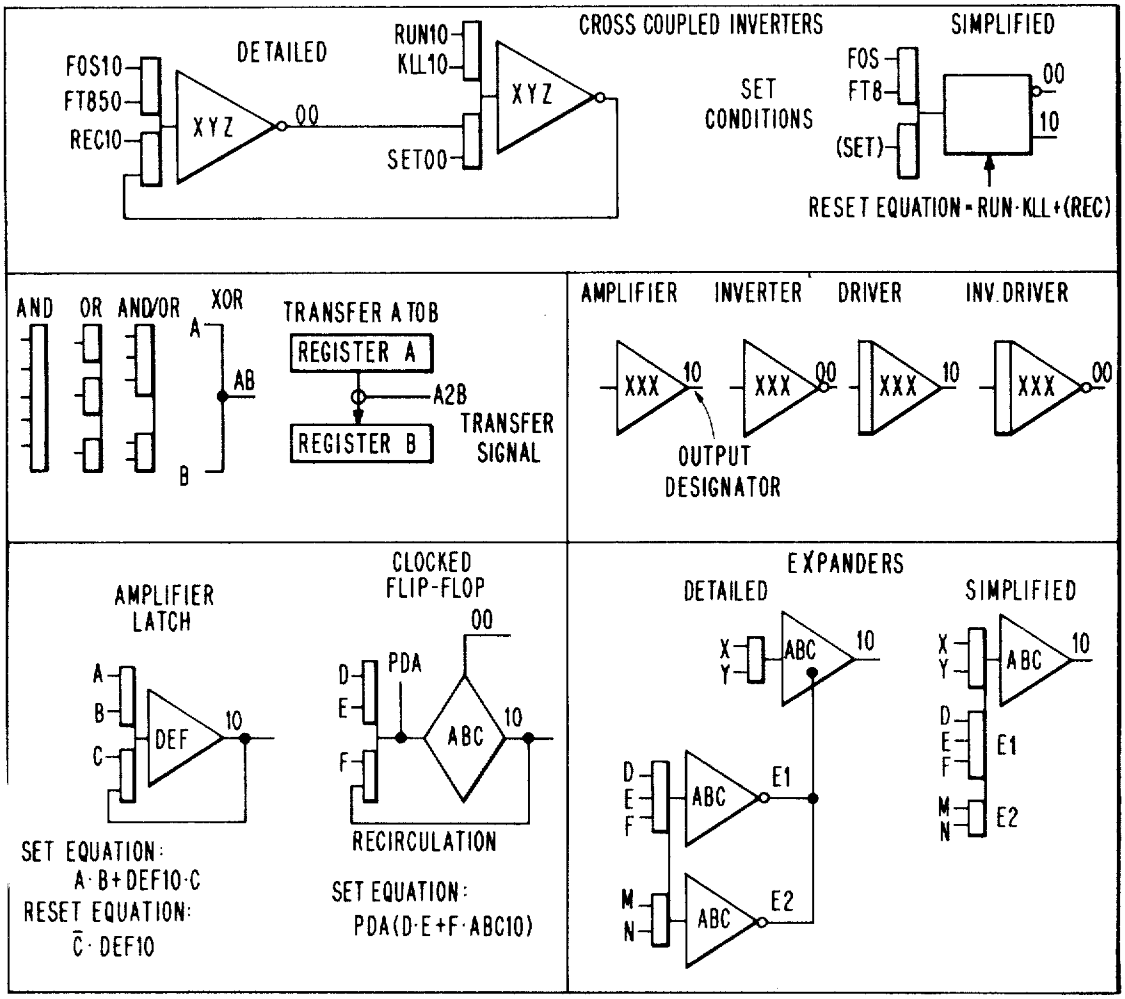
FIG. 6 illustrates the symbols used in the logic diagrams herein.

Referring to FIG. 6, it will be noted that the set and reset equations are given for the various types of flip-flops storage elements (i.e. those SFF, amplifier latch etc). Further, it will be noted that the "ONE" output terminal of a flip-flop is designated by a 10 while the "ZERO" output terminal of the flip-flop is designated by a 00. Also, double lines and single lines are used in the Figures to indicate single and multi-conductor lines respectively. The gating functions or transfer functions are designated by a circle around the conductor or conductors they enable.

DEVICE SCANNER LOGIC SECTIONS

Introduction

FIG. 3 shows the various functions applied as inputs to the device scanner 100 and its major sections. Additionally, FIG. 3 shows the various output functions generated by its sections.

SCANNER TIMING SECTION

The device scanner 100 establishes the overall timing for the terminal system. The scanner's timing section as shown in FIG. 3 includes a Frequency Divider Logic Section 224, a Bus Clock Timer Section 228, and On/Off Line Bus Cycle Logic Section 220.

The Frequency Divider Logic Section 224 controls the frequency, or more specifically, the time periods of the ON-LINE and OFF-LINE bus cycles. In the present system, each cycle is of the same duration and can be varied by switches from 50.4 to 403.2 microseconds.

It will be appreciated that the device scanner 100 time shares the standard bus 150 between the basic terminal operating modes (i.e. local transfers and remote transfers) by generating a continuing sequence of these ON-LINE and OFF-LINE cycles by switching of the state of the function RMOFCOO applied to bus line OSB110Z.

This section includes a master oscillator and synchronous flip-flop divider network for generating in a conventional manner, the desired with clock pulses herein referred to as PDA pulses. The PDA pulses are fed to the various logic elements of the system for synchronizing the operation thereof.

Additionally, the PDA pulses are fed to a further divider network, the outputs of which are used to define the time duration of the aforementioned ON-LINE and OFF-LINE cycles. In its simplest form, the divider network includes a six bit synchronous counter including stages DV1 through DV6 which are resettable through switches connected at its various stages. Accordingly, different settings of these switches divide the input clock frequency by different amounts thereby establishing a number of different time intervals or periods for the ON-LINE and OFF-LINE cycles as described herein.

As shown by FIG. 3, the selected width pulse output of the Frequency Divider Logic Section 224 is fed along line 226 to the Bus Clock Timer Section 226. This section includes an eight bit shift register whose stages are designated BC1 through BC8 and whose outputs are used to generate the ON-LINE/OFF-LINE bus cycles, a bus cycle strobe designated as function BC500 and other timing functions including RMBC110, RMBC0100, RMBC310, RMBC410, RMBC510, RMBC610, and RMBC810 used for synchronizing the operation of the internal logic of the scanner 100. Accordingly, the logic section 228 divides each ON-LINE and OFF-LINE cycle into a number of time slots or intervals which are defined by the above mentioned functions. In greater detail, the normal bus cycle time of 50.4 microseconds is divided into two alternating periods of 25.2 microseconds. Each 25.2 microsecond period is divided by the Clock Section shift register into seven equal intervals of 3.6 microseconds. The timing function RMBC810 of the Bus Clock Timer is fed to the Bus Logic Section of FIG. 3*a*.

Figure 3A:
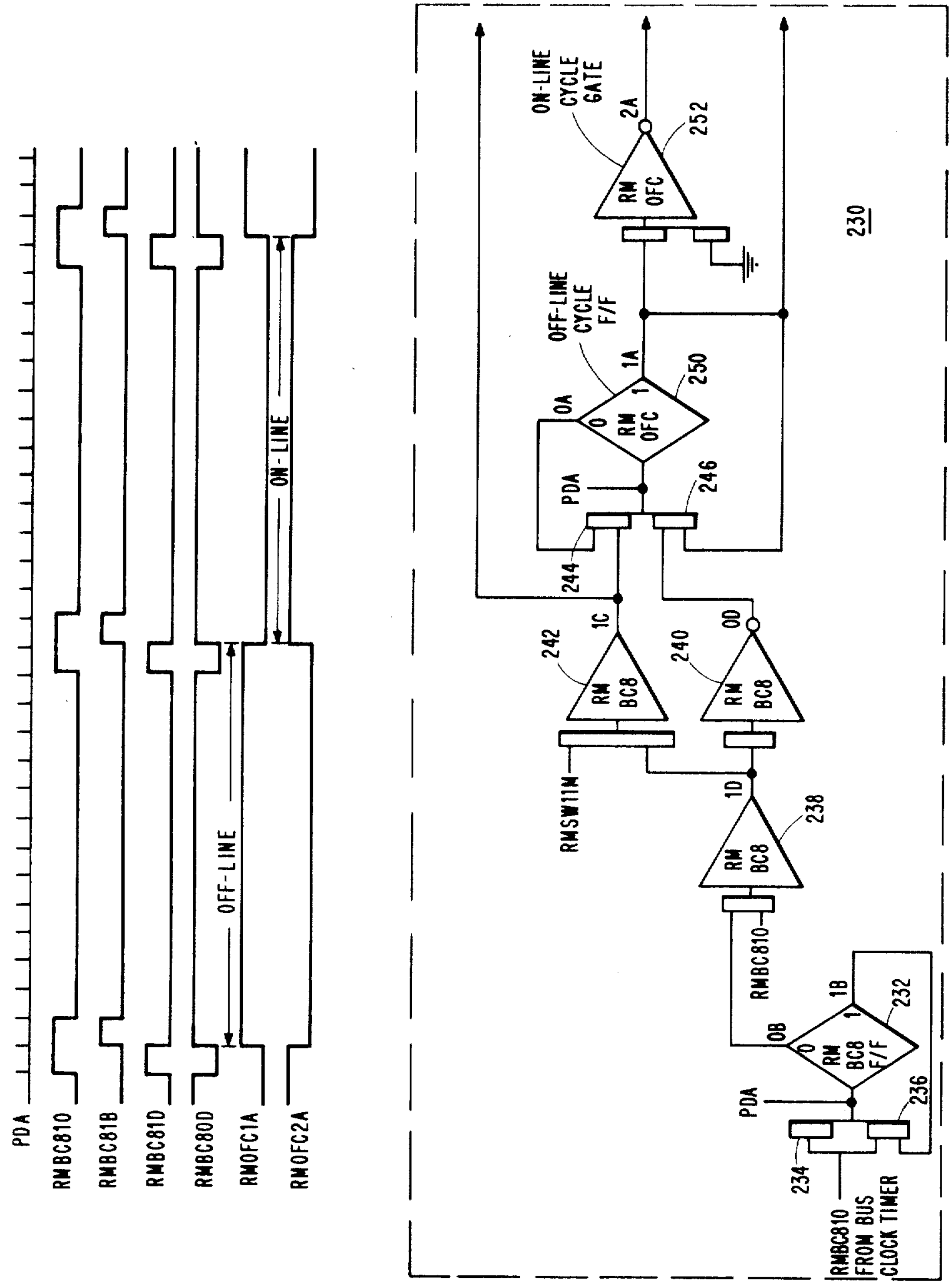
FIG. 3a shows in greater detail the timing logic of FIG. 3.

As shown by FIG. 3*a*, the Bus Logic section 230 includes a flip-flop 232 with set and reset AND gates 234 and 236, an OFF-LINE/cycle flip-flop 250 with AND gates 244 and 246 gate buffer amplifier (GBA) stages 238 and 240, and gate buffer inverter (GBI) stages 240 and 252. In operation, when Bus Clock Timer section 228 forces the function RMBC810 high, applied via line 229, this resets flip-flop 232 to its ZERO state which generates the function RMBC80B. The presence of RMBC80B and RMBC810 forces an output RMBC81D which stays high for one clock period or PDA when flip-flop 232 is set to its ONE state via its recirculation gate 236.

During normal operation, the divider switch is in a normal position which forces function RMSW11M high. The functions RMSW11M and RMBC810 enable AND gate 242 which in turn forces RMBC81C high which sets OFF-LINE cycle flip-flop 250 to its "ONE" state. The function RMBC80D generated by recirculation gate 246 serves to hold cycle flip-flop 250 in its "ONE" state until it resets at the next time function RMBC810 comes high. The ON-LINE Bus cycle function is generated by inverting the "ONE" output RMOFC1A of the flip-flop 250. The timing relationships between the functions discussed above are as shown in the timing diagram of FIG. 3*a*.

Figure 3B:
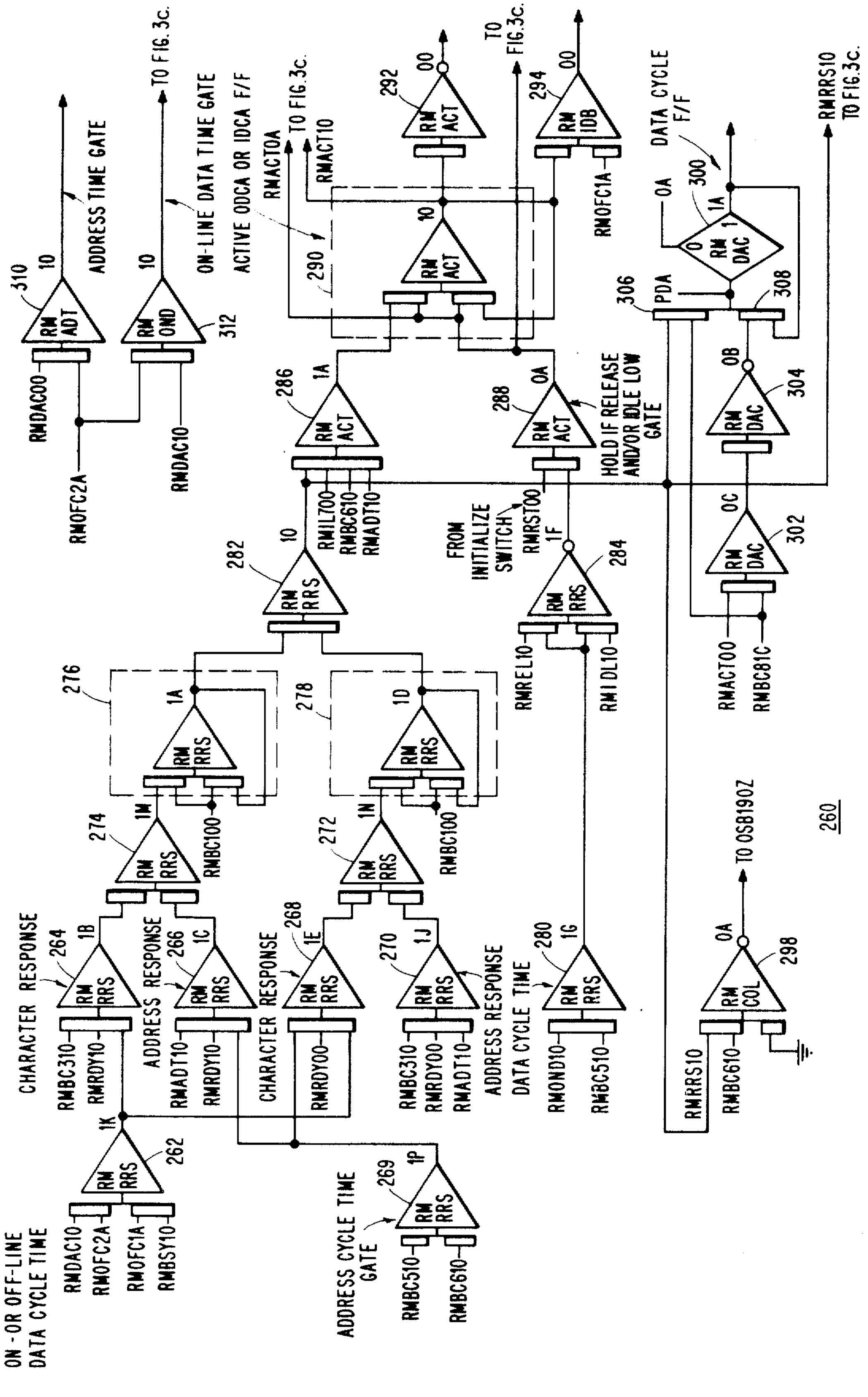
FIG. 3b shows in greater detail the address/data response logic of FIG. 3.

SCANNER SYSTEM ADDRESS LOGIC OF FIG. 3b

General

When the terminal system operates "on-line", the device scanner 100 generates a four bit address code at outputs SC100-SC400 of a four bit counter 214 as shown in FIG. 3. As FIG. 3 discloses, these outputs are applied as inputs to the interface circuits LTR-1 through LTR-4 and then to lines OSB010Z, OSBO4OZ respectively. The address counter 214 comprises four flip-flop stages designated SC1 through SC4 which are series connected to form a conventional shift register counter 214 which generates up to 16 different address codes within a complete operative cycle. By coding an additional bus line OSB060Z as either a ONE or a ZERO so as to define either input or output device address code, the number of address codes is increased to 32.

The scanner address counter logic is continually advanced or incremented by a counter advance function SCS10 applied via an AND gate 212. In particular, when the Boolean logic statement RMADT10, RMACT00, RMBC81C is satisfied, this activates the AND gate 212 which forces function RMSCS10 high. At this time, the bit counter 214 advances to the next highest address code upon the receipt of a clock pulse PDA during an address time interval of the ON-LINE cycle. The function RMADT10 defines the address time interval of the ON-LINE cycle (when counter incrementing occurs) and is generated by the logic 260 of FIG. 3b as described herein. The scanner counter 214 stores this address contents until a following ON-LINE cycle at which time function RMSCS10 again comes high which increments the counter contents by one.

The generation of the advance function RMSCS10 is also conditioned by the fact that none of devices of the system have responded to the device address code applied to the bus lines during a previous address time interval of an ON-LINE bus cycle. This means that when either an input device or an output device responds to its address code, it forces address function RMADT10 high which in turn forces the output of an AND gate 212 low producing function RMSCS00. This function inhibits the incrementing of the address counter. Accordingly, the current four bit device address contents of the counter remained unchanged.

A portion of this logic generates function RMADT10 which establishes a time interval during which the device scanner 100 sends input device address codes over the bus 150 during ON-LINE cycles. From FIG. 3*b*, it is seen that an address cycle occurs when function RMADTI0 is forced high in accordance with the Boolean Statement: RMOFCIA·RMDAC00. The function RMOFCIA which defines an ON-LINE cycle is generated by the ON-OFF Line Bus Cycle Logic of FIG. 3*a* as mentioned above. The function RMDAC00 is generated by a data cycle flip-flop 300 as described herein below.

From FIG. 3*b*, it is seen that the binary ONE output, RMACTI0, of the flip-flop 290 is applied to an AND gate 294 which generates an allow scanner to send data to bus function RMIDB00. The state of this function determines when the address information is applied to the bus lines and whether the address information is to be received by an input device or by an output device. In particular, when flip-flop 290 is in its reset state, it forces function RMIDB00 low which permits the address bit contents of the address counter 214 to be applied via their respective line driver circuits LTR1-LTR4 to the bus lines during "ON-LINE" cycles (i.e. when function RMOFCIA is also low). When Active flip-flop 290 switches to its set or binary ONE state (i.e. indicating that there is an active input device IDCA or output device ODCA), it forces function RMIDB00 high which conditions logic to remove the address code from the bus lines.

It will be also noted from FIG. 3 that the aforementioned logic 260 by establishing a predetermined level to the line OSB060Z conditions only input devices to decode the address code applied to the bus. That is, only when line OSB060Z is in a predetermined state will input devices be conditioned to respond to their address codes. This arrangement allows the device scanner 100 to time share the bus between on-line and off-line system data transfer operations which involve input devices.

Also during each address time interval defined by function RMADTIO, the AND gate 270 is operative to force an address response function RMRRSIJ to a ONE when a ready line function RMRDY00 is at a high level during a time defined by timer function RMBC310 (i.e. before the system devices sample the address code applied to the bus). This function activates an AND gate 272 which forces function RMRRS1N high which causes flip-flop 278 to be set to its binary ONE state.

It will be noted that a further address response AND gate 266 receives function RMRRS1P from an AND gate 272 which is enabled during time intervals BC510 and BC610. Additionally, the AND gate 266 also receives function RMADT10 together with a ready function RMRDY10. Normally the addressed device responds to its address code by switching ready function RMRDY10 from a low to high state during time RMBC510. Accordingly, AND gate 266 forces function RMRRS1C high which sets a flip-flop 276 to its ONE state via a gate 274 forcing function RMRRS1A to a ONE. The Scanner 100 generates an address or character response pulse to a change of state in the ready line when functions RMRRS1A and RMRSS1D are both ONES by activating an address or character response AND gate 282. This gate forces function RMRRS10 to a ONE which in turn permits function RMCOL0A to force the bus control line OSB190Z low during time BC610. The control pulse produced serves to acknowledge the device's response to the address code placed upon the bus during that ON-LINE cycle. Both flip-flops 276 and 278 are reset at the beginning of the next bus cycle by timing function RMBC100.

Another portion of the logic of FIG. 3*b* establishes a period of time during which only data characters will be transferred over the bus 150 during "ON-LINE" and "OFF-LINE" bus cycles. This logic includes the data flip-flop 300 which is set to its ONE state in accordance with Boolean statement: RMDAC1A=RMRRS10·RMBC81C.

The flip-flop 300 is held in its ONE state by function RMDAC0B which activates a hold AND gate 308. As shown, function RMDAC0B is generated by amplifier gates 302 and 304 in accordance with the Boolean equation RMDAC0B=RMACT00·RMBC81C. Since this logic function is generated by the "NANDing" of functions RMACT00 and RMBC81C, the data cycle flip-flop 300 will remain in its binary ZERO state even in the presence of a set function RMRSS10 until the scanner 100 generates Device Active function RMACT10 when it detects a change in the ready function RDY00 produced by a system device in response to an address code.

Specifically, when a device responds to its address code function RMRRS10 comes high. This causes active ODCA/IDCA flip-flop 290 to switch to its binary ONE state which in turn forces function RMACT00 low. When the function RMACT00 goes low, it forces the hold function RMDAC0B high. Accordingly, at the next PDA pulse, the data cycle flip-flop 300 is switched from its binary ZERO state to its binary ONE state thereby producing function RMDAC10 which defines subsequent ON-LINE cycles as data cycles.

The DCA flip-flop 300 which will be held in its binary ONE state (i.e. a data cycle) until the scanner 100 receives a release (i.e. function RMREL10=1) during data cycle time (i.e. function RMOND10=1) and/or the terminal system is initialized (i.e. function RMRST00=0) by a switch on a control panel. At that time, flip-flop 290 resets to a ZERO forcing function RMACT00 high. At time RMBC81C, data cycle flip-flop 300 will be reset to its binary ZERO state by its hold function RMDAC0B being forced low which deactivates gate 308.

It will be noted that the ONE output of flip-flop 300 is applied to the driver interface circuit of bus line OSB120Z. This function is monitored by the various devices of the system and its state defines whether the information is an address code or a data character. When function RMDACOO is high the information on the bus is to be interpreted as address code and when function RMDAC10 is high the information on the bus is to be interpreted a data character.

In FIG. 3*b*, during data cycle time (i.e. when function RMDAC10=1) an AND gate 262 again is activated and forces function RMRR1K high in accordance with the Boolean equation: RMRRS1K=RMDAC10·RMOFC00+RMOFC10·RMBSY10. Accordingly, function RMRRS1K in turn activates character response AND gate 264 when the ready function RMRDY1O is high during a time defined by timer generated function RMBC310. The AND gate 264 forces function RMRRS1B high which in turn sets the flip-flop 276 to its ONE state.

When all of the devices have accepted the data character applied to the bus information lines, ready function RMRDY00 switches from a low to a high state. This in turn forces function RMRRS1E high which forces function RMRRS1N high, and switches flip-flop 278 to its ONE state. As described above the functions RMRRS1A and RMRRS1D together activate the AND gate 282 which in turn forces function RMRRS10 high. This activates gate 298 during time defined by timing function RMBC610 and produces a control pulse which is thereafter applied to bus line OSB190Z as shown in FIG. 3. The control pulse produced acknowledges the device's responses to their acceptance of the data character placed on the bus to the input device.

In summary, the scanner 100 generates address and character responses via the data cycle time and address cycle time AND gates 262 and 272 as results of changes in state of the function RMRDY00 which causes the appropriate conditioning levels to be applied to the character response gates 264 and 268, and address response gates 266 and 270 respectively.

Figure 3C:
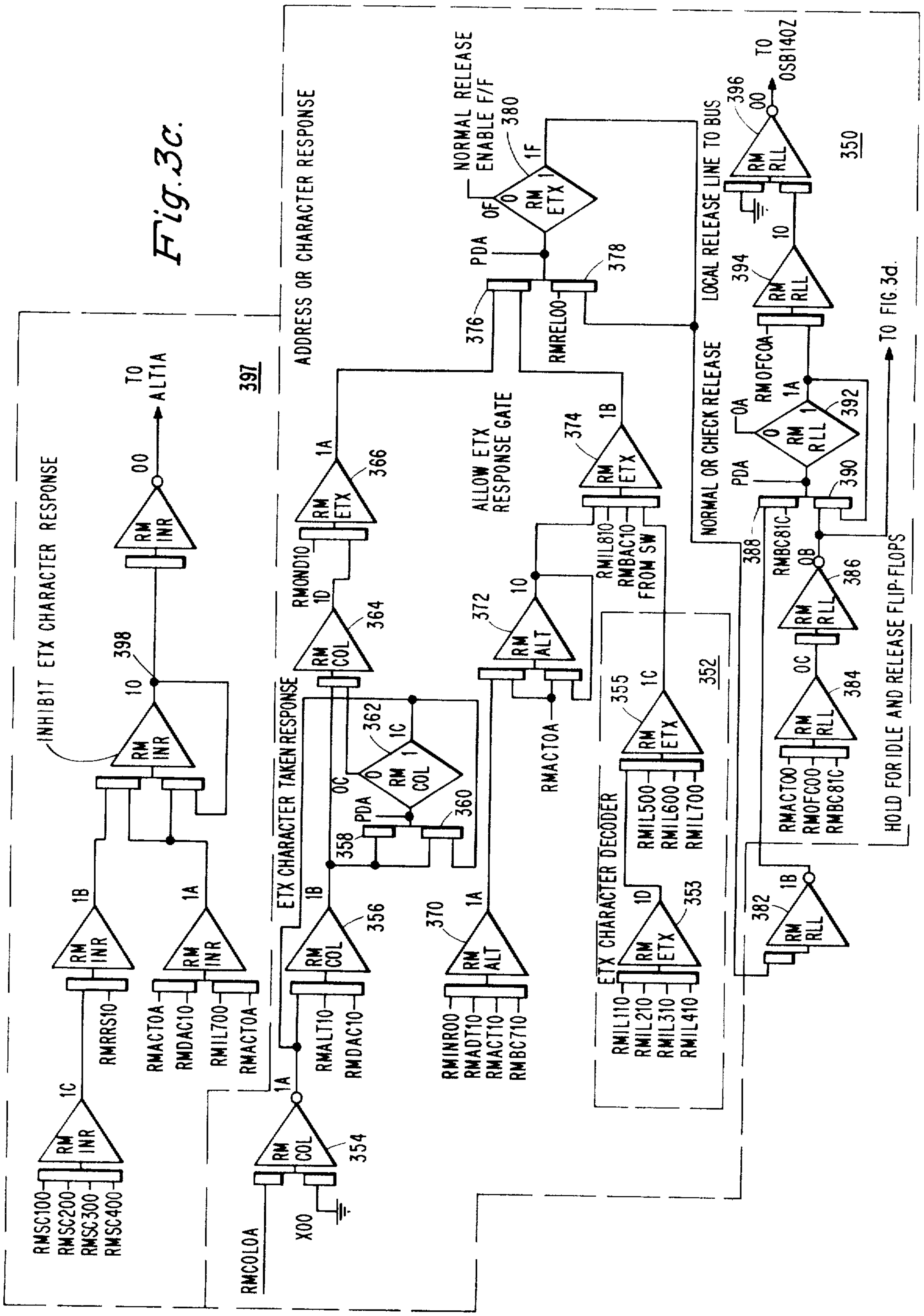
FIG. 3c shows in greater detail the normal release logic of FIG. 3.

SCANNER NORMAL RELEASE LOGIC-Figure 3*c*

When the system operates in the transaction (block) mode, the device scanner 100 is operative to detect the presence of a specially coded data character, an End of Text (ETX) character, which normally defines the end of a data block or segment. When all of the various devices of the system acknowledge receipt of the ETX character from the bus by causing a change in state in ready function RDY00 the scanner 100 generates a logic level on line OSB140Z which releases the input device which had been transferring data characters from the bus 150. The scanner 100 then increments its address counter 214 by one to the address code of the next input device to be addressed.

Referring to FIG. 3c, it will be noted that when the above mentioned transaction code is selected by placing the BLOCK/BATCH switch on the control panel to the BLOCK position it forces function RMBAC10 high. The AND gates 353 and 255 which comprise a decoder 352 will be enabled to decode the bits of an ETX character when received via bus lines 1L1 through 1L8. The function RMALT10 is a ONE when a flip-flop 372 switches to a ONE as follows. An Allow ETX Response AND gate 370 is forced to a ONE in accordance with the Boolean equation: RMALT1A=RMACT0A·RMACT10·RMINR00·RMBC710. The function RMINROO is a binary ONE when the scanner 100 is operating in other than a device polling mode/selection mode as described herein below. Accordingly, the function RMALTIA in turn sets an allow ETX response flip-flop 372 to its ONE state thereby forcing function RMALT10 to a ONE.

As shown in FIG. 3c, the function RMALT10 is applied as an input to a pair of AND gates 356 and 374 which generate the functions RMCOL1B and RMETX1B respectively. The function RM1L810 is a ONE when the parity bit of the ETX character is a ONE indicating correct parity. The function RMETX1B together with RMETX1A sets a Normal Release Enable flip-flop 380, to its binary ONE state.

The AND gate 366 which produces RMETX1A, as shown, receives the two input functions RMCOL1D and RMOND10. An On Line Data Time function, RMOND10, comes high when an AND gate 312 of FIG. 3b is activated during data cycle (i.e. function RMDAC10 = 1) and during an ON-LINE bus cycle (i.e. function RMOFC2A = 1). The AND gate 364 forces function RMCOL1D to a ONE when an ETX character taken Response function RMCOL1B comes high at a time defined by function RMCOL1C which comes high at the end of PDA pulse when flip-flop 362 switches to its ZERO state. Accordingly, functions RMCOL1B and RMCOL0C condition AND gate 364 to generate function RMCOL1D which is a clock pulse in width. This function when ANDed with function RMOND10 enables AND gate 366 to force the function RMETX1A to a ONE.

As mentioned above, the function RMINR00 is a ONE when the terminal operates in other than a device polling or selection mode. However, when the terminal operates in these modes, the logic block 397 will be operative to force function RMINR00 to a binary ZERO thereby inhibiting the scanner 100 from responding in the manner described above when it detects a ETX character applied to the bus. In particular, the function RMINR00 is forced to a ONE when a flip-flop 398 is in its ZERO state. From FIG. 3c it will be noted that the flip-flop 398 is forced to a ONE when the address code placed on the bus is all ZEROS and a device responds to this code by forcing function RMRRS10 to a ONE. This will in turn cause flip-flop 398 to be set to its ONE state when hold function RMINR1A is in its ONE state. As shown, function RMINR1A is forced to a ONE in accordance with the following Boolean equation:

$$\mathrm{RMINR1A} = \mathrm{RMACT0A} \cdot \mathrm{RMDAC10} + \mathrm{RMACT0NA} \cdot \mathrm{RMIL700}.$$

The function RMACT0A, generated by the logic circuits of FIG, 3c, is normally a ONE subsequent to the system being initialized until either the system is cleared, the device is released, or an IDLE condition is generated. Accordingly, during an address cycle, the function RMINR1A will be a ONE when bit 7 of the address code placed on the bus is a ZERO indicative of a request for data in contrast to status request. And, during the data cycle, function RMDAC10 is a ONE, function RMINR1A will remain in its ONE state until function RMACT0A is forced to a ZERO.

As explained herein, the function RMINR10 will not be switched to a ONE in the absence of the device responding to the ZERO address code applied to the bus 150. Accordingly, the function RMINR00 is forced to a ONE which in turn forces flip-flop 372 to its ONE state when the address input device responds to its address code by forcing function RMACT10 to ONE.

As mentioned previously, functions RMETX1A and RMETX1B enable AND gate 376 which switches the Normal Release Enable flip-flop 380 to its ONE state. This flip-flop remains in this state until its hold gate 378 is deactivated by function RMREL00 being forced low. The function RMREL00 goes low when either the release flip-flop 392 is switched to its binary ONE state or an input device generates a release response by forcing line OSB140Z to a ONE. The flip-flop 392 switches to a ONE when the RMETX1F of the Normal Enable Release flip-flop 380 comes high which activates an AND gate 382. This gate forces release function RMRLL1B high via AND gate 388 switching the release RMRLL flip-flop 392 to its binary ONE state. This in turn forces the output function RMRLL10 of AND gate 394 high which is inverted by a gate buffer inverter 396 and applied to line OSB140Z as function RMREL00. The input device which was transmitting data characters to the bus 150 will release itself in response to the change in state in this function as described herein. The next major areas of the system include the Device Control Area (DCA), which will now be described.

IN GENERAL

As illustrated by the system block diagram of FIG. 1, each device has a peripheral control unit termed a DCA which has a GDCA which includes logic for a standard interface between the DCA and bus 150 and a buffer memory. As shown by FIG. 1, the system includes several different types of device control areas and these are labeled IDCA, ODCA, and I/ODCA.

An IDCA provides logic, buffer storage, timing and interface circuits for communicating with the terminal bus 150 and controlling the operation of its associated input device. In particular, an IDCA includes logic operative to transfer information characters via its general device control area (GDCA) to the terminal bus for receipt by an output device or through the COMM DCA to either another remote transmission terminal or to a data processing system. Accordingly, an IDCA performs the following functions:

- decodes and recognizes an address wired therein when applied to the bus 150 by the terminal scanner 100; acknowledges the receipt of an address code via a switching of ready function RMRDY00;
- loads a first data character from its associated buffer register on to the bus 150 and thereafter generates a data line signaling same;
- places a next character into its buffer register upon detecting a predetermined control pulse (RMCON00);

reads, transfers and ignores predetermined characters and;

switches to an inactive state in response to a level placed on the release line by the device scanner 100 when it detects an ETX character on the bus.

Output Device Control Area (ODCA)

The ODCA similarly provides timing, storage, logic and interface circuits for transfers between the standard bus and its associated peripheral device. It performs logic functions comparable to the IDCA with the exception that it performs them for an output device. Therefore, the ODCA accepts a data character when the device scanner places a bus strobe on the appropriate line and it signals via ready line function RMRDY00 when it is conditioned to receive the next character and thereafter stores the received data character in its memory.

Input/Output Control Area (I/ODCA)

The above unit can be considered as a combination of an IDCA and ODCA. It is used as both an input device control area and an output device control area. Whether it operates as either an input or output device is established by the state of bit 6 of the device address code placed on the bus together with the setting of an associated function switch. In particular, when bit 6 is a binary ONE, the I/ODCA will function as an IDCA. And, when bit 6 is a binary ZERO, it operates as an ODCA.

General Device Control Area (GDCA) Logic

Figure 7:
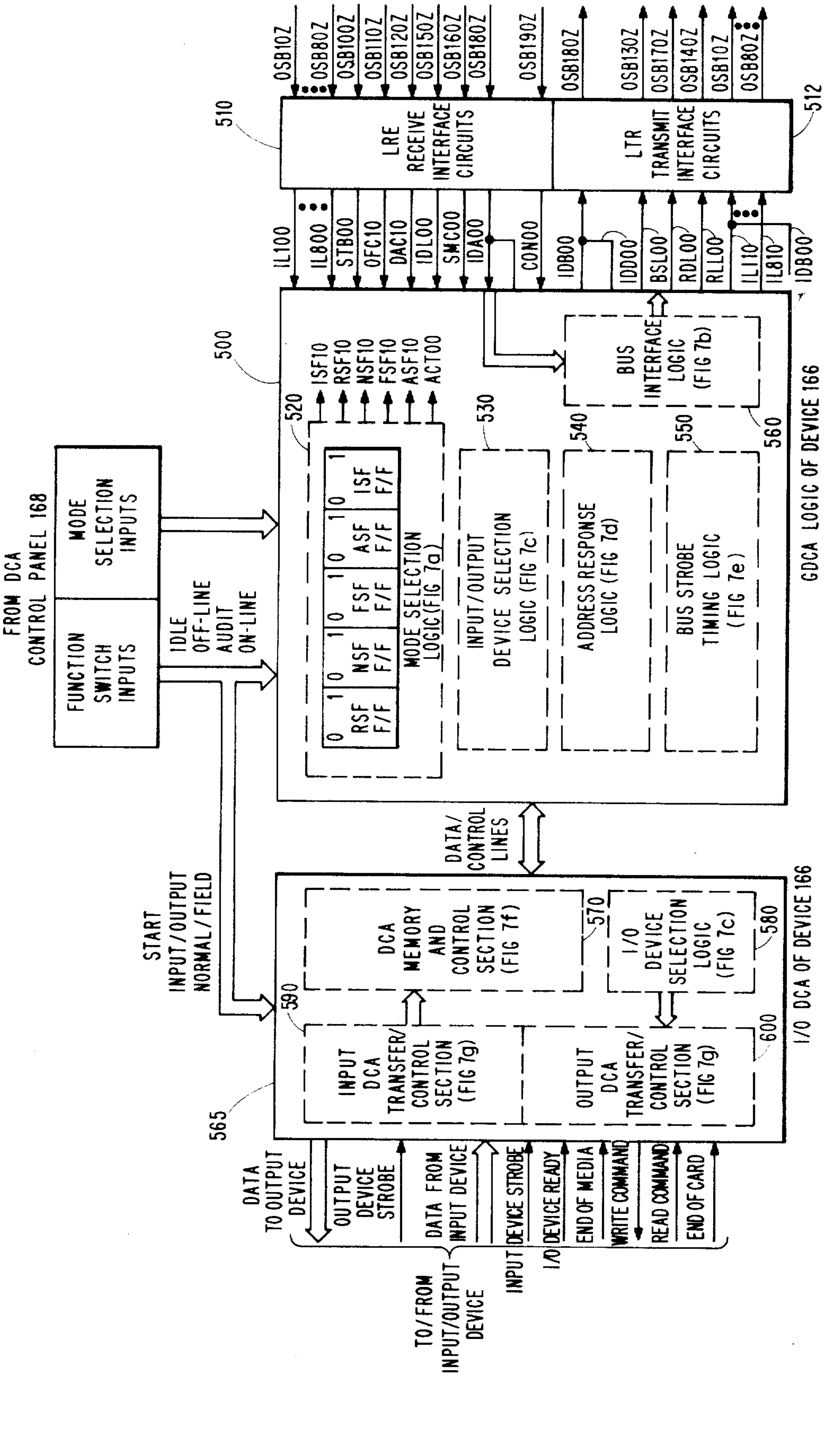
FIG. 7 is a block diagram of one of the device control areas of FIG. 1.

Each DCA, as mentioned, has a GDCA section which provides a uniform logic interface to the terminal bus 150. FIG. 7 illustrates in block form the pertinent sections of the GDCA logic. As shown, the GDCA includes a Mode Selection State Logic Section detailed in FIG. 7*a*, an Address Response Logic Section detailed in FIG. 7*d*, Input/Output Device Section Logic detailed in FIG. 7*c*, Bus Strobe Timing Logic detailed in FIG. 7*e*, and a Bus Interface Logic detailed in FIG. 7*b*.

In some instances, the logic of the various portions of a DCA has not been separated as this would require additional references to other Figures. Therefore, the following mnemonic prefixes have been used for logic functions generated by the various portions of the system for denoting that portion which generated same. The prefixes used are:

OS=Standard Bus Signal Lines;

IF=GDCA Internal Logic Functions;

IG=GDCA to Bus or to Control Panel Interface Logic Functions;

IH=Bus to GDCA Interface Logic Functions;

RX=DCA Logic Functions; and,

RP=Peripheral Device Logic Functions.

MODE SELECTION LOGIC OF FIG. 7*a*

General Description of Device Operational Modes

It will be noted that FIG. 7*a* discloses the storage and the logic which establishes the various operating modes, as well as states, for a GDCA.

The GDCA can operate in one of several modes depending upon the position of a control panel mode selection switch and bus conditions. A mode switch is associated with each peripheral device. With the mode switch in conjunction with a START button, an operator can select among the operating modes available to a particular device. These modes are defined by the states of clocked synchronous flip-flops of FIG. 7*a*. These flip-flops may be arranged to drive indicator lights which display the status of each of the devices operating. The operating modes and states and their respective functions are:

| | Modes | Functions |
|---|---|---|
| (1) | Idle | =IGISF10; |
| (2) | Ready | =IGRSF10; |
| (3) | On-Line | =IGNSF10; |
| (4) | Off-Line | =IGFSF10; and |
| (5) | Audit Trail | =IGASF10. |

Figure 4:
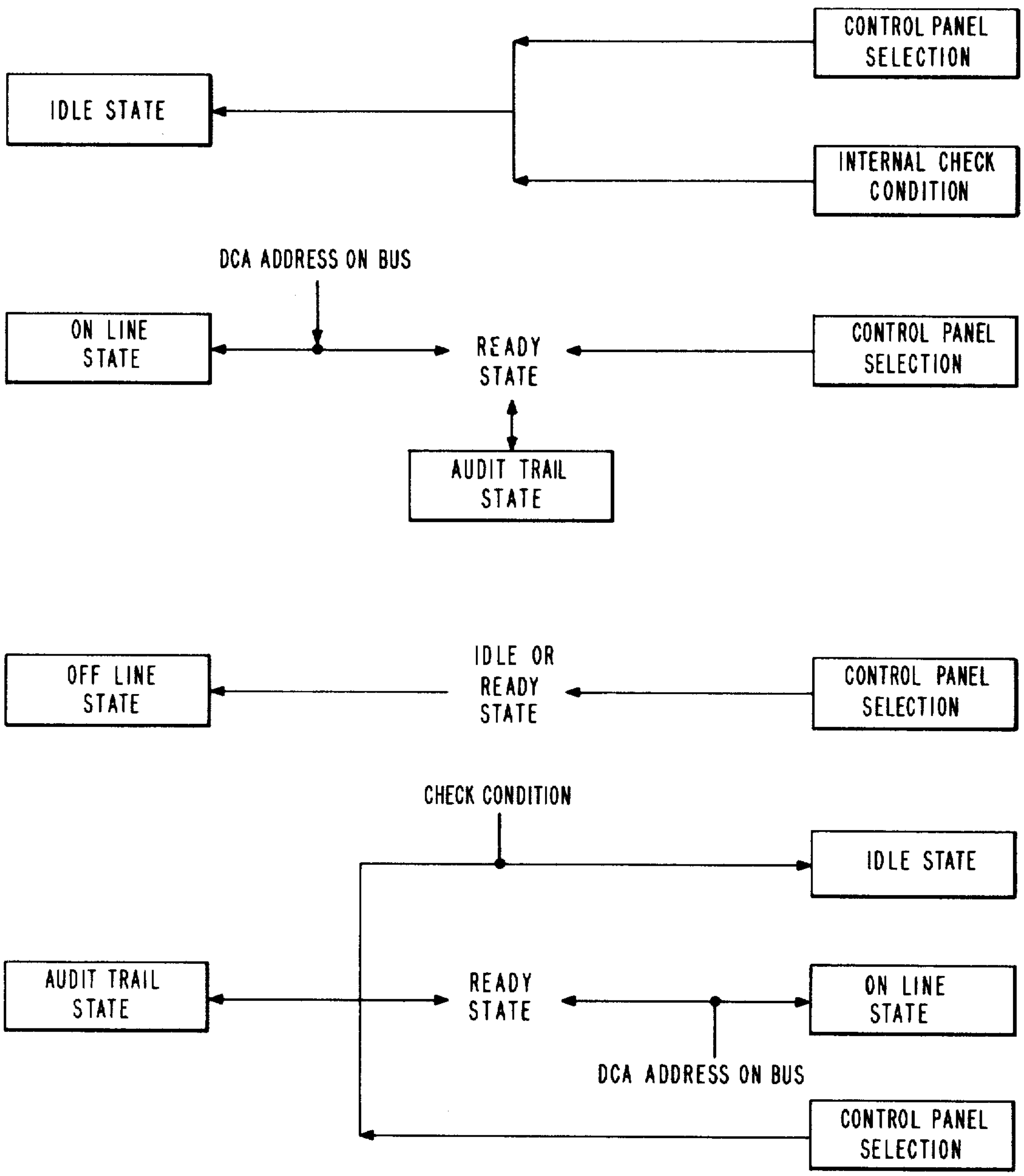
FIG. 4 is a flow diagram of the operating state selection of a typical device control element (DCA) of FIG. 1.

The sequence of states for establishing the operating modes for the various DCA's are illustrated in the flow diagram of FIG. 4. With reference to this Figure, the operational states will now be described briefly. The GDCA switches to the idle state when an operator manually selects the idle position on the control panel mode switch or the GDCA detects an internal check condition. When a device is in the idle mode, AC power is removed from the device and the device is unavailable for either on-line or off-line processing. Hence, while in the idle mode, the device can be considered as being in an inactive state. Accordingly, when addressed, the device will signal busy via bus line OSB130Z.

By contrast, when in the on-line, off-line or audit trail, the device can be considered in an active state.

Prior to entering the on-line mode, the device first switches to the ready state. This state is an intermediate state which is entered when the operator sets the mode switch to the On-line position and depresses a START button. Also, as FIG. 4 illustrates, the GDCA switches to this state when it completes a data transfer when it receives a normal release from the scanner 100. When in this state, AC power is applied to motors associated with the device. This state permits the device to be polled or selected via its GDCA prior to entering the on-line mode. That is, with a function switch set to the on-line position the GDCA upon detecting its address code will switch to the on-line mode.

As mentioned, the GDCA switches to the on-line operation state when it detects its address code on the bus. Additionally, the device may enter the on-line state from the audit trail state when the mode selection switch is in the audit position and the device's address code appears on the standard bus as indicated by FIG. 4.

In the on-line mode, the IDCA/ODCA transfers and accepts respectively data and control characters only during ON-LINE bus cycles.

As FIG. 6 illustrates, the GDCA may terminate on-line mode operation under the following conditions:

1. When the device scanner 100 generates a level on the release line and the DCA generates a ready signal, the DCA switches from the on-line to the ready state;
2. In response to internal check conditions or upon the receipt of a release from an input device, the DCA switches from an on-line to the ready state; and,
3. When the DCA receives a release signal and generates a ready response, it switches from the on-line state to the audit trail state.

Similarly in the off-line mode, the IDCA/ODCA transfers and accepts respectively data and control characters only during the OFF-LINE bus cycles.

As indicated by FIG. 4, the DCA enters the off-line state when the mode switch manually selects the off-line position while it is in either the idle state or ready state. Also, upon receipt of a ready signal followed by a bus release signal, the DCA when in audit trail state switches to the off-line state. The GDCA terminates the off-line state when another state is selected by the mode switch and when the DCA generates a ready response. While, in this mode, an IDCA can transfer data to one or more ODCA's and their associated devices when each ODCA is set to the off-line mode.

Additionally, when in the audit trail mode, output devices through their respective ODCA's can monitor and accept all data characters which are applied to the bus. This state is manually selected and is only utilized by output device control the areas (ODCA's) and their associated devices. And, when its address code appears on the bus, the ODCA responds with a ready signal and then enters the on-line state. The mode switch may be used to switch the ODCA from the audit trail mode to any other operational mode. Switching occurs when the ODCA receives a ready signal from its device.

The ODCA will switch from the on-line state to the audit trail mode following its receipt of a release response and a ready response from the bus. Also, the ODCA will terminate operating in the audit trail mode upon sensing a check or error condition at which time it will switch to the idle mode.

FIG. 5 shows in greater detail, the pertinent control functions, their states and changes therein for the above-mentioned change in modes. These functions provide inputs to the logic and state storage of FIG. 7*a*. They will be discussed in greater detail with respect to this Figure.

Bus Interface Logic Section-Figure 7*b*

This section includes the Bus Input Data Line transmit logic block 751 for input and output devices respectively. The transmit logic shown in block 751 includes a pair of gates inverter amplifier gates 752 and 756 operative to generate functions IFIDB00 and IFIDD00 for an input device as defined by function IGINPIO as described herein. When an input device places a character on the bus 150, it forces functions IFIDB00 and IFIDD00 low. This forces line OSB180Z to a ZERO which enables the IDCA to apply a data character from its memory to the bus lines OSBO10 through OSB090.

The logic of block 761 generates a transfer function IHSTL10 for an output device in response to function IFIDA10 being switched to a predetermined state. In particular, when an active IDCA transfers a data character to the bus lines, it forces the Input Data Line function IFIDA10 high by forcing line OSB180Z to a ZERO. The function IFWBT10 comes high in accordance with the Boolean equation: IFWBT10=IFDRF1C·IFOFC00+IGFSF10 IFOFC10. This function defines the "working bus time" for each ON-LINE and OFF-LINE bus cycle during which the actual data character transfer occurs within each DCA.

The bus data line receive logic 761 for an output device in response to the presence of function IDA00, forces function IGGSTIO high by activating an AND gate 762 which in turn generates transfer function IHSTLIO when output device functions RXPOSIO, RXCLDOO and RXPDYIO are all ONES. The Boolean equations for each of these functions are given in the FIG. 7*b*.

Figure 7D:
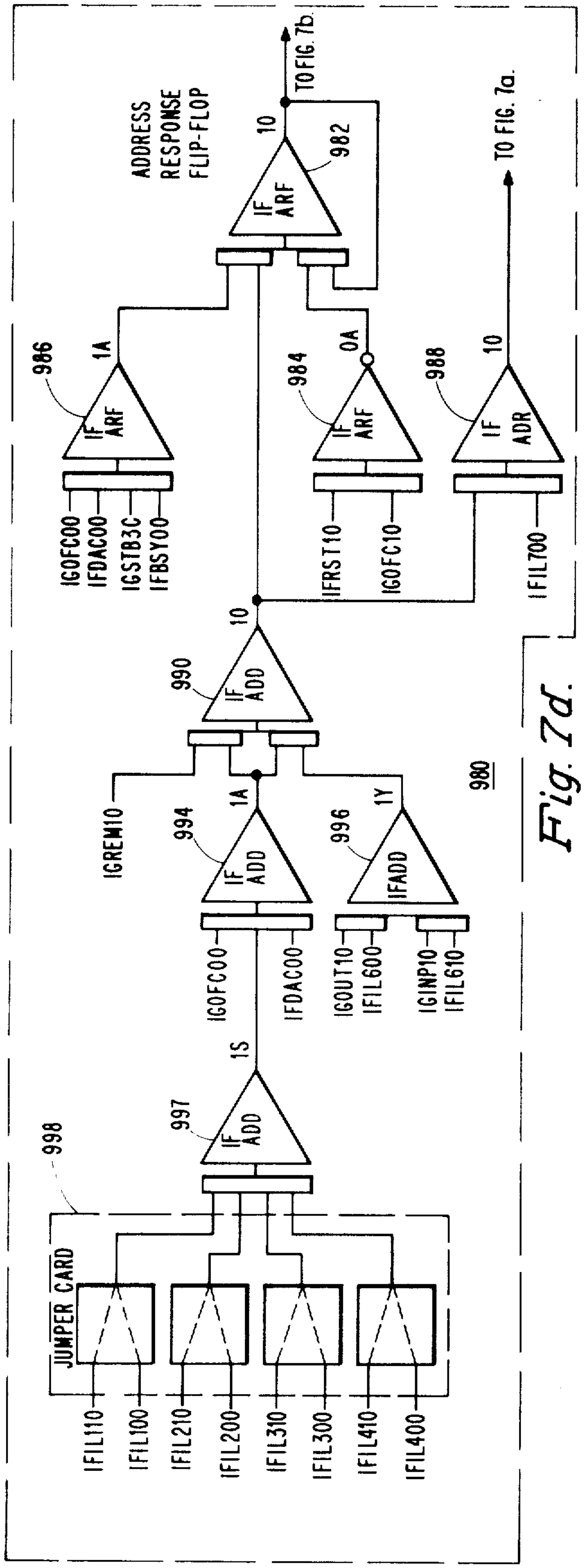
FIG. 7d shows in greater detail the address response logic of FIG. 7.

Further, this section includes logic of blocks 770 and 780 for generating a bus busy response and ready response on bus lines OSB130Z and OSB170Z respectively. A state of the function applied to line OSB170Z indicates whether the addressed DCA has been activated. The DCA devices when addressed in a ready or audit trail state respond by changing the state of ready function IFRDYL00. In particular, amplifier gates 778 and 786 together with flip-flop 784 condition bus lines OSB170Z via inverter amplifier gate 782 to signal a ready upon decoding its device's address code applied lines IFIL100 through IFIL600. The function IFBSR1A generated by an AND gate 788 comes high when there are no check or error conditions (IFCHH00=1), during an address cycle time (IFDAC00=1) portion of an ON-LINE cycle (IFOFC00=1) and when its address response (ARF) flip-flop 982 of FIG. 7*d* is set to its one state (IFARF10=1). If the device is in either its ready state (i.e. IGRSF10=1) or audit trail state (i.e. IGASF10=1), function IFARL10 comes high in turn switching flip-flop 784 to a binary ONE. This in turn forces function IFRDL00 from a high to a low state and this function is applied to line OSB180Z. The ARL flip-flop 784 switches to a ZERO during the following OFF-LINE cycle (i.e. function IFOFC00=0).

The GDCA logic 780 also generates a ready response for an output device via OSB170Z via gates 792 and 790. That is, the response is generated for each data character accepted by a selected output device (IFDRL1A=IGOUT10), during the working bus time (IFWBT10=1) of a data cycle (IFDAC10=1) when the ODCA previously in a condition of ready to receive a data character (IFDRF10=1) completes writing the data character from the bus 150 into its memory (IFDRF10=0). This causes function IFRDL to be switched from a high to low state switching the ready line from a high to low state. Also the logic 780 includes a transfer gate 794 which enables the IDCA of a selected input device to apply a data character read from its memory to the bus. That is, when the DCA is selected to operate as an input device (IGINPIO=1) and has read a data character from its memory (IFDRF10=1), it will activate an AND gate 794 to force output to bus transfer function IFOTB1A high. This enables the IDCA to apply a data character to the bus 150.

When the DCA is in either an off-line or idle state as defined by functions IGFSF10 and IGISF10 respectively, it will generate function IFBSRIO via an AND gate 778 which in turn forces bus line OSB130Z low. This allows the device to respond busy when the scanner 100 places its device address code on the bus. Additionally, the GDCA also generates a busy response via gates to the address code of an input device (IGINP10=1) when the input device is in the off-line state (IGFSF10=1).

Another group of logic in FIG. 7*b* includes a Normal Release Memory flip-flop 806 with associated logic gates. The one output of this flip-flop is fed to the mode state logic of FIG. 7*a* and will cause the state of the active DCA to be changed when the functions IFREL00 and IFIDL00 are forced to predetermined states by either the device scanner 100 or the active DCA itself.

In greater detail, when the release function IFREL00 is forced low it activates an AND gate 810 which produces function IFNRMIO. And, during an ON-LINE bus cycle (IFOFC00=1) upon the receipt of a strobe pulse (IGSTB3C=1), IFNRM flip-flop 806 switches to its binary ONE state. This forces function INFRM10 high which in turn forces function IFNCR10 high by activating a pair of gates 804 and 802.

An AND gate 828 is activated during an OFF-LINE cycle to switch flip-flop 806 to its ZERO state when its associated DCA has been switched to the idle state (IGISF1O=1), or the audit trail state (IGASF1O=1) or to the ready state (IGRSF1O=1). Switching is accomplished when the above functions force function IFNRMOC to a ZERO which inactivates the hold gate of flip-flop 806.

Last group of logic in this section includes the group of gates and a flip-flop 846 of block 840 which feed bus line OSB140Z. The device DCA uses this line to indicate a termination of input data transfer when it is out of media (e.g. out of forms/cards or reached an inter-record gap). When this occurs, function IHOOF10 comes high when the device DCA is operating in the On-Line state (IFNSF10=1). This causes RLF flip-flop 846 to switch to a binary ONE. During an on-line cycle (IFOFC00=1), the selected input device (IGINP10=1) forces function IFRLL10 high by activating an AND gate 844 in turn forcing the bus line OSB140Z low via an inverter gate 842. This signals that the DCA is releasing its input device from the bus 150.

The logic circuits which process signals from its associated input device as for example a card reader, indicating when it is out of media (e.g. cards) are also shown in block 870 of FIG. 7*b*. Here, the card reader device generates a function RPOFFOO when it senses a hopper empty condition establishing the above mentioned out of media indication. Referring to this Figure, it will be noted that an out of form (IHOOF) flip-flop 890 is initially switched to its ZERO state by an initialize function RXSTA30 when the device DCA is in its idle state (IGISF10=1). Accordingly, upon receipt of the out of media function RPOFF00 from the card reader device, IHOOF flip-flop 890 switches to its binary ONE state when the last character stored in its memory (RXEOD10=1) applied to the bus 150 has been accepted (IGNEC10=1) by all of the output devices. In greater detail, a function RXOFB10 when ANDED with RXOFF10 by gate 886 forces the gate 886 output high switching flip-flop 890 to its ONE state.

When IHOOF flip-flop 890 switches to a binary ONE, function IHOOF10 comes high and activates an AND gate 848 producing function IFRLF1A which sets RFL flip-flop 846 to its ONE state. Thereafter, in the manner described above, the bus logic 840 is conditioned to generate the release function via bus line OSB140Z.

Figure 7C:
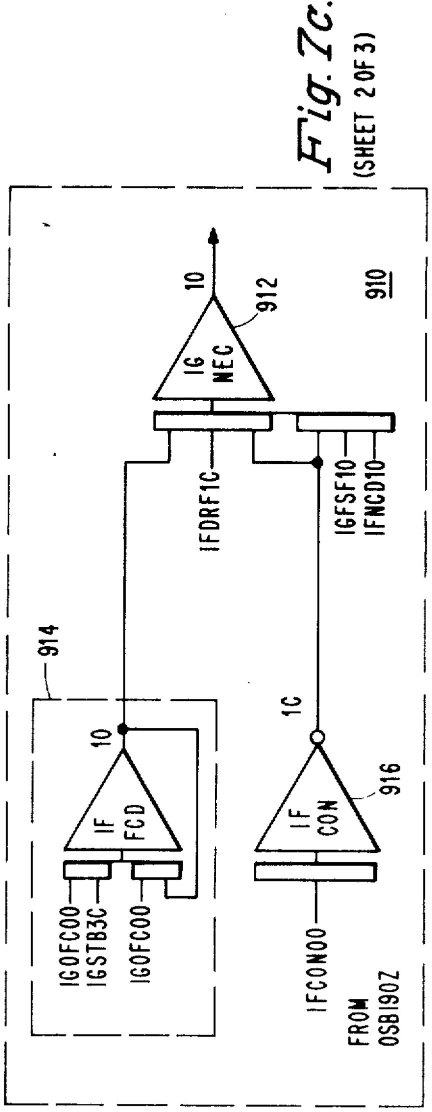
FIG. 7c shows in greater detail the input/output device selection logic of the general device control area and the input/output device control area of FIG. 7.

Input/Output Device Selection Logic of FIG. 7*c*

This logic is shown as block 960 in FIG. 7*c* and determines whether its associated I/O device is to operate as an input device or as an output device during ON-LINE and OFF-LINE bus cycles. As shown, this is established by pairs of jumpers 945 and 966 and the position setting of the Input/Output device function switch on the I/O Device's Control Panel.

When the I/O DCA is selected to operate as an IDCA, the Panel Function switch and jumpers function place IFOUT1J at a binary ZERO and function IFINP1J at a binary ONE. The IDCA is activated in either the idle state IGISF10=1 during an OFF-LINE cycle (IFOFC10=1) when a Bus Strobe (IGSTB1C) is present. Specifically the ANDing of functions IFOFC10, IGSTB1C, and IGISF10 force function IFINP1B to a ONE which sets Allow Active as Input Device (IGINP) flip-flop 942 to its binary ONE state. At the same time, an inverter gate 964 inverts the high output of jumper card 966. This inhibits an Allow Active as Output Device (IGOUT) flip-flop 962 from being switched to its one state during the same OFF-LINE cycle. The I/O DCA is selected to operate as an IDCA from a remote source, e.g. the COMM DCA, as follows. It will be noted that the Function switch position for IDCA and ODCA remote selection causes both functions IFINP1J and IFOUT1J to be binary ZEROS.

When the IDCA is in its on-line state (IGNSF10=1), an AND gate 946 becomes active forcing function IGREM10 to a ONE when neither flip-flop 942 nor 962 are in a ONE state, this causes IGINP flip-flop 942 to be Switched to its ONE state when bit 6 of the device address code is a ONE (i.e. IFIL610=1) as mentioned.

When the I/O DCA is to operate as an ODCA, the jumpers are wired in an opposite fashion so that during an OFF-LINE cycle, the IGOUT1O flip-flop 962 is set to a ONE in accordance with the equation: IGOUT1O=IFOFC1O·IGSTB1C·IGISF1O·IFINPOA in a similar fashion.

As concerns remote selection, when the DCA is in an on-line state, IGOUT flip-flop sets in accordance with the equation: IGOUT10=IFNSF10·IFIL600·IGREM10. That is, when the DCA is in its ready state IGOUT flip-flop sets to its ONE state when bit 6 of the address code is a binary ZERO.

Some of the logic of Input/Output Selection Logic discussed above feeds the input/output logic of the I/O DCA shown as block 900 in FIG. 7*c*. This logic includes a Data Ready for transfer IHDRY flip-flop 906 and associated logic in addition to a Device Ready (IFDRF) flip-flop 920. The IHDRY flip-flop 908 switches to its ONE state under several conditions. These include when the DCA is selected by an operator to operate as an output device (IGOUT1O=1) or the selection is remote wherein both input (IGINP) and output (IGOUT) flip-flop 940 and 962 are reset to ZEROS which forces function IGREM1O to a ONE, one of these function actuates a gate 910 forcing function RXDRA1O to a ONE. And, when either the peripheral device signals that it is ready (RXRDYOO is forced to a ZERO) and that certain control characters ETX, RS, or EM, have not been transferred to the bus or that the 80th memory location has not been addressed (i.e. RXEOM10=0) function RXPDY1O is forced to a ONE. These functions switch flip-flop 908 to its ONE state.

Additionally, IHDRY flip-flop 906 will also be switched to a ONE by functions RXDOC1O and RXDAR10. The function RXDOC1O comes high when an AND gate 916 is active as a result of the DCA being selected by an operator to operate as a card reader input device (IGINP1O=1) and that either input device is not transferring data characters to the DCA memory or has completed its transfer (i.e. RXRSOOO=1) wherein data characters are being read out to the bus from memory. The function RXDOC1O together with function RXDAR1O which comes high at bit time 10 when bit 10 is a binary ONE (when the device function switch is in field position) or at bit time 8 (when the function switch is in a normal position) during normal read data cycle, sets IHDRY flip-flop to its ONE state.

When flip-flop 906 is a ONE, an AND gate 904 forces a Device Ready to Data transfer function (IF- DROIOO to a ONE) provided that there are no check or error conditions present (IGCHOO=1). The IHDRY 906 flip-flop is reset by function RXDRY40 which is forced low by a gate inverter 912 when the system is initialized (RXSTA1O=1) by either the start button on the control panel (IGEXC1O=1) or by being released (IGRLF1O·RXROS1O) or when the scanner 100 generates a response via IFCONOO which forces function IGNEC1O high.

For an input device on-line transfer when the DCA is in its on-line state (i.e. function IFDRF1C=1) the flip-flop 920 switches to its ONE state each time its DCA has a character ready to transfer from its memory to its bus. That is, when functions IFDRD1O and IFINP1O are ANDed by an AND gate 918, function DRF1A comes high and sets flip-flop 920 at a time defined by functions STB3C and IFOFC1O (i.e. at strobe time IGSTB3C during an OFF-LINE cycle) when a flip-flop 922 is switched to its ONE state by these functions.

For an output device on-line transfer when the DCA is in either its on-line or audit trail state (i.e. function IFDRF1C=1) the flip-flop 920 switches to its ONE state when the gate 918 ANDing IGACT1O·IGOUT1O forces function IFDRF1A to a ONE.

For off-line data transfer for both input and output device transfers, the flip-flop 920 switches to its ONE state via gate 918 which is activated under the conditions mentioned above when its DCA is in an off-line state (IGFSF1O=1), when function IFFCD1O is a ONE.

The function IFFCD1O generated by the block 910 of FIG. 7c comes high during an ON-LINE bus cycle in accordance with the equation: IFFCD1O=IGSTB3C·IFOFCOO.

It will be noted that DRF flip-flop 920 resets to its ZERO state under four conditions. These are (1) when the system is initialized (IFRST1O=1), (2) when its DCA is either in the on-line or audit trail state (DRF1C = IFNSF1O+IFASF1O·IFDAC1O) and the scanner 100 signals that a data character has been accepted by all output devices (i.e. IFDRF1C·IFNEC1O·IFFCD1O=1), (3) when its ODCA is in the off-line state (IFFSF1O=1) and a character has been accepted (IGNEC1O·IFNCD1O) and (4) by functions DRFOC and DRFOG which come high when there are no checks (IFCHHOO), the DCA is in its on-line state (IGNSF1O), it is selected to operate as an output device (IGOUT1O) and the character on the bus has been written into memory (IHCTN1O=1). As shown, the function DRFOC comes high in accordance with the equation: DRFOC=IHCTN1O·IFOUT1O·IFFCD1O. The so called character taken function IHCTN1O=RXCLD1O·RXLMR1O·RXFSB1O. The function IHCTN1O is a ONE when the character has been transferred from the bus (RXCLD1O=1), a memory read/write cycle has been initiated (RXLMR1O=1) and a final bit count has been reached (RXFSB1O=1). And, the function IFDRFOG comes high in accordance with the equation: IFDRFOG=IFDRDOO+IFCHHOO.

GDCA ADDRESS RESPONSE LOGIC of FIG. 7*d*

The address response logic as shown in block 980 of FIG. 7*d* includes a jumper card 998 and an Address Response IFARF flip-flop 982 and associated logic gates. The jumpers on the card 998 are wired so as to assign a unique device address code to each DCA. When an address code on the bus corresponds to the GDCA wired-in address code, as decoded by AND gate 997, function IFADD1S comes high.

During the address portion (DACOO=1) of an ON-line cycle (IFOFCOO=1), the function IFADD1O comes high when an AND gate 990 is activated by the I/O Device Selection logic blocks 940 and 962 of FIG. 7*c* which signals either the remote or operator selection of an input or output device by generating either function IGREM10 or function IFADD1Y. This in turn sets flip-flop 982 to its ONE state during an address cycle (IFDACOO=1) of an ON-LINE cycle (IFOFCOO=1) when the bus strobe function IGSTB3C is a ONE provided the addressed device is not busy (IFBSYOO=1).

However, when the DCA is in either the off-line or idle state, the GDCA will force function IFBSYOO to a ZERO which prevents the address response flip-flop 982 from being switched to its ONE state.

Figure 7E:
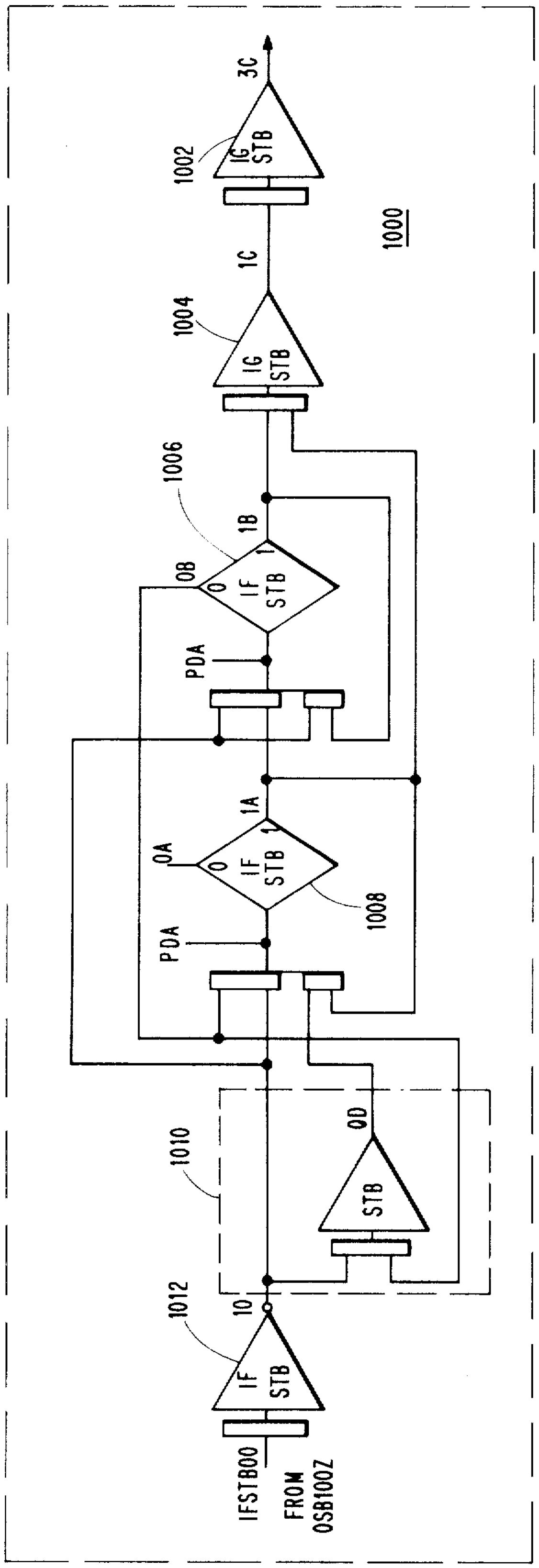
FIG. 7e shows in greater detail the bus strobe timing logic of FIG. 7.

Bus Strobe Timing Logic of FIG. 7*e*

FIG. 7*e* discloses the logic included within block 1000 for generating strobe pulses for synchronizing the various data transfer operations performed by the GDCA and DCA logic in accordance with the ON-LINE and OFF-LINE cycles generated by the device scanner 100. As shown, this logic includes flip-flops 1010, 1008 and 1006 and associated logic.

The scanner generated strobe pulse STBOO derived from scanner timing function BC510 and applied from bus line OSBI1O is inverted by an inverter 1012 and applied as function IFSTB1O to the inputs of flip-flops 1010, 1008 and 1006. The leading edge of pulse IFSTB1O switches, flip-flop 1008 to a binary ONE during a next PDA pulse. When flip-flop 1008 sets, it forces function IFSTB1A to a ONE which switches flip-flop 1006 to a binary ONE upon the occurrence of a next PDA pulse. The trailing edge of same PDA pulse also resets flip-flops 1008 and 1010 to their ZERO states. An AND gate 1004 develops strobe pulses IGSTB1C and IGSTB3C during the time that both flip-flops 1008 and 1006 are set to binary ONES. Accordingly, these pulses are a PDA pulse in width and nomally occur at an interval midway through each ON-LINE and OFF-LINE cycle. A cycle of operation is completed when flip-flop 1006 resets to a ZERO at the trailing edge of the bus strobe pulse IFSTBOO.

Device Control Area

Figure 7F:
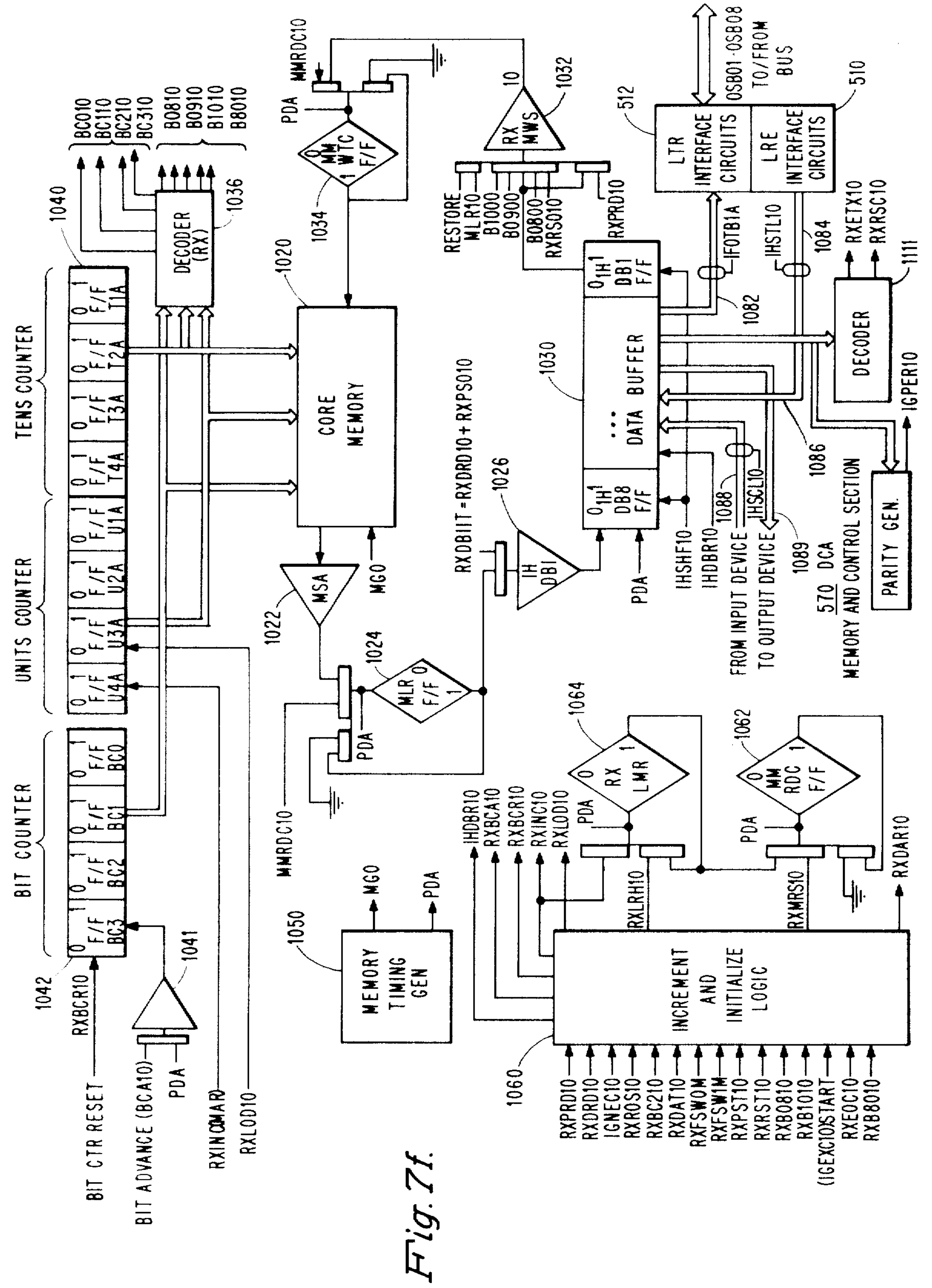
FIG. 7f shows in greater detail the memory and control section of FIG. 7.

For the purpose of the present invention, the pertinent portions of the device control area of FIG. 7 for an input/output device are disclosed in greater detail in FIG. 7*f*. It will be appreciated that the device control area (DCA) of either input device or output device is essentially equivalent to the logic of blocks 570 and 600 respectively of the I/O DCA of FIG. 7.

The remaining figures will be described only as they relate to the description of operation herein to follow.

THE COMM DCA

Figure 8:
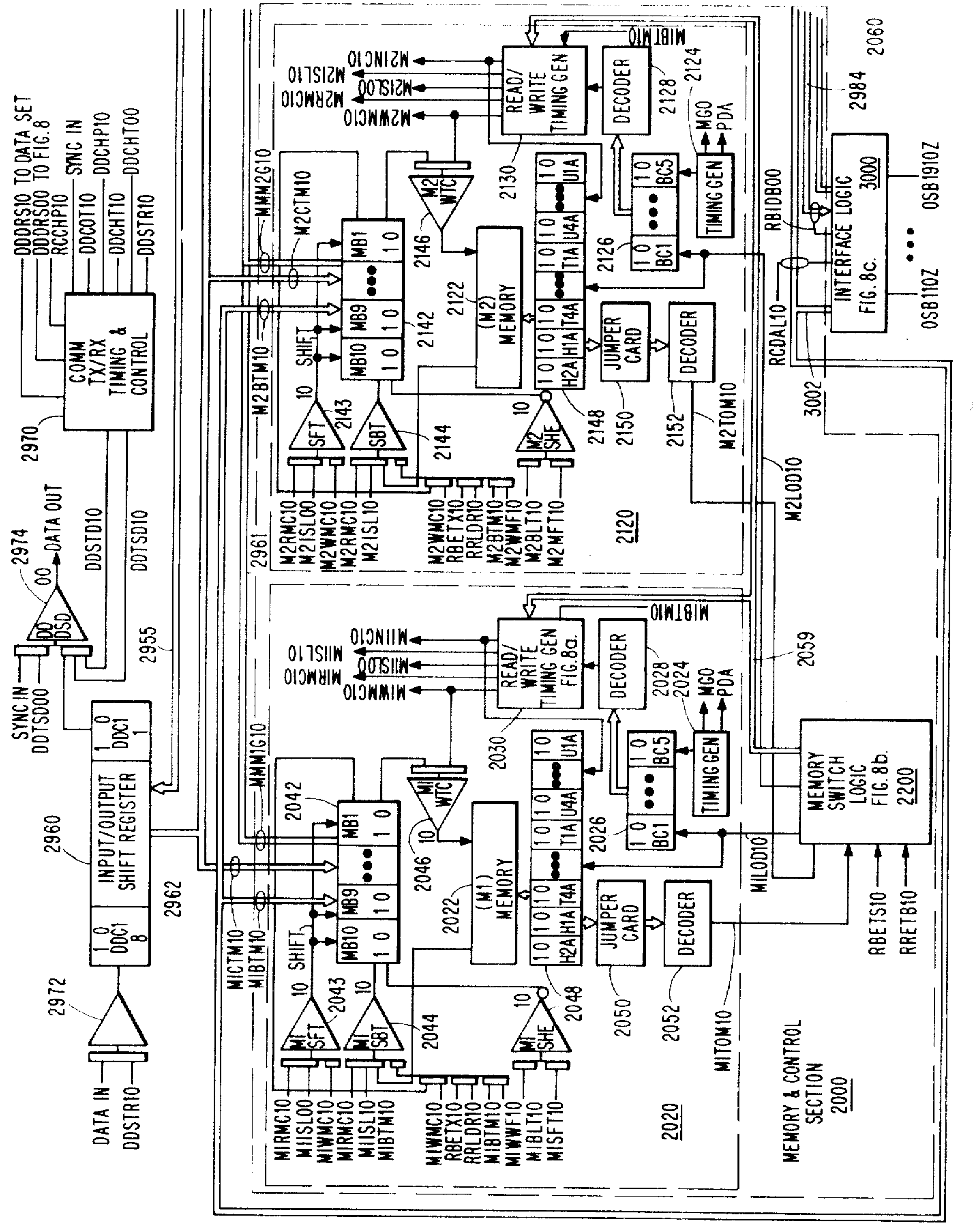
FIG. 8 shows in block diagram form the communications input/output device.

FIG. 8 discloses the various sections of the COMM DCA. The sections include a memory and control section 2000, a command logic section 2400, and a control character sequence generator logic section 2600, and an interface logic section 3000.

The memory and control section 2000, as shown in FIG. 8, includes a pair of buffer memory sections 2020 and 2120 and a memory switching logic section 2200 illustrated in FIG. 8*b*. Each of the buffer memory sections include a buffer memory referred to herein as memory 1 and memory 2 with associated addressing logic and registers which connect its respective memory to the data transfer buses 3002 and 2061 as shown. Additionally, the Memory Switch Section interconnects through a bus 2059 to the timing generator 2030 and 2130 for transfer of control output lines. Since both memories are controlled by like logic circuits, in some instances only the logic circuits for one memory (1) will be described and shown in detail herein.

The command logic section 2400, as shown, includes a decoder 2402 which is operative in response to character codes applied hereto to generate the output functions shown.

The decoder outputs are applied to a Receive Logic Section 2404 which includes a plurality of flip-flops shown in further detail in FIG. 8*d*. The output terminals of these receive flip-flops are applied to a receive subcommand generator 2500 which includes a plurality of flip-flops, the details of which are shown in FIG. 8*e*. The generator 2500 produces a number of output functions many of which enable the trnasfers along those buses shown between the various sections of the COMM DCA. Additionally, the receive command generator 2500 interconnects with the interface logic section 2800 through a bus 2060 as shown. The particular functions transferred between these two sections via the bus 2060 are shown in the Figures which disclose the sections in greater detail.

Figure 8A:
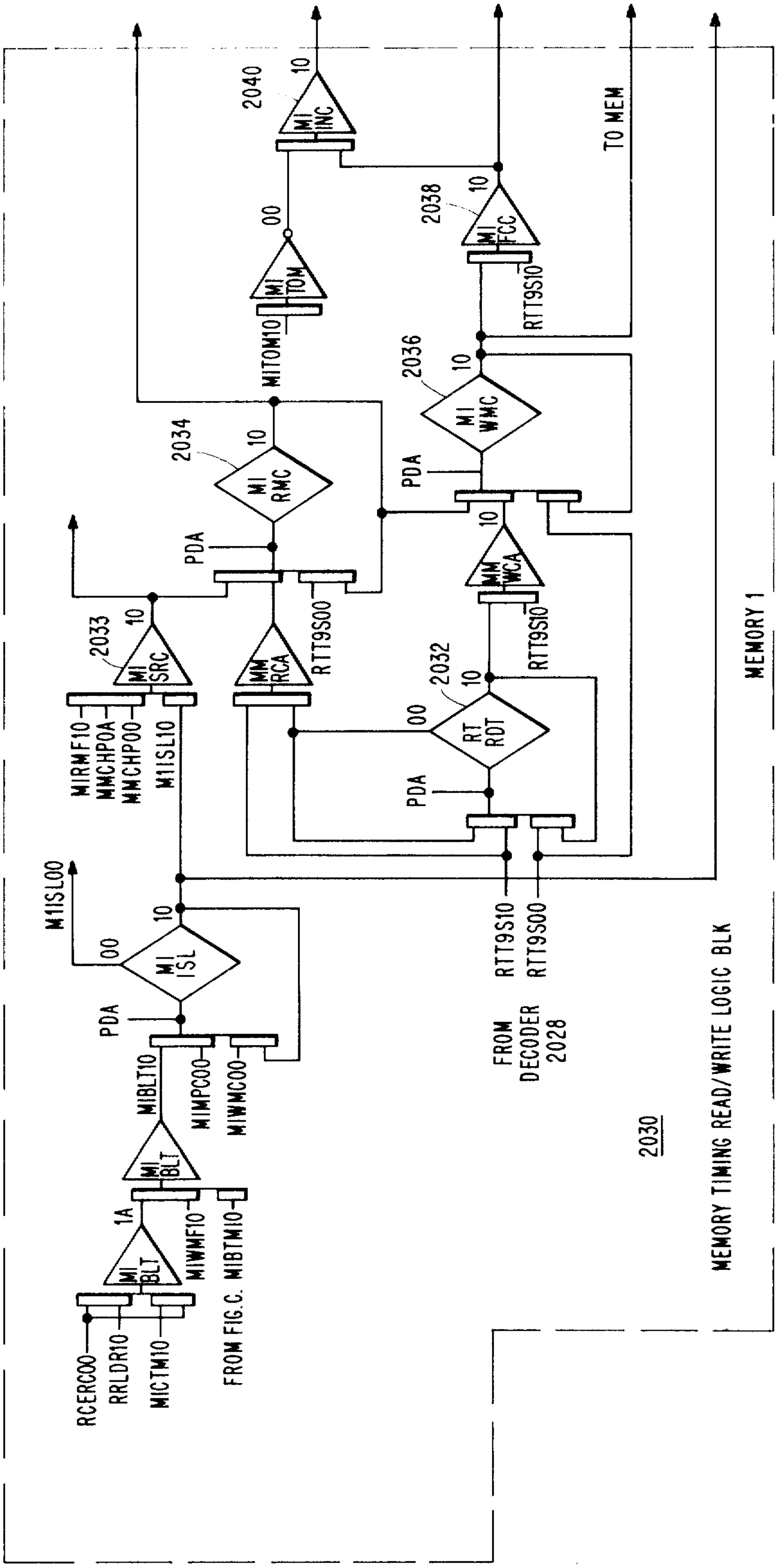
FIG. 8a shows in greater detail the memory read/write timing control for one of the memories of FIG. 8.
Figure 8C:
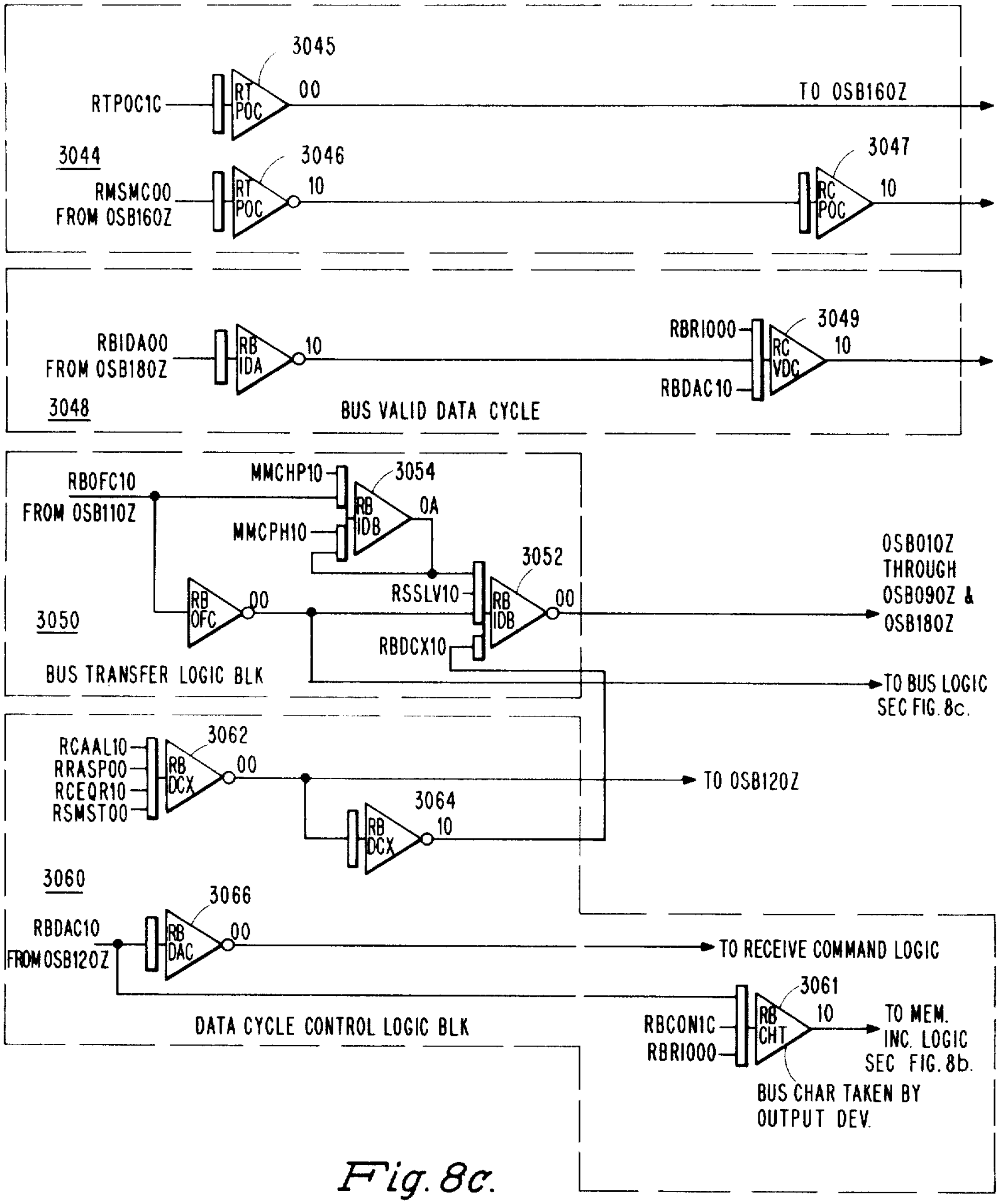
FIG. 8c shows the interface logic section of FIG. 8.
Figure 8C:
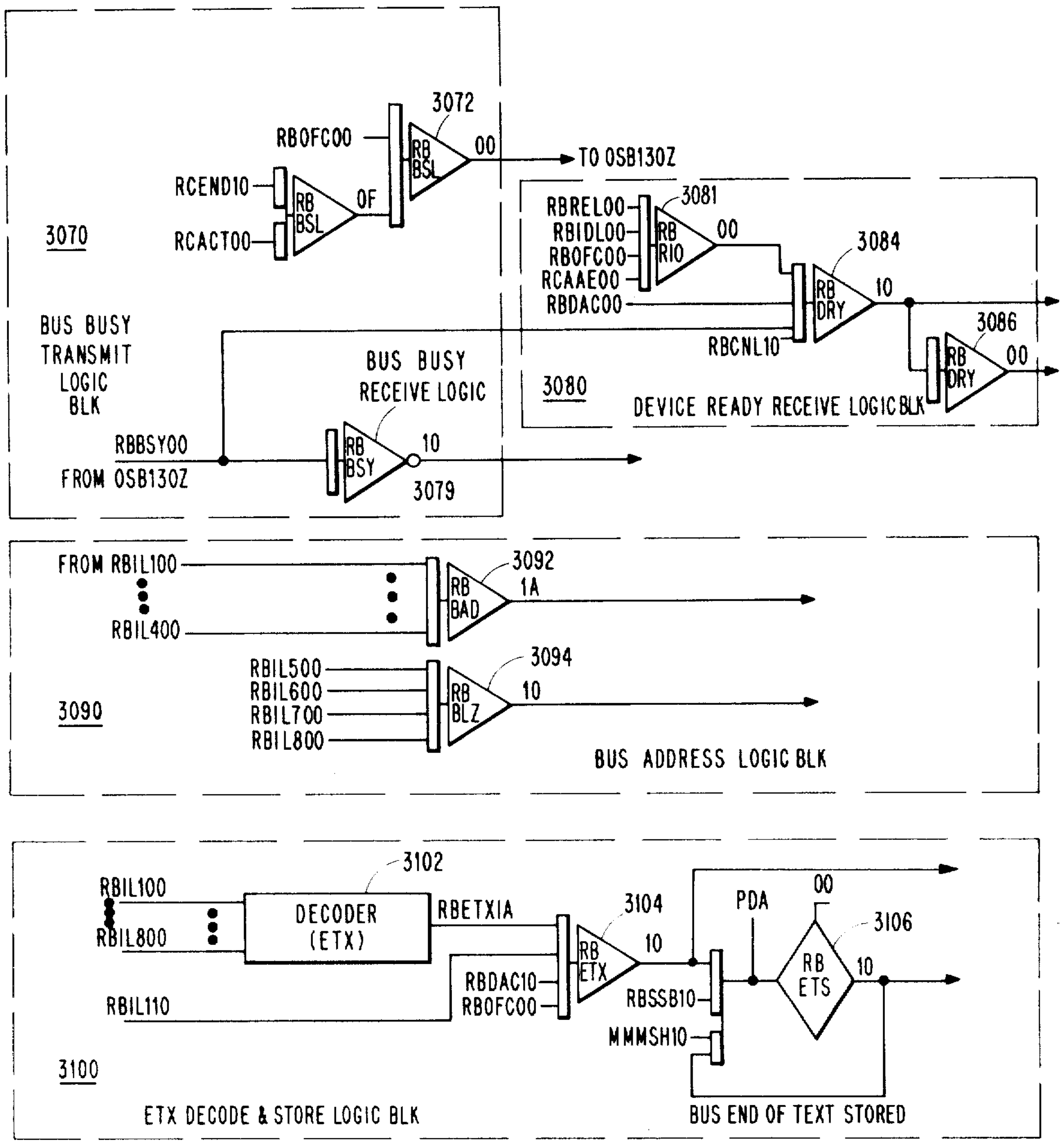
Figure 8C:
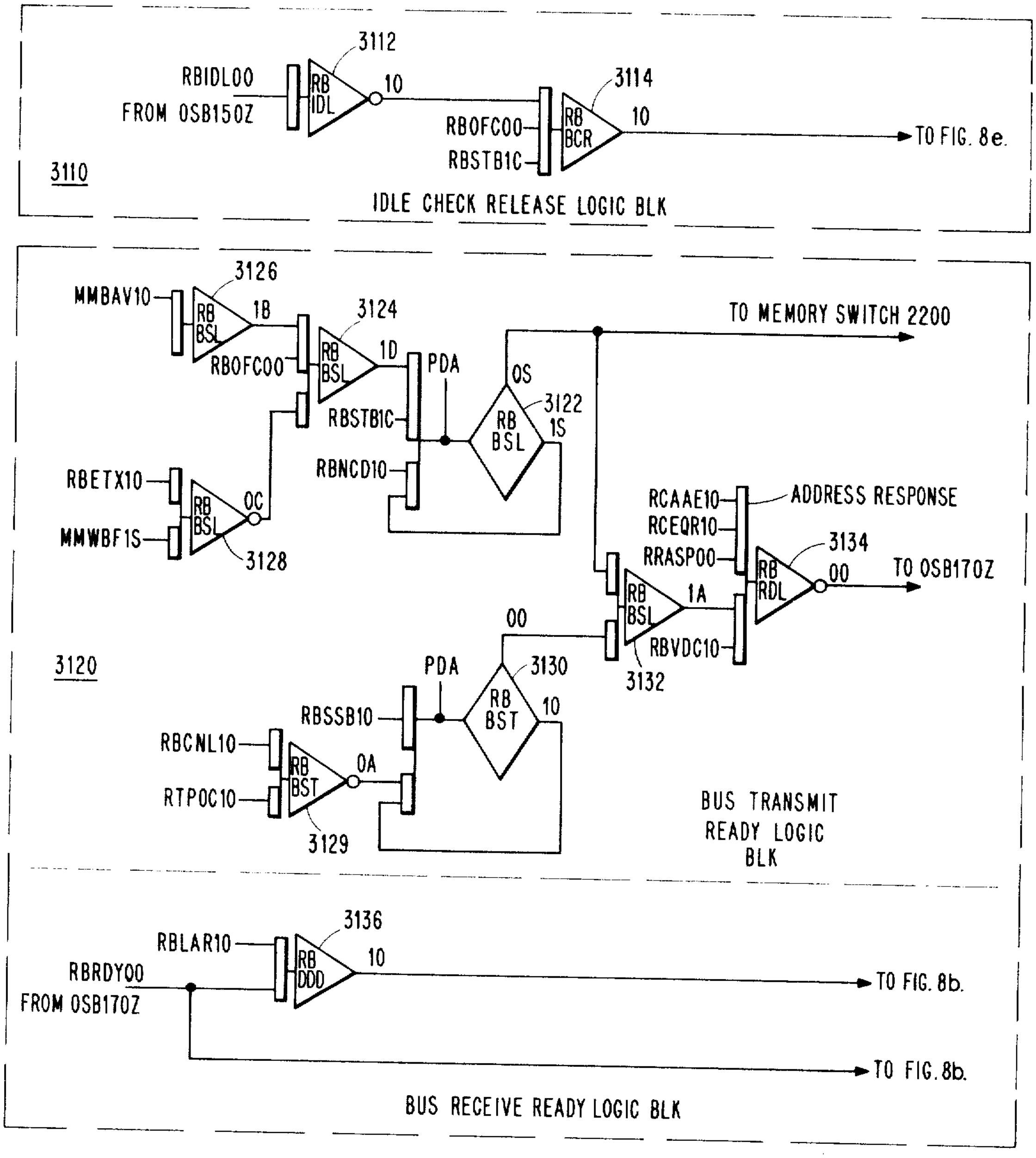
Figure 8E:
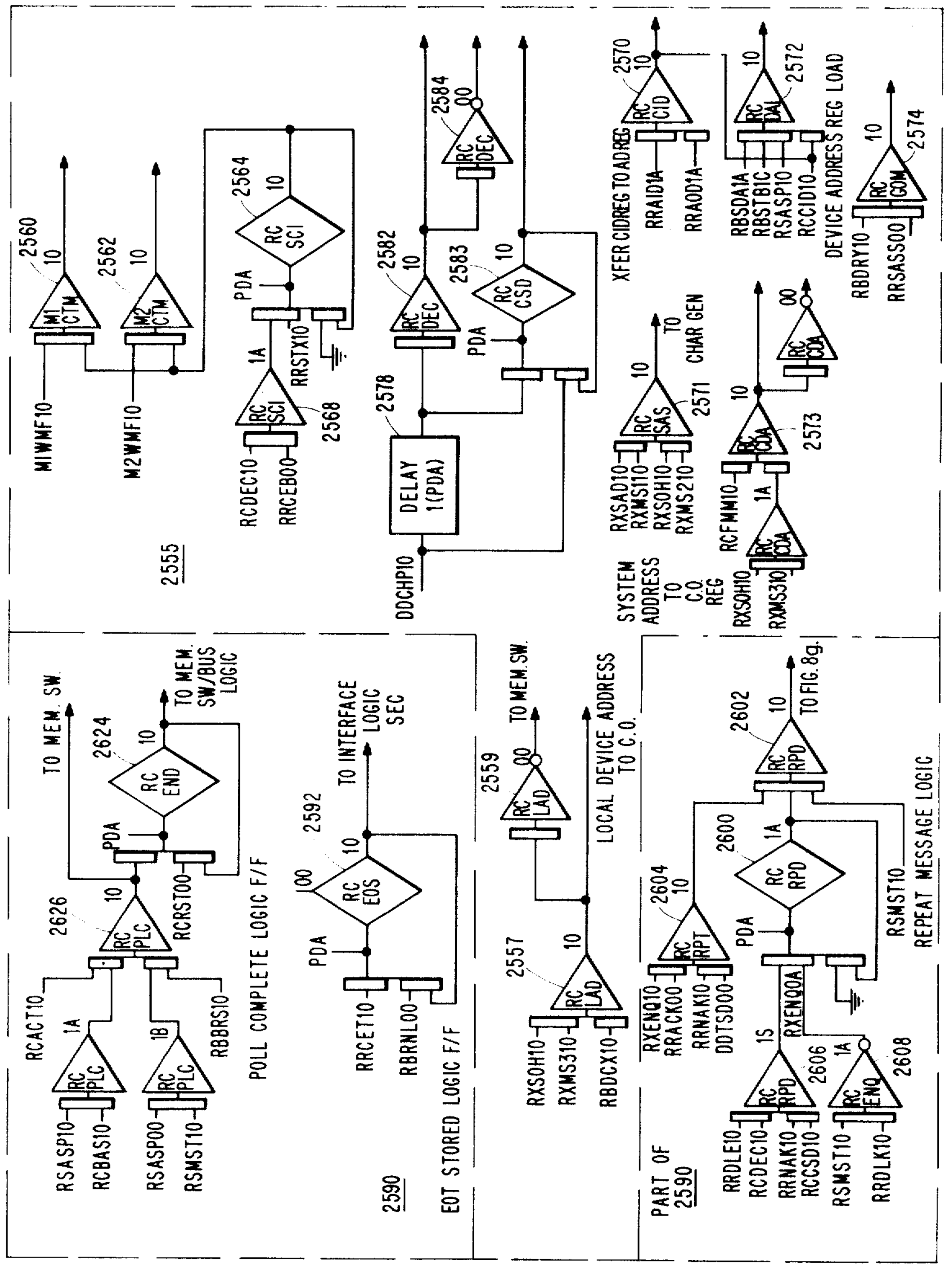
FIG. 8e shows details of the Receive Subcommand Generation logic section which forms part of the command logic section of FIG. 8.
Figure 8F:
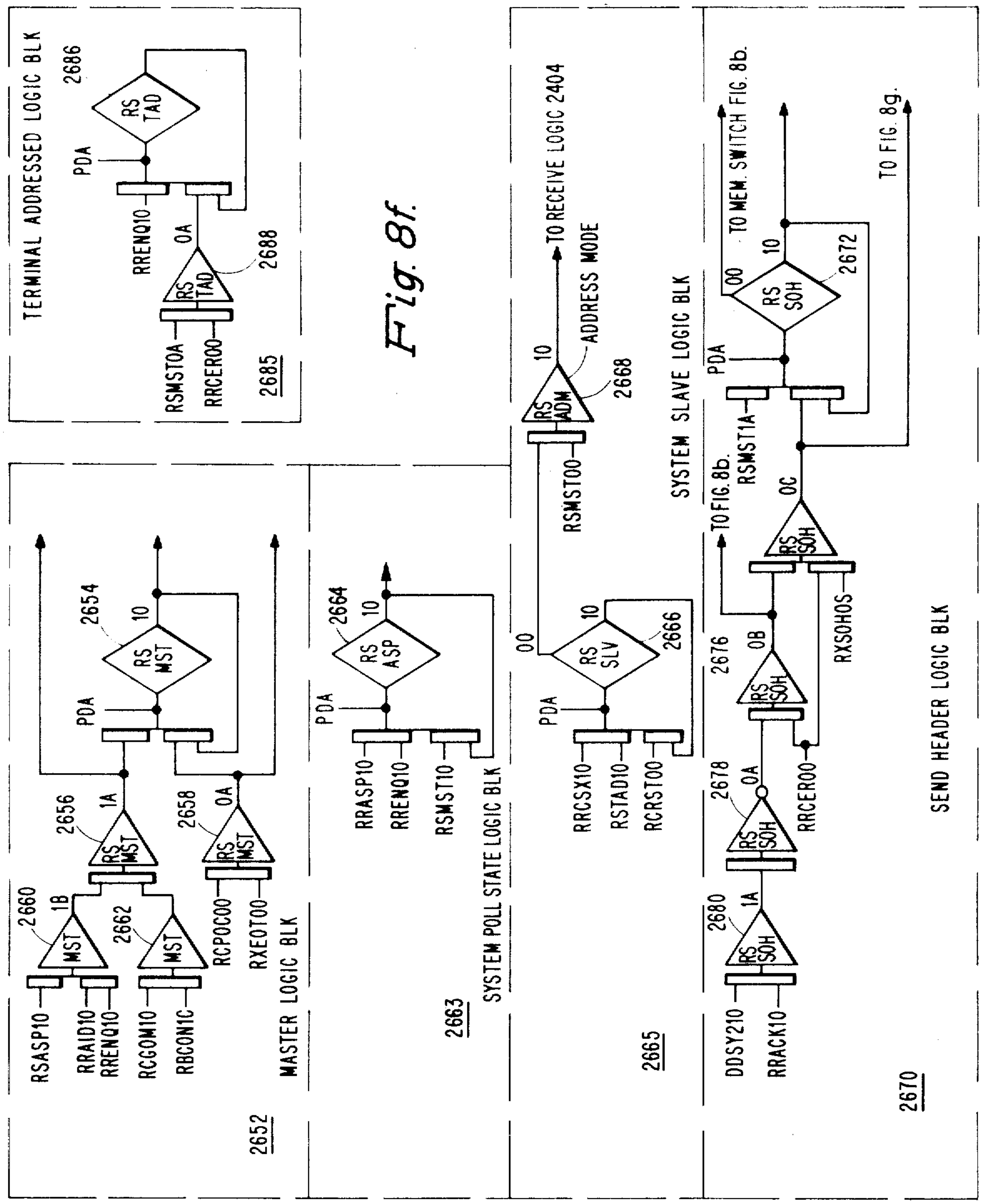
FIG. 8f shows details of State Logic Circuits which form part of the command logic section of FIG. 8.

A last section of the command logic section 2400 is a state logic section 2600 which is shown in greater detail in FIG. 8*f*. This logic includes a number of controlled flip-flops which establish the status of the COMM DCA during its operation as explained herein.

The last major section mentioned above is the control character sequence generator section 2700 which includes a message logic section 2702 shown in greater detail in FIG. 8*g* which receives and transfers functions to a step logic section 2800 which is illustrated as including a plurality of flip-flops MS1 through MS5.

The output functions produced by the step logic 2800 together with the functions produced by the message logic 2702 are applied to a character generator 2900. The character generator 2900 is conditioned by certain combinations of functions to produce sequences of characters which are then transferred via the register 2950 to the input/output shift register 2950 for transmission over a common crrier communication facility via a data set (modulator-demodulator) of conventional design.

In order to facilitate the following explanation, another set of prefixes are used to indicate the origin for the majority of each of the logic control functions generated within the COMM DCA. The prefixes used are:

M1, M2, MM = Memory and Control Section of FIG. 8;
RB = bus interface logic section of FIG. 8c;
RC = Receive Command Generator section of FIG. 8e;
RR = Receive Control Logic Section of FIG. 8d and Receive Decoder of FIG. 8;
RS = State Logic Section of FIG. 8f;
RX = Message Logic Section of FIG. 8g; and
MS = Step Logic Section of FIG. 8h.

MEMORY AND CONTROL SECTION 2000

Buffer Memory Section

Each of the memories 2022 and 2142 of FIG. 8 herein referred to as memory 1 and memory 2 are continuously being cycled by its associated timing generator 2024 and 2124 respectively. Each generator, equivalent to the generator used in the DCA memory system, is enabled by a free running oscillator to produce a memory function MGO and PDA clock pulses which establishes the timing for its respective memory section.

Since memory section 2020 is identical to section 2120 only memory 1 will be described herein. The timing generator 2024 feeds a five stage bit counter 2026 whose stages are labeled BC1 through BC5, which in turn applies its output terminals to a decoder 2028, conventional in design. The decoder 2028 is conditioned by the counter 2026 to generate an output pulse RTT9S10 each time the bit counter 2026 increments to a count of nine thereby establishing a character interval.

As shown, the decoder 2028 feeds a read/write timing generator 2030 which is shown in detail in FIG. 8*a*. Referring to that Figure, it will be noted that the read/-write cycles are determined by the state of RTRDT10 flip-flop 2032 and a function M1SRC10. This is generated by an AND gate 2032 activated by the functions shown by the most part generated by the memory switch logic section 2200 of FIG. 8*b*. In greater detail, the memory 2022 reads out the bits of an addressed memory location during a read cycle, defined by the state of the M1RMC flip-flop 2034, and then writes the bits read out back into the same location during a write cycle as defined by the state of M1WMC flip-flop 2036. Accordingly, the state of the RTRDT flip-flop 2032 conditions the read cycle flip-flop 2034 and write cycle flip-flop 2032 alternately so as to establish the aforementioned read and write cycles of each memory cycle.

In accomplishing the above, it will be noted that the RTT9S pulses alternately set and reset the RTRDT flip-flop 2032 to its binary ONE or binary ZERO state respectively. Therefore, the flip-flop 2032 remains in one state for a character interval (bit counts zero through nine). Accordingly, read cycle M1RMC flip-flop 2034 will be set to its binary ONE state upon the receipt of a RTT9S10 pulse when RTRDT flip-flop 2032 is in its reset state and either a data character has been transferred into the buffer register 2042 from either the bus 150 or the I/O register as defined by transfer functions M1BTM10 and M1CTM10 respectively or when there is a data character to be read out from the memories (i.e. memory write operation) generated by ANDing of the memory switch logic functions M1RMF10, MMCHP0A and MMCHP00 by gate 2033 (i.e. memory read operation). The same RTP9S10 pulse which sets flip-flop 2034 to its ONE state also switches flip-flop 2032 to its one state. With the read cycle flip-flop 2032 in its one state, thennext RTT9S10 pulse switches the write cycle M1WMC flip-flop 2026 to its one State. Therefore, the transfer functions M1CTM10 and M1BTM10 initiate memory cycling. And, the switching of M1RMC and M1WMC flip-flops 2032 and 2034 which in accordance with the switching of RTRDT flip-flop 2032 generate the read and write cycles for each memory operation.

Referring to FIG. 8, it will be noted that the read and write functions M1RMC10 and M1WMC10 condition the buffer memory 2032 to receive the bits as they are read out from an addressed memory location of its associated memory as well as conditioning the memory buffer 2032 to write its contents back into the memory address location. As shown, the memory buffer 2022 has a 10 bit register memory local register including stages MB1 through MB10, which are connected to form a shift register 2042.

During a memory read cycle (function M1RMC10=1), the 10 bits of an address character memory location are read serially out of memory 2022 via a sense amplifier (not shown) and shifted into the last stage (MB10) of the memory buffer register 2042 via an amplifier AND gate 2044. Previously, the AND-ing of functions M1RMF10, MMCHP0A and MMCHP00 permits a read memory cycle to be initiated by read allow function M1SRC10 from generator 2030 wherein the bits of a data character are shifted into the buffer memory register 2042 as mentioned. An AND gate 2043 which generates a buffer shift function M1SFT10 is enabled by a memory switch function M1WMC10 during a read/write cycle which conditions the buffer register 2042 to shift the bits applied via gate 2044 through its stages.

When a complete character has been loaded into the buffer register 2042 from memory 2023, read cycle M1RMC flip-flop resets which in turn sets write cycle M1WTC flip-flop to its one state producing function M1WTC10. This begins the write cycle during which time buffer shift function M1SFT10 is still high and the function M1WMC10 enables a write M1WTC amplifier 2046 to be conditioned by the ONE output of the first buffer state MB1 to write either a binary ONE or a binary ZERO into the addressed location. That is, when a binary ONE is to be written into the memory, the first stage MB1 of the memory buffer register 2042 will enable M1WTC10 amplifier 2046 which will cause a binary ONE to be written in the bit location of that memory. Alternatively, when the first stage MB1 of storing a binary ZERO, M1WTC10 amplifier will be inhibited and a binary ZERO will be written into the memory.

As the data bits are shifted through stage MB1, they are also returned through AND gate M1SBT amplifier 2034 which is enabled by function M1WMC10. Accordingly, at the completion of a write cycle, the memory buffer 2042 as well as the addressed character location is in its original state prior to the memory cycle.

When data characters are transferred from the input-/output shift register 2960 or from the bus 150, the buffer memory 2022 is conditioned to perform a clear/-write operation. In particular, function M1ISL10 is forced high by the setting of M1ISL flip-flop to its ONE state by transfer functions M1CTM10 and M1BTM10. This causes function M1ISLOO corresponding to the ZERO output of the same flip-flop to be low. The function M1ISLOO inhibits AND gate 2043 which clears the stages of the memory buffer register 2042 during the read cycle by inhibiting shifting of the register contents and hold function M1SHF10 resets the register stages to zeros. Just prior to the write cycle, either the function M1CTM or function M1BTM will condition their associated transfer buses 2962 and 3002 to load the buffer register 2042 from either the register 2960 or the bus 150 respectively. Thereafter, the memory writes the contents of the buffer register 2042 into memory a bit at a time during the write cycle as described above.

Each memory location as mentioned has 10 bits in the preferred embodiment coded as follows: eight bits are reserved for coding each character in ASCII code; the ninth bit is not used; and, the tenth bit is coded as a ONE to signal when the last data character of a block of data has been written into the buffer memory 2022. As described herein, AND gate 2044 writes a ONE into stage MB10 when activated by functions PBETX10 and M1BTM10.

The buffer memory 2022 includes 200 or 400 memory character locations and a memory address register (MAR) 2048 which includes a units, a tens, and a hundreds counter. As shown by FIG. 8, the units counter is a four stage counter whose stages are designated as U1A-U4A. And, the tens counter has four stages designated TA1 through TA4. Depending on the size of the memory 2022, the hundreds counter may include two stages designated as H1A and H2A for a memory size of 200 or 400 storage locations. The read/write timing generator 2030 increments the MAR by one when it generates function M1INC10. Specifically, after each time the bit counter 2026 advances to a count of nine, it will condition an AND gate 2040 of FIG. **8*a* to produce an increment function M1INC10 to increment the MAR 2048** by a count of one provided a Top of Memory function M1TOM10 is a ZERO.

A jumper card 2050 is arranged to enable a decoder 2052 connected thereto to generate the function M1TOM10 when the memory address register 2048 has advanced to a predetermined count. The wiring of the jumper card 2050 establishes the number of data characters (size of a block) which will be written into the buffer memory 2022 before the writing operation is terminated whereafter the stored characters are read out of memory. That is, the jumper card 2050 establishes the block size for automatically blocking data characters written into memory 2022.

The jumper card 2050 may be wired to condition the decoder 2052 to produce the function M1TOM10 when the MAR 2048 has advanced to a count of 200, 400, or any other predetermined count. In particular, when the jumper card 2050 is wired so that the decoder 2052 produces function (M1TOM10) each time the MAR 2048 has advanced to a count of 200. This function conditions the memory switch logic to discontinue the write operation and enable a read operation. That is, when this predetermined count has been reached, function M1TOM10 sets a memory pass complete (M1MPC) flip-flop located within the memory switch logic section 2100 of FIG. **8*b*.** With this flip-flop set to its binary ONE state, function M1MPC10 comes high and in turn generates a Load/Clear Column Count function M1LOD10 which resets all stages of the memory counters to ZEROS.

MEMORY SWITCH LOGIC 2200

In General

The memory switching logic section 2200 of FIG. **8*b* is operative to control the transfer buses along which each of the buffer memories is to transfer or receive data characters and whether a particular memory is to perform a read operation or write operation. That is, the switch outputs of the section 2100 are applied as inputs to the read/write timing logic 2030 of FIG. 8*a* and the buffer register gating logic to condition same for either writing or reading. Additionally, the switch logic section 2200 causes the generation of transfer functions which permit the output from either memory to be applied to either the bus 150 or to the communication line input/output register 2960.**

As shown in FIG. 8, the output transfer functions MMM1G10 and MMM2G10 enable transfers of data characters from either the buffer register 2042 or 2142 of memory 2022 and 2122 respectively along transfer bus 2160 via a bus gating logic 2980 to either the bus 150 or the input/output communications shift register 2960. It will be appreciated that the transfers to the shift register 2960 via bus 2961, gating logic circuits 2980, bus 2982, register 2950 and 2955 also conditioned on other functions RCCOA10 and DDCOT10 being in a high or ONE state. And, the transfer to the bus 150 via the bus 2961, gating logic circuits 2480 and bus 2984 as shown is conditioned on function RBIDB00 being a ONE.

As mentioned, the memory switch logic 2200 via functions M1WMF10 and M2WF10 also causes transfer functions M1CTM10 and M2CTM10 to condition the transfer of data characters assembled in the input/output shift register 2960 via bus 2962 to buffer memory 2022 and buffer memory 2122 respectively. The specific logic which generates these transfer functions forms a part of the Receive Subcommand Generation Logic section 2500 disclosed in detail in FIG. **8*e*. Additionally, the same functions M1WMF10 and M2WMF10 conditions the transfer bus 3002 extending from the interface logic 3000 to the buffer registers 2042 and 2142 to enable the transfer of data characters to either register 2042 or 2142 from the bus 150 by generating the bus to memory transfer functions M1BTM10 and M2BTM10. The specific logic for generating these functions is disclosed in detail in FIG. 8*c*** and will be discussed in greater detail with reference to this Figure.

DETAILED DESCRIPTION OF MEMORY SWITCH LOGIC SECTION

Referring now to FIG. **8*b*, it will be noted that the significant control functions are derived by a memory switch MMMSW flip-flop 2202. The binary ONE and binary ZERO output functions MMMSW10 and MMMSW00 respectively of this flip-flop conditions a Memory 1 and Memory 2 Read/Write Logic Sections 2205 and 2215 to condition the memory sections 2020 and 2120,** as mentioned above, to thereby define which memory is to read data characters from its memory storage locations and which memory is to write data characters into its storage locations.

It will be noted that one set of input functions to the memory switch flip-flop 2202 define when either memory is full or stated differently, they define the time when either memory is ready to have its data contents read out to a receiving unit. And, the other set of input functions define when either memory has had its data character contents read out completely and is now ready to have new data characters written therein. These sets of functions are generated by blocks 2270 and 2225. It will be noted that in those cases where the logic for memory 2 is equivalent to that of memory 2, it is shown only as a block.

Accordingly, the memory switch MMMSW flip-flop 2202 will switch only when one memory is empty and the other memory is full. Stated differently, switching occurs when one memory has transferred all of its data characters to an output device and the other memory has loaded completely with data characters from an input device. In particular, a Memory Switch function MMMST10 defines the time at which the memory switch MMMSW flip-flop 2202 will be switched to either its binary ZERO or binary ONE state. This function, as shown, is generated by an AND gate 2250 which is also conditioned to switch in accordance with the status of the COMM DCA. Specifically, switching is controlled by a master (transmit) status function RSMST10 and a slave (receive) status function RSSLV10. Thses two functions are generated by a pair of RSMST and RSSLV flip-flops which formed part of the Message State Logic 2600 of FIG. **8*f*.** Specifically, these functions are derived from a master status MSMST flip-flop and a slave status MSSLV flip-flop when they are switched to their ONE states. This means from the point of view of a data transfer operation that the COMM DCA when in the master status (i.e. MSMST flip-flop is in its ONE state) is going to transmit data characters via the communications facility to the remotely located data processing system. And, the COMM DCA when in the slave status (i.e. MSSLV flip-flop is in its ZERO state) it is going to receive data characters from the data processing system. The manner of establishing these status states will be described herein.

Receive Status

When the power is applied to the system the M1RMF, M1WMF, M2RMF and M2WMF flip-flops are reset to their ZERO states via their respective hold functions M1SBE0A, M2SBE0A, M1MPC0A and M2MPC0A. And, when a reset function RCRST00 is forced to a ONE, it causes MMMSW flip-flop to be reset to its ZERO state. The MMMSW flip-flop will be switched from its ZERO state to its ONE state via gate 2298 when a first device signals ready forcing function RBDRY10 to a ONE and when a control pulse RBCON1C is applied via MMMST1E AND gate. The control pulse RBCONIC also causes function RBDRY10 to be forced low which in turn causes function RBDRY00 to become a ONE. It is assumed that the system is in the receive status wherein the slave flip-flop is in its ONE state and the memory switch MMMSW flip-flop 2202 is in its set or ONE state. Accordingly, the Memory 2 Write Memory M2WMF flip-flop 2217 will be set at this time which conditions Memory 2 for writing data characters into the memory from the communications line. However, since memory 1 will be initially empty when power is initially applied to the COMM DCA, the Memory 1 Read M1RMF flip-flop 2205 will reset to its SERO state because a function RCPOC10 is forced to a ONE which cuases set Memory 1 Empty M1SBE gate 2232 to force function M1SBEOA to a ZERO. This in turn forces hold function gate low of the flip-flop 2206 causing it to reset upon the next PDA pulse. Also, function M1SBEOA sets Memory 1 Empty M1BFE flip-flop 2234 to its ONE state which together with function MMMSW10 activates MMRBE AND gate 2240 forcing function MMRBE1o to a ONE. Now, memory switch MMMSW flip-flop 2202 remains in its ONE state until a Memory Pass Complete M2MPC flip-flop switches to its ONE state. This signals that the memory 2 writing operation is complete. It will be noted from the equivalent M1 flip-flop that M2MPC flip-flop switches to its ONE state under the following conditions when an M2SPC AND/OR gate equivalent to gate 2282 is activated. The gate 2282 will activate when an end of message condition is detected by the Receive Command Logic 2500 which forces function RCEDM10 to a ONE (see FIG. 8e). And, the gate 2282 activates when the "top of memory" is addressed wherein decoder 2152 forces function M2TOM10 to a ONE. With M2MPC flip-flop set to a ONE, function M2MPC10 together with function M2WMF10 from block 2292 activates Memory Write Buffer Full MMWBF gate 2294 which forces function MMWBF10 to a ONE. The functions MMCHP00, MMRBE10 and MMWBF10 activate AND gate 2242 which forces function MMMST1A to a ONE in turn forcing memory switch time MMMST10 function to a ONE when an ETX or an ETB character has been detected by the Receive logic 2404 of FIG. 8d which forces function RRLDRIS to a ONE.

The function MMMST10 causes memory switch MMMSW flip-flop 2202 to its ZERO state along with M2 Write Memory M2WMF flip-flop 2217 by forcing hold function M2SBE0 a low via function M2SRT10 applied to an inventor gate equivalent to gate 2276 of block 2272. And, function MMMST10 causes M1 Write Memory M1WMF flip-flop 2207 to switch to its ONE state via activating M1SWF AND gate 2209.

Additionally, M2 Read Memory M2RMF flip-flop 2216 switches to its ONE state when function MMMST10 forces function MMSRF10 which in turn forces M2SRF10 to a ONE. The M1 Read Memory M1RMF flip-flop 2206 remains in its reset or ZERO state because function MMMSW00 is a ZERO. When M2WMF flip-flop resets to a ZERO, it causes M2MPC flip-flop to also reset to a ZERO by forcing hold function M2MPC0B low. Also, the resetting of MMMSW flip-flop enables MMM2G AND gate 2218 when a further AND gate 2258 becomes active at which time it forces function MMMG10 to a ONE. This gate is activated when the Memory Character Present MMCHP flip-flop 2264 is in its ONE state and a Receive Command transfer function RCLAD00 generated by the Receive Subcommand Logic 2500 is a ONE as described herein. As mentioned, function MMM2G10 enables the transfer of data characters from its associated memory 2122 to the bus 150.

Referring to FIG. 8a, it will be noted that function RRLDR10 is applied to M1BLT and equivalent M2BLT AND/OR gates. A RCERC00 RCERCOO is normally a ONE and is forced low when an error is detected by conventional means, (not shown) as for example, a longitudinal parity check. This causes function M2BLT10 to be low which will inhibit M2ISL flip-flop from being set to its ONE state. This forces function M2ISL10 low which in turn holds function M2SRC10 low thereby preventing Memory 2 Read M2RMC flip-flop from switching to its ONE state and initiating a read memory cycle. While the memories will be switched, the data characters stored in memory 2 representative of a bad message will not be transferred to the standard bus 150 because the cycling of memory 2 is inhibited. Under these circumstances, the COMM DCA will request a retransmission.

Now, the aforementioned memory RCSCT flip-flops 2202, 2206, 2207, 2216 and 2217 remain in their same hence until further MMMST10 pulse is developed which will cause memory switch MMMSW flip-flop to switch to its ONE state. As shown by FIG. 8b, this occurs when M1MPC flip-flop 2286 is set to its ONE state by conditions mentioned above which forces function MMWBF10 to a ONE and together with functions MMCHP00 and MMRBE10 as ONES, forces function MMMST1A to a ONE.

Memory Switching-Transmit-Master Status

As mentioned, the COMM DCA is to transmit data characters to the remotely located data processing system, the master status flip-flop will have been set to its ONE state which forces function RSMST10 to a ONE.

Similar to the Receive status, a first pulse applied by Memory Switch time MMMST gate 2250 is generated when MMMST1C gate 2298 becomes active prior to master status RSMST flip-flop of FIG. 8g being set to its ONE state when ready function RBRDY10 is a ONE. Again, this first pulse will switch MMMSW flip-flop to its ONE state whereafter memory 1 is conditioned to read while memory 2 is conditioned to write. That is, the MMMSW flip-flop 2202 when in its ZERO state causes M2SWF gate to become active which sets M2WMF flip-flop to a ONE. However, since function RMRDY00 is a ZERO, the first pulse will not switch M1RMF flip-flop to its ONE state.

Upon the completion of a writing operation, the M2MPC flip-flop will switch to its ONE state when the Bus Logic section of FIG. 8c detects an ETX character in turn forcing function RBETS10 to a one or when the Top of Memory function M2T0M10 is generated by either decoder 2052 or 2152. When set to its ONE state, M2MPC flip-flop forces function M2MPC10 to a ONE which together with function W2WMF10 activates Memory Write Full MMMWBF gate 2294 which generates function MMMWBF10. This function together with function MMMST10 activates an AND gate 2296 which in turn activates gate 2298 when Master Status RSMST flip-flop is in its ONE state. The function MMMST1D will be a ONE when functions MMSTOD and MMBAVOO are both zeros. This occurs when function RSSOHOO is forced to a ZERO after a Start of Header character is generated by character generator 2900 as described herein and sent to I/O register 2960. The function MMBAVOO goes low when both the MIBAV and M2BAV gates are active together with function MMBAV1A being a ONE. That is, when the data characters transmitted have been acknowledged as good, function RRACK10 is a ONE and when the contents of either memory have been read out a flag will be detected which activates M1SBE and M2SBE gates in turn causing M1RMF flip-flop and M2RMF flip-flop to be reset to their ZERO states. Also, functions M1MPCOA and M2MPCOA reset M1WMF and M2WMF flip-flops to their ZERO states.

Since the associated functions M1WMFOO, F1MPCOO and M2WMFOO and M2MPCOO are ZEROS, then either function M1BAV10 or M2BAV10 is forced to a ONE which in turn forces function MMMST10 to a ONE, switching the state of MMMSW flip-flop. Now, this causes gate 2250 to produce a second pulse which resets MMSW flip-flop to its ZERO state together with M2WMF flip-flop. ANd, M1WMF flip-flop 2207 and M2RMF flip-flop are switched to their ONE states while M1RMF flip-flop remains in its reset state.

Accordingly, the contents of M2 will be read out to the I/O register 2960 while data characters are being written into memory 1. If a good acknowledgement is not received, function RRACK10 remains a ZERO thereby preventing MMMSW flip-flop from switching state. At the same time, function RBRDY00 is forced to a ONE by the bus interface logic as described herein which prevents data characters from being written into either memory. Accordingly, a Retransmit function RCRPD10 is generated by Receive Command logic which sets the M1RMF and M2RMF flip-flop to their original status in accordance with the state of MMMSW flip-flop as well as resetting either M1MPC flip-flop or M2MPC flip-flop thereby permitting the retransmission operation to take place in the same manner as the original transmission. Thereafter, the state of MMMSW flip-flop will be again switched when functions MMMST0D and MMBAV00 are both ZEROS. Since function RSSOH00 will always be a ONE after the first block of data characters have been transmitted and acknowledged, thereafter function RBBSL0S will permit memory switching when a ZERO forcing function MMMST00 to a ZERO.

SYSTEM INTERFACES

Communication I/O Register

The I/O register 2960 as shown in FIG. 8 is an eight stage shift register whose stages are labeled DDCI1 through DDCI8. As indicated, this register transfers information into and out of the COMM DCA from or to the communications facility respectively. Information characters from the communications facility such as a 201A or 201B data set are handled via a data set interface, conventional in design. In particular, when receiving information, a Request to Send data set function is a ZERO. A Data In line DDDRD10 from the data set applies bits of information serially to the last stage of the shift register 2960 and these bits are shifted there through by strobe pulses DDSTR10 developed from the data set receive clock. These pulses are developed in a conventional manner so that each pulse coincides with the center of each bit. Each of the strobe pulses also increment a three stage bit counter included within the Timing and Control 2970. Each time the bit counter counts to eight so as to define a character interval, the communications control 2970 sets function DDCHP10 to a ONE indicating that there is a character present in register 2960. This function is applied to the Receive Command logic 2500 of FIG. 8.

When the COMM DCA is to transmit characters to the data set interface, it forces a Request to Send function DDDRS10 to a ONE by switching a Receive to Transmit Allow RCRTF flip-flop in FIG. 8e to a ONE. When the COMM DCA is not receiving, a function DDDRS1A together with function RCRTF10, switch a Data Set Request to Send flip-flop to a ONE which forces function DDDRS10 to a ONE. This function remains a ONE for the duration of transmission.

When a Data Set Clear to Send signal and a Data Set Transmit Clock signal are ONES, the COMM Control 2970 develops strobe pulses in a conventional manner so that the pulses coincide with the leading edge of the clock signal. As described herein, the control 2970 will apply SYNC characters to the SYNC IN input of a gate 2974. When the requisite number of SYNC characters have been transmitted, the control 2970 will force function DDTSD00 to a ZERO inhibiting transfer of further SYNC characters. Simultaneously therewith, the control 2970 will force function DDTSD10 to a ONE and thereafter force function DDCOT10, to a ONE. The function DDCOT10 will cause a character to be transferred to I/O register 2960. And, the strobe pulses will condition the register 2960 to shift the bits serially on to the data out line via gate 2974. At the same time, the strobe pulses increment a three stage counter and when it counts to eight indicating completion of the character transfer it resets to ZERO. At that time, the communication control 2970 forces a function DDCHT10 to a ONE indicating that the character has been taken or transmitted.

When the COMM DCA switches from transmit to receive, the actual switching is delayed for a character interval which insures that the last character will be transmitted. When the COMM DCA generates a function indicating that the last character has been transmitted, (e.g. block check character has been transmitted) a function DDDRS0A is forced to a ZERO a character interval later. This function switches the Data Set Request to Send flip-flop to a ZERO and at the same time switches the stages of a Message State Counter of FIG. 8 to ZEROS.

Bus Interface Logic — FIG. 8c

The Bus Interface logic of FIG. 8c develops strobe pulses to synchronize the bus ON-LINE cycles with the timing within the COMM DCA. In particular, referring to FIG. 8c, it will be noted that the logic block 3020 generates a bus strobe RSBTB1C from bus strobe RBSTB00 applied by the scanner 100 to line OSB100Z. Since the bus strobe logic 3022 may take the form of the DCA logic shown in FIG. 7e, it is not again disclosed herein. The strobe RBSTB1C which is used to control the character transfers within the COMM DCA is ANDed with functions RBVDC10, RBSSB1A and RBDSA1B to produce a bus strobe RBSSB10. This function will enable one of a pair of AND gates 3032 and 3034 of block 3030 to transfer characters applied to the bus 150 into memory. That is, the function RBSSB10 is forced to a ONE which forces either function M1BTM10 or M2BTM10 to a ONE when either M2WMF or M1WMF flip-flop is a ONE and its Memory Pass Complete flip-flop has not been reset to ZERO (MMWBF0S = 1) indicating that the data characters are still being transferred into that memory, the COMM DCA is in its master status (RSMST10 = 1) there is a strobe allow RBDSA1B = 1) and there is a valid character on the bus (RBVDC10 = 1). A flip-flop 3024 switches to a ONE forcing function RBDSA1B to a ONE when function MMMPC1A is a ONE. It also switches when there is a data cycle (RBDAC10 = 1) and the scanner 100 has acknowledged that the previous character has been taken by the output devices by forcing RBCON10 to a ONE. And, the logic circuits of block 3010 in response to pulse RBCON10 generates pulse RBCON1C. When strobe RBSSB10 is generated it is also used to reset RBDSA flip-flop 3023 to its ZERO state via its hold gate.

As indicated above, the logic circuits of block 3010 generate the pertinent control timing functions which synchronize the COMM DCA address codes and data character transfers with the bus 150. Specifically, a control function RBCON00 derived from the scanner 100 enbales AND gate 3012 to force function RBCNL10 to a ONE. Also, strobe function RBSTB1C switches an RBNCD flip-flop 3019 to its ONE state forcing function RBNCD10 to a ONE during an ON-LINE cycle (i.e. RBOFC00 = 1) and this flip-flop switches to a ZERO at the end of the cycle. These functions enable a first one of series connected flip-flops 3014 and 3016 to produce the function RBCON1C during the appropriate time interval (i.e. time interval 6) of an ON-LINE bus cycle. In addition to being fed to the block 3020, the function RBCONIC enables a character taken AND gate 3061 whose output feeds the Memory Switch Logic Section of FIG. 8b. And, this conditions a character present MMCHP flip-flop 2264 and a flip-flop 3054 of block 3050 by switching them to their ZERO states on readiness for the read out and transfer of another data character from memory to the bus 150.

Referring to block 3050, it will be noted that the function RBIDB00 is applied to the transmit circuits of bus lines OSB010Z through OSB090Z in addition to bus line OSB180Z to enable the transfer of a character code to the bus lines and to signal when a character code has been applied to the bus respectively. This function is forced to the appropriate state as follows.

First, there must be a character present during the previous OFF-LINE cycle, at which time function MMCHP10 is forced to a ONE which switches the flip-flop 3054 to its ONE state. The data cycle logic 3060 in FIG. 8c, after completing the requisite address cycle as described herein forces data control function RDBCX10 to a ZERO. Specifically, the function RBDCX10 is a ZERO when an address response flip-flop is switched to a ZERO which forces function RCAAL10 to a ZERO. Accordingly, gate 3052 forces function RBIDB00 to a ZERO when character present function MMCHP10 is a ONE, when the COMM DCA is in its receive state (RSSLV10 = 1) during an ON-LINE cycle (RBOFC0Q = 1) when the function RBDCX10 is a ONE. The flip-flop 3054 resets to its ZERO state when hold function MMCPH10 is forced to a ZERO upon the receipt of control pulse RBCON1C which forces function RBCHT10 to a ONE. At this time, function RBRI00 is a ONE. When functions RCAAL10, RRASP00, RCEQR10 and RSMST00 are all ONES, the inverter gate 3062 forces function RBDCX00 to a ZERO and function RBDCX10 to a ONE which signals an address cycle and enables the transfer of the contents of address register 2966 via buses 2061 and 2984 to bus 150.

The logic block 3040 generates release function RBRLL0 via gate inverter 3042 which is applied to on the bus when the Address Response RCAAL flip-flop of FIG. 8e has been set to a ONE (i.e. RCAAL10 = 1) and when an EOT character has been received by the COMM DCA and the fact of that event stored within the Receive Command block of FIG. 8e (i.e. RCEOS10 =1). The release function RBRLL00 upon being applied to line OSB140Z initializes the system placing it in a predetermined state by causing all the devices operating on-line to be switched to their ready state. The other gate inverter 3004 of logic block 3040 forces function RBREL10 to a ONE when a release function RBREL00 applied to line OSB140Z is forced to a ZERO.

The block 3044 generates the requisite clear functions. Specifically in response to a clear function RMSMC00 being forced to a ONE by the scanner 100, the block logic generates appropriate reset power clear function RCPOC10 via an inverter gate 3046 and amplifier gate 3047 which is forwarded to the various logic sections of the COMM DCA. Additionally, the COMM DCA applies a power clear function RTPOC00 to line OAB160Z via an inverter gate 3048.

The logic of block 3070 generates a bus busy function RBBSL00 to be applied to line OSB130Z during an ON-LINE bus cycle (RROFC00 = 1). This function is forced to a ZERO signaling the bus is "busy" when the COMM DCA is either not active (RCATO00 1), or the Receive Command logic of FIG. 8e has set END character function RCEND10 to a ONE indicating the completion of a poll operation.

Also, when the COMM DCA receives a message indicating that the remote system does not want to receive further characters from a device (i.e. a wait condition), the COMM DCA by means not shown forces a function on gate 3072 to a ZERO. And, when there is a device failure, the COMM DCA will force function RC1CR00 to a ZERO. Either of these functions will force gate 3072 to a ZERO which again signals the bus is "busy". Accordingly, when the COMM DCA is active (RCACT00 = 0), or an End of Character function has not been set (RCEND10 = 0) and there is no wait condition or no device failure, then function RBBSL00 is forced to a ONE indicating that the busy is "not busy."

Additionally, block 3070 includes an inverter gate 3079 which in response to a busy function RBBSY00 being a ZERO forces function RBBSY10 to a ONE. Both functions RBBSYOO and RBBSY10 are applied to a Device Ready logic 3080 which includes gates 3082, 3084 and 3086. These gates force function RBDRY10 to a ONE and RBDRY00 to a ZERO when the device being addressed signals that it is ready by forcing bus line OSB130Z to a ONE.

The blocks 3090 and 3100 include logic circuits for decoding the address code assigned to the COMM DCA and an ETX character code respectively. As shown, the ETZ logic block 3100 feeds a Bus ETX stored (RBETS) flip-flop which switches to its ONE state during the data cycle (RBDAC10 = 1) of an ON-LINE bus cycle (RBOFC00 = 1) upon the receipt of a bus strobe (RBSSB10 = 1) generated by the COMM DCA logic 3020. The ETX decoder 3102, convention in design is equivalent to the scanner ETX decoder of FIG. 3c.

The block 3110 includes logic circuits for generating an idle check release function RBBCR10 via an AND gate 3114 signaling the failure of a device involved in the data transfer. Spedifically, when an idle function RBIDL00 applied via line OSB150Z is forced to ground (to a ONE), this forces function RBIDL10 to a ONE which forces function RBBCR10 to a ONE during an ON-LINE bus cycle (RBOFC00 = 1) upon the generation of a strobe (RBSTBIC = 1). The function RBBCR10 is forwarded to the Idle Check Release block 2515 of FIG. 8e.

A last group of logic in FIG. 8c is the Ready Logic block 3120. As shown, it includes a Bus Ready Transmit RBRSL flip-flop 3122 with associated gates 3124, 3126 and 3128 in addition to a Bus Strobe taken flip-flop 3130 with associated reset gate 3129. The ZERO output of both flip-flops are ORed by gate 3132 and applied to RBRDL gate 3134 whose output is applied to line OSB170Z.

When either memory is available (i.e. MMBAV10 = 1) then function RBBSL1B is forced to a ONE during a ON-LINE cycle (RBOFC00 = 1) which causes RBBSL flip-flop 3122 to be switched ot its ONE state upon the occurence of a strobe pulse (RBSTB1C = 1). Also, when neither an ETX character has been received (RBETX10 = 0) nor a memory writing operation has been completed (i.e. memory is not full wherein MMWBF1S = 0) then function RBBSL0C is forced to a ONE which switches RBBSL flip-flop 3122 to a ONE. The flip-flop 3130 switches to a ONE upon receipt of strobe RBSSB10 and switches to a ZERO when function RBCNL10 is forced to a ONE.

Initially, when the functions applied to gate 3134 are ZEROS, function RBRDL00 is a ONE. When the COMM DCA is to generate an address response, the functions RCAAE10, RCEQR10, and RRASP00 will be all ONES. This conditions gate 3134 to force function RBRDL00 from a ONE to a ZERO. Thereafter, each time flip-flop 3122 switches to a ONE, it forces function RBBSL0S to a ZERO. However, in the absence of a strobe RBSSB10 being a ONE, the flip-flop 3130 remains in its ZERO state, and functions RBBST00 and RBVDC10 force function RBRDL00 to a ZERO.

The logic block 3048 forces function RBVDC10 to a ONE when an input device forces bus line OSB180Z to a ZERO which forces function RBIDA10 to a ONE signaling that it has applied a character on the bus 150. This causes functions RBRI00, RBIDA10 and RBDAC10 to activate AND gate 3049 to force function RBVDC10 to a ONE. It will be noted that when flip-flop 3130 switches to a ONE, functions RBRSL0S and RBBST00 when both ZEROS, causes function RBRDL00 to be forced from a ZERO to a ONE. This change of state in function RBRDL00 signals that the COMM DCA has accepted the data character applied to the bus 150.

The logic 3120 also includes an AND gate 3136 which forces function RBDDD10 to a ONE when both functions RBRDY00 and RBLAR10 are ONES. As shown, the function RBRDY00 is received from bus line OSB170Z and is forwarded to FIG. 8*b*.

The Bus interface logic of FIG. 8c applies its outputs to the Command Logic section 2400 as well as to the Memory and Control Section 2000. The Command Logic Section of FIG. 8 will now be considered in greater detail.

Decoder 2402

Referring to FIG. 8, it will be noted that the decoder 2402 decodes each of the characters loaded into the I/O register 2960 upon completing the assembling thereof when function RCDEC10 is forced to a ONE. The decoding is accomplished in a well known manner by combining the assertion and negative sides of the stages which comprise the I/O register 2960. Also, in some instances the decoder includes flip-flops (not shown) arranged to store indications of having decoded predetermined characters so as to be able to combine these results in order to decode predetermined character sequences. In effect, the Receive Station 2404, described herein, employs a similar tech-nique for decoding the pertinent characters of certain character sequences described herein.

Receive Logic Section 2404 of FIG. 8*d*

Referring to FIG. 8*d*, it is seen that this logic section includes a plurality of flip-flops 2406, 2409, 2413, 2414, 2416, 2431, 2431 and 2441 with associated logic which comprises blocks 2405, 2407, 2415, 2420, 2430 and 2440 respectively. And, flip-flops 2456, 2460 and 2464 comprise block 2450.

In greater detail, a system address RRADS flip-flop 2406 of block 2405 switches to its ONE state via an AND gate 2408 which forces function RRADS1A to a ONE when the COMM DCA is in an address mode (RSADM10 - 1), the system address code assigned to the system applied to the I/O register is decoded by a jumper card 2412 by an AND gate 2410 forcing function RRADS1B to a ONE and when bits 5 and 6 of the same code are ONES. A hold function RRASH10 when forced to a ZERO, resets RRADS flip-flop 2406 to its ZERO state.

The RRSASS flip-flop 2409 of block 2407 switches to a ONE when the block 2405 forces system address function RRADS1A to a ONE and bit 7 of the system address character is a ONE. And, the flip-flop 2409 is reset to a ZERO by hold function RRADH10.

The flip-flops 2413 and 2414 of block 2411 are switched to their ONE states respectively when the decoder 2404 decodes a "NAK" character (i.e. forces RRCNK10 to a ONE when RRSTX00 is a ZERO) and "DLE" character (i.e. forces RRCDE10 to a ONE). The remote data processing systems transmits a "NAK" character to acknowledge the fact that the message transmitted by the COMM DCA was in error. When the data processing system acknowledges the message transmitted by the COMM DCA as good, it transmits the "DLE" character followed by either a "0" character or a "1" character. The "0" character and "1" character will cause the decoder 2404 to force functions RRCO010 and RRCO110 to ONES respectively. And, by ANDing these two functions individually with the function RRDLE10 from flip-flop 2414, the COMM DCA decodes two types of acknowledgement sequences referred to herein as ACK0 and ACK1. These sequences indicate the receipt of an even numbered block and odd numbered block of data without errors. The numbering of acknowledgements prevents the loss or duplication of transmitted messages.

Both flip-flops 2413 and 2414 are reset to their ZERO states via their hold gates when an EOT character is decoded by decoder 2404 which forces function RRCER00 to a ZERO. Additionally, when the last character of a message is transmitted, the COMM DCA forces function RXTLC00 to a ZERO which also resets flip-flop 2413 to a ZERO. And, each time a character is applied to decoder 2404 by forcing function RCDEC00 to a ZERO, flip-flop 2414 is switched to its ZERO state.

RRENQ flip-flop 2416 of block 2415 switches to a ONE when the decoder 2402 decodes an ENQ character forcing function RRCEQ10 to a ONE and either function RRAID10 or RRAIOD10 is forced to a ONE which forces function RRENQ1B to a ONE by activating an inverter AND gate 2418. In a similar manner, when function RRADH10 is forced to a ZERO, flip-flop 2416 resets to a ZERO.

In response to a device address code, the functions RRAID10 and RRAOD10 are generated by flip-flops 2421 and 2431 respectively of blocks 2420 and 2430 The flip-flop 2421 switches to a ONE when the system is in an address mode (RSADM10 = 1), bit 7 is a ZERO, bits 5 and 6 are ONES and system address function RRADS10 is a ONE. By contrast, flip-flop 2430 sets to a ONE under similar conditions indicated above except that address code bits 6 and 7 are ZEROS. Both flip-flops are reset to ZEROS via hold function RRADH10. This function sets to a ONE in accordance with the following equation: RRADH10 = RCEDC00 + RRENQ10 + RRASP1A + RRAID1A + RRAOD1A + RRENQ1A. This means when any of the above flip-flops are switches to a ONE or function RCDECOO is a ONE, function RRADH10 also is a ONE which maintains each of the flip-flops 2406, 2416, 2421 and 2431 in their respective states. These functions are ANDed with functions RRCER00 and RXMSI0A which are ONES in the absence of having received an EOT character and the Message State counter not being incremented.

The RRASP flip-flop 2441 of block 2440 is switched to its ONE state when the decoder 2404 decodes a "O" character forcing function RRCO010 to a ONE, the COMM DCA is in its initial or address mode wherein function RSADM10 is a ONE, and the same character has bits 6 and 7 coded to specify an input device transfer wherein function RRAiD1A is a ONE. The function RRADH10 also is used to reset flip-flop 2441 to its ZERO state.

It will be noted that gates 2441 and 2445 force a data poll received function RRDPR00 to a ZERO when functions RCEQR1A, RRSASS00 and RRAOD00 are ONES. This function when forced low signals the Communications Timing Control 2970 that the data set is clear to send.

A last group of logic circuits in block 2450 include an STX Stored Data flip-flop 2456, an ETB Stored Data (RREDB) flip-flop 2460 and Last Data Received (RRLDR) flip-flop 2464. The flip-flop 2456 switches to a ONE when the COMM DCA decoder 2404 decodes an STX character which forces receive function RRSCX10 to a ONE. The flip-flop 2356 remains in this state until the decoder 2404 decodes an ETX character or ETB character or an EOT character which forces functions RRCEX10, RRCEB10 or RRCER10 to ONES, respectively. Accordingly, gates 2454 and 2458 force hold function RRSTX0A to a ZERO resetting the flip-flop 2456 to its ZERO state. Also, either function RRCEB10 or RRCEX10 will switch End of Block (RREBD) flip-flop 2460 to its ONE state forcing function RREDB10 to a ONE. This function together with functions RSSLV10 and RCDEC10 activates RRLDL AND gate 2452 to switch flip-flop 2464 to its ONE state. The RREDB flip-flop 2460 is rest to a ZERO when an EOT character is received which forces function RRCER00 to a ZERO and causes hold function RRCCH10 to be forced to a ZERO. The RRLDR flip-flop 2464 resets to a ZERO when memory switch function MMMSH10 generated by the logic of FIG. 8b is forced to a ZERO.

Receive Subcommand Generator 2500 of FIG. **8*e***

This section, as mentioned, includes the control logic for generating the pertinent control signals for handling the transfers within the COMM DCA. Referring to FIG. **8*e*, it will be noted that the Section includes COMM Character Present to Line Unit logic block 2502, a Device Ready logic block 2510, an Idle logic block 2515, an Active logic block 2520, a Transfer logic block 2555 and a Character Store and Reset lobkc block 2590.**

As shown, the block 2502 includes a Character Present RCCHP flip-flop 2504 which sets to a ONE when a Message Transmit function RXMSS10 is a ONE, or the COMM DCA is ready to transfer data characters to the I/O register 2960 (functions MMCHP10 and RCFMM10 are ONES) or a character is ready for transfer (Increment function RXMSIIO =1 or RXMSS10 =1). The function RCRMM10 is forced to a ONE by the Message logic of FIG. **8*g*** which is operative to force functions either RXMS210 and RXSDB10 or RXMS210 and RXSDX10 to ONES as described herein.

The flip-flop 2504 resets to its ZERO state each time the character transferred to the I/O register 2960 has been transmitted, at which time character taken function DDCHT10 is a ONE which forces function DDCHT00 to a ZERO.

The next block 2510 includes Ready RCDRY flip-flop 2512 which switches to a ONE when the COMM DCA is active (RCAAL10 = 1) and when a ready response is received from the Bus Interface Logic which forces function RBDRY10 to a ONE. The flip-flop 2512 resets to a ZERO when the Message logic has transmitted a last character (RXTLC00 = 1). For example, the function RXTLC00 is forced to a ZERO in accordance with the equation: RXTLC00 = RXMS410 (RXSDX10 + RXSCX10 + RXSDB10).

The block 2515 includes an Idle check RCINC flip-flop 2516 which sets to a ONE when the Bus Interface logic 3110 forces function RBBCR10 to a ONE. The flip-flop 2516 resets to a ZERO when the reset function RCRST00 is forced to a ZERO.

The block 2520 includes the logic circuit which places the COMM DCA in an active status. As shown, this logic includes series connected flip-flops 2544, 2542 and 2540 whose outputs are used to derive the appropriate control functions for enabling the COMM DCA to perform device addressing as explained herein. The RCAAE flip-flop 2544 switches to a ONE by AND gate 2528 when both gates 2522 and 2536 force functions RCBAD10 and RCEQR10 to ONES when a strobe pulse is applied threto (RBSTB1C = 1). The AND gate 2522 activates when the COMM DCA address code has been decoded by the logic 2090 of FIG. 8c forcing functions RBBAD1A and RBBLZ10 to ONES, during the address interval (RBDAC00 = 1) of an ON-LINE cycle (RBOFC00 = 1). The AND gate 2536 activates when functions RCEQR10 and RCEQR1A are both ONES. Also, when the COMM DCA has received an EOT character (RCEOS10 = 1) and the Memory Switch Logic section indicates that Memory is empty (MMMBE10 – 1), then RCAAE flip-flop 2544 switches to a ONE during aN OFF-LINE bus cycle (RBOFC10 = 1). When switched to a ONE, flip-flop 2544 in turn causes flip-flops 2542 and 2540 to be switched to ONES sequentially. In particular, the ONE output of flip-flop 2544 resets to a ZERO when RCAAF flip-flop 2542 switches to a ONE. Similarly, RCAAF flip-flop 2542 resets to a ZERO which RCAAL flip-flop switches to a ONE. And, during an OFF-LINE bus cycle (RBOFC00 = 0), RCAAL flip-flop resets to a ZERO. The active RCAAT flip-flop 2546 resets to a ZERO when reset function RCRST00 is forced to a ZERO by the logic of block 2590.

The block 2555 includes the logic for generating several of the register transfer and control functions mentioned above. As shown, these include device address register to line function RCLAD10 which is generated when the Message logic of FIG. **8*g* forces function RXSOH10 to a ONE when message step logic function RXMS310 to a ONE when message step logic function RXMS310 is a ONE. Also, Bus Interface function RBDCX10 when forced to a ONE by block 3060 of FIG. 8*c* forces function RCLAD10 to a ONE which transfers the address code contents of the register 2966 to the bus 150.**

The transfer functions M1CTM10 and M2CTM10 are generated by AND gates 2560 and 2562 respectively. In particular, when transfer function RCDEC10 is a ONE, an ETB character has not been received (RRCEB00 = 0), and an STX character has been received (RRSTX10 = 1), flip-flop 2564 switches to its ONE state and remains in that state for one PDA pulse applying function RCSC110 to gates 2560 and 2562. Conversely, when an ETB character is received (RRCEB00 = 0), the flip-flop 2564 remains in its ZERO state. Accordingly either of gates 2560 or 2562 are enabled when function RCSCI10 is forced to a ONE when its associated memory is ready to have data characters written therein (i.e. M1WMF10 = 1).

The function RCDEC10 AND gate 2582 when activated by function DDCHP10 from Timing and Control 2970 indicating that there is a character present forces function RCDEC10 to a ONE which enables the contents of the I/O register 2960 to be applied to the decoder 2402 transfer bus 2960 or to either Memory 1 input register 2042 or Memory input register 2142. Additionally, function RCDEC10 is inverted by inverter gate 2584 and applied to Timing and Control 2970 which in turn forces function DDCHP10 to a ZERO which resets flip-flop 2583 to a ZERO and forces function RCDEC10 to a ZERO. When a next character has been assembled, the control 2970 again forces function DDCHP10 to a ONE.

A transfer I/O register function RCCID10 is generated when the Receive logic forces either function RRADID1A or RRAOD1A to a ONE. The function RRCID10 also activates a gate 2572 forcing transfer function RCDAL10 to a ONE. These functions transfer the address code in the I/O register into the device address register 2966 of FIG. 8.

The block 2555 further includes an AND gate 2574 which is activated when the bus ready response function RBDRY10 is forced to a ONE by the Device Ready logic block 3080 of FIG. 8*c*. The function RRSASS00 is normally a ONE unless the terminal is handling a status request as described in the copending application titled "Multifunction Polling Technique" referenced above.

A gate 2571 when activated in response to either functions RXSAD10 and RXMS110 or RSXOH10 and RXMS210 being ONES, forces system address to I/O register function RCSAS10 to a ONE. This transfers the system address code to the character generator 2900 of FIG. 8. Additionally, gate 2573 in response to either function RCFMM10 for functions RXSOH10 and RXMS310 being ONES, forces function RCCOA10 to a ONE and RCCOA00 to a ZERO. These functions in turn transfer the output of either the character generator 2900 or the bus logic gates 2980 via transfer buses 2981 and 2982 respectively into the output register 2950 of FIG. 8.

A last block 2590 of FIG. 8e includes an EOT stored RCEOS flip-flop 2592 which switches to a ONE state when the decoder 2402 decodes an EOT character forcing function RREOT10 to a ONE. And, when the Bus logic block 3040 forces a release function RBREL10 to a ONE indicating the completion of the data transfer operation, this function together with bus timing function RBNCD10 from block 3010 switches flip-flop 2592 to its ZERO state by forcing hold function RBRNL00 to a ZERO.

The block 2500 further includes a Repeat Message logic flip-flop 2600 which switches to its ONE state when the decoder 2404 decodes character sequences defining either a bad message (RRNAK10 = 1) or receipt of a DLE character (i.e. RRDLE10 = 1) when the the COMM DCA is in other than in the master status (i.e. RSMST10 = 0) or has not received a message to wait from the data processing system (RRDLK10 = 0). The flip-flop 2600 resets one PDA pulse later to its ZERO state. (i.e. ONE side of flip-flop 2600 will activate an AND gate 2602 to force function RCRPD10 to a ONE when either the COMM DCA transmitted has an ENQ character (RXENQ10 = 1) inquiring when the system is able to receive data and a good acknowledgement has not been received (RRACK00 = 1) or the decoder 2402 has decoded a character or a predetermined sequence of characters indicating the last message is erroneous or bad (i.e. function RRNAK10 = 1) when the COMM DCA is in the Master status (RSMST10 = 1). The output of AND gate 2602 is applied to the Memory Switch logic of FIG. 8*b*.

A further flip-flop 2610 referred to above as the Receive to Transmit Allow-flip-flop is also included in block 2590 and when switched to its ONE state it conditions the communications facility to transmit characters a bit at a time via Data Out line of FIG. 8. In particular, this flip-flop switches to a ONE when one of the functions within the sets of functions applied to gate 2612 is a ZERO. That is, when an EOT character is to be transmitted then function RXEOT00 is a ZERO, or when an ENQ character has been decoded (RRENQ00 = 0), or when the system address character has been received (RSTAD00 = 0), function RCRTA10 is forced to a ONE which switches RCRTF flip-flop 2610 to its ONE state. The ONE output of flip-flop 2610 is forwarded to the data set and is used to generate the REQUEST to SEND DATA function as described above. Also, the same output is ANDed with timing function RTT9S10 and RSSLV10 by gate 2614 to force function RCEDM10 to a ONE. This function is applied to the Memory Switch 2200 and in particular as an input to the M1MPC and M2MPC flip-flops so as to define the precise time at which memory is to switch.

The block 2590 also includes gates 2618, 2620, and 2622 which are arranged to force reset function RCRST10 to a ONE which in turn is used to switch certain of the flip-flops within FIGS. 8*c* and 8*b* to their ZERO states. When an EOT character has been received (RCEOS10 = 1) and a memory has had all of its contents read out to a receiving device at which time function MMMBE10 is a ONE, these functions force an inverter gate 2608 functio RCRST00 and RCRST10 to a ZERO and a ONE respectively. It will also be noted that when any other of the functions RXEOT00 and RTPCC00 are ZEROS, AND gate 2620 will force function RCRST00 to a ZERO and reset function RCRST10 to a ONE.

State Logic Section 2650 of FIG. 8f

The decoder 2402, in addition to having some of its output lines applied to the Receive logic 2404, also applies certain of its output lines to the Message State Logic Section of FIG. 8*f*. Referring to this section, it will be noted that this section includes a plurality of flip-flops 2654, 2664, 2666, 2672 and 2686 and associated gating logic within their respective blocks 2652, 2663, 2665, 2670, 2685.

The logic block 2652 includes the master status flip-flop 2654 which when in its ONE state places the COMM DCA in a transmit status. As shown, RSMST flip-flip 2654 switches to its ZERO state either when the Power Clear function RCPOC00 is forced to a ZERO (i.e., when the system is initialized) or then the Message Logic Section of FIG. 8*g* generates an EOT character which causes function RXEOT00 to be forced to a ZERO. The flip-flop 2654 is switched to a ONE when Receive RRENQ and RRAID flip-flops 2416 and 2421 of FIG. 8*d* both are ONES, a device ready signal has been received by the Receive Command logic (RCGOM10 = 1), and the device scanner 100 has generated a control pulse (RBCONIC = 1).

The block 2663 includes a single flip-flop 2664 which is switched to its ONE state when decoder 2402 decoded a character sequence specifying a system poll request which forced function RRASP10 to a ONE after the decoder 2402 decodes an ENQ character which forced function RRENQ10 to a ONE. The flip-flop 2664 is reset to its ZERO state when master state flip-flop 2654 is in its ZERO state The block 2665 includes a slave state flip-flop 2666 which when in its ONE places the COMM DCA in a Receive or slave status. The flip-flop 2666 switches to a ONE when the decoder 2402 has decoded an STX character forcing function RRCXSX10 to a ONE and when the terminal system has been addressed (RSTAD10 = 1). And, when the Receive Command logic of FIG. 8*e* forces reset function RCRST10 high, it causes the RSSLV flip-flop 2666 to switch to its ZERO state. The ZERO output side of this flip-flop is ANDed with Master Status function RSMT00 so that when both flip-flops are in their ZERO states, Address Mode AND gate 2618 is activated and forces function RSADM10 to a ONE.

The block 2670 includes a Send Header RSOOH flip-flop 2672 which sets to its ONE state via function RSMR1A when master status flip-flop 2654 is to be switched to its ONE state. As shown, the flip-flop 2672 is reset to a ZERO via forcing its hold function RSSOH0C to a ZERO which occurs when either a message has been acknowledged as good (RRACK10 = 1) and the COMM DCA is in synchronization with the communications facility (DDSY210 = 1) or an EOT character has been received (RRCER00 = 0).

The last block 2685 included in this section has a Terminal Address flip-flop 2686 which sets to a ONE when RRENQ flip-flop 2416 has been switched to a ONE (RRENQ10 = 1). The flip-flop 2686 is set to its ZERO state along with RSMST flip-flop 2604 when hold function RSMST0A is forced to a ZERO which inactivates its hold AND gate 2688.

Control Character Logic Section

The control character generator logic section 2900 of FIG. 8 will now be described in greater detail. This logic section causes the appropriate character sequences to be generated in response to certain message requests from the remote data processing system and the initiation of the various states of control during such message transfers. The character generator comprises eight AND/OR gate sections labeled RCCG1 through RCCG8 in FIG. 8. The control generator sections combine the states of pertinent control functions generated by the Message Logic of FIG. 8*g* and those state functions generated by the Message State Counter Stages MS1 through MS5 to generate the desired bit codes for each of the control characters in the sequence desired.

Only those sequences involved during data transfer and the functions involved in generating these sequences will be described in detail herein. These character sequences are generated in accordance with USASCII control procedures for data communication for point-point-and multipoint communication systems including Data Link Escape (DLE) extension which are employed for supervisory sequences. Also, each of the characters in each massage preferably comprise the American Standard Code for Information Interchange (ASCII) synchronous communications code wherein each data code character comprises 7 bits and a parity bit. For further details of the above, reference may be made to a document tilted the "Proposed USA Standard for Communication Control Procedures for the USASCII," April, 1968 published by the U.S.A.

In general, the COMM DCA begins a data transfer with a start of Header (SOH) character, followed by a system address (SAS) character, an input device (IDCA) address character, the data characters from the first of the memories followed by an End of Block (ETB) character or an End of Text (ETX) character and a block check character. After the COMM DCA transmits the first block and receives an acknowledgement from the remote data processing system, it transmits a next block of data characters and begins this message with an STX character if the preceding block ended in (ETB). It then follows this with data characters from the other of the memories then an ETB character or an ETX character and a block check character.

Figure 8H:
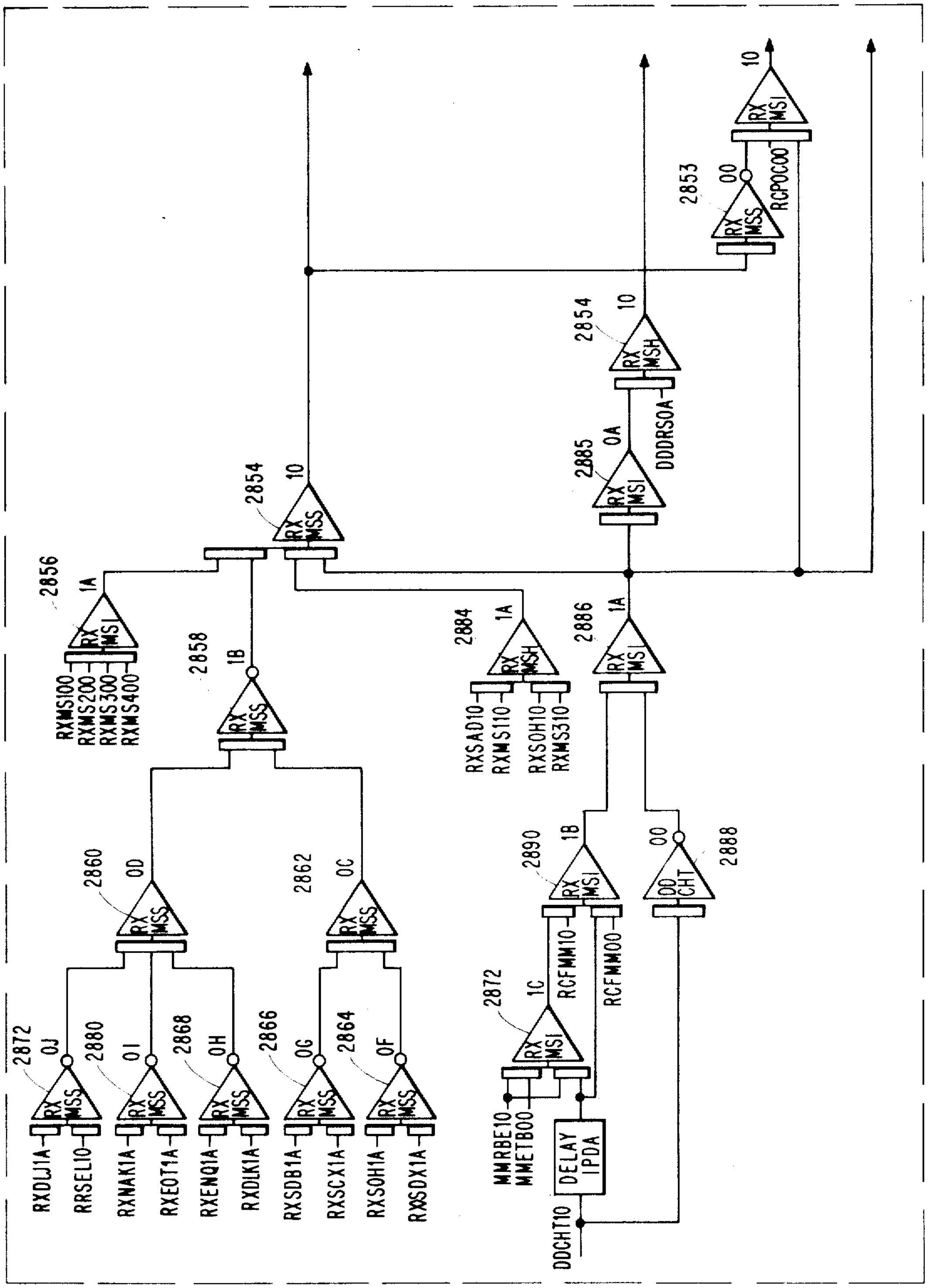
FIG. 8h shows in greater detail the message step logic circuits which form another part of the control character generation logic section of FIG. 8.

The logic circuits which condition the generator are shown in greater detail in FIGS. 8*g* and 8*h*. And, the various functions and the state of the Message Step Logic of FIG. 8 for generating the various Message character sequences are summarized in the table herein.

TABLE—TRANSMIT MESSAGE SEQUENCE

| Functions | MS1 | MS2 | MS3 | MS4 | MS5 |
|---|---|---|---|---|---|
| RXSOH10 | SOH | SYS ADD CHAR | IDCA ADD CHAR | | |
| RXSDX10 | STX CHAR | DATA CHAR | ETX CHAR | | |
| RXSDB10 | STX CHAR | DATA CHAR | ETB CHAR | | |
| RSSCS10 | STX CHAR | CAN CHAR | ETX CHAR | | |
| RXEOT10 | EOT CHAR | | | | |
| RXSAD10 | SYSTEM ADDRESS | | | | |
| RXDA110 | DLE CHAR | 1 CHAR | | | |
| RXDA010 | DLE CHAR | 0 CHAR | | | |
| RXDLJ10 | DLE CHAR | J CHAR | | | |

Message Logic Section 2702 of FIG. 8*g*

Referring to FIG. 8*g*, it will be noted that the major portions of the Message logic section include blocks 2704, 2740, 2764, 2770 which generate the requisite control functions for the above mentioned message sequences. In particular, block 2704 includes flip-flops 2706, 2708 and 2710 whose outputs are combined with predetermined outputs of the Message State Counter stages MS1 through MS5 to condition the character generator to generate the character sequences STX, CAN, ETX, or STX and ETX, or STX and ETB respectively. The block 2750 includes the flip-flops 2752 and 2754 with associated logic gates which together condition the character generator 2900 to transmit an SOH character. The system address character is transmitted by the character gnerator 2900 when conditioned by flip-flop 2765 of block 2764 and the message state counter outputs.

The flip-flops 2771, 2776 and 2777 and associated gates comprise block 2770. The logic block 2770 conditions the character generator 2900 together with the message state counter of FIG. 8 to transmit either the characters DLE and "0" or the characters DLE and "1" to acknowledge messages from the remote data processing system. And, the blocks 2780 and 2785 include a send EOT character flip-flop 2782 and an abort message flip-flop 2786 whose outputs together with the Message State Counter conditions the character generator 2900 to transmit an EOT character and a message consisting of characters DLE and J respectively. The operation of the above flip-flops will be described in connection with the type of message sequence that are used in transmitting.

Messages Indicating Input Device Failure/Output Device Failure

Considering the RXSCX flip-flop 2706, it will be noted that this flip-flop switches to a ONE when the Bus interface logic of COMM DCA senses a device failure which forces function RBBCR10 to a ONE which sets RCICR flip-flop 2516 of FIG. 8e to a ONE. This in turn forces function RXSCX1A to a ONE when function RXSDX1B is a ONE. The function RXSDX1B is a ONE when an SOH character has been transmitted (RXSOH10 = 1), during Message State three (RXMS310 = 1) and during the presence of an Increment signal (RXMSI1A = 1). Also, function RXSCX1B is a ONE when a first data block has been transmitted and acknowledged (RSSOHOO = 1) and an acknowledgement has been received to a subsequent block of dtaa (RRACK1D = 1). Thereafter, the ONE output of RXSCX flip-flop conditions an AND gate 2707 along with a function RXMS110 to become active in turn causing the character generator to transmit STX character. And, after that character is transmitted via the data set, the function RXSCX10 together with functions RXMS210 and RXMS210 activate further AND gates 2709 and 2711 to cause the character generator 2900 to generate CAN and ETX characters respectively.

It will be noted that in case of a first data block prior to RXSCX flip-flop 2706 being switched to a ONE, that function RCICR10 together with function RSSOH10 activates RSXOH gate 2760 which forces function RXSOH1C to a ONE. The function RXSOHIC and function RXSCXIC activate gate 2756 and switches RXSOH flip-flop 2752 and flip-flop 2754 to ONES. The function RXSCX1X is a ONE at this time because RXSCX flip-flop is in its ZERO state (RXSCX10 = 0) and gate 2736 is inactive (RXCX1A = 0).

Now with flip-flop 2754 in a ONE state, function RXSOH10 together with function RXMS110 causes an AND gate 2753 to become active and condition the character generator to transmit an SOH character whereafter the Message counter is incremented to Message state 2. The ONE output of RXSOH flip-flop 2754 also is applied to the transfer RCSAS gate 2751 of FIG. 8e. The function RXSOH10 together with function RXMS210 activate AND gate 2571 and cause the system address code to be transmitted by applying same to the first four gates (RCCG1 through RCCG4) of the character generator 2900. Thereafter, functions RXSOH10 and RXMS310 activate the gates 2557 and 2573 of FIG. 8e which causes the input device address code to be transferred from the register 2966 to the I/O register 2964. The function RXMFH10 is forced to a ZERO by the Logic Section of FIG. 8h which resets flip-flops 2754 and 2706 to their ZERO states.

Also, the flip-flop 2706 will be switched to a ONE by function RXSDX1B when the Repeat Message RCRPD flip-flop is a ONE causing function RCRPD10 to be a ONE. That is, if the COMM DCA does not receive a proper acknowledgement to the above message by data processing system, the repeat function RCRPD10 will by a ONE and together with function RXSDX1B will activate gate 2738 which in turn will again switch flip-flop 2706 to a ONE. Accordingly, the previous message characters STX, CAN and ETX, are repeated.

When a proper acknowledgement is received, function RRACK10 is forced to a ONE which causes the RSSOH flip-flop 2672 of FIG. 8f to be switched to its ZERO state by forcing hold function RSSOHOC to a ZERO which forces function RSSOHOO to a ONE. At the same time, RXSOH flip-flop 2752 is switched to its ZERO state by hold function RSSOHOC.

In summary, when the COMM DCA senses an input device failure, during the processing of a first block it sends the message: SOH character, AS character, AID character, STX character, CAN character and ETX character. The CAN character informs the remote data processing system of the device failure and that the block of data characters being assembled in memory is effectively lost.

And, when the COMM DCA senses and output device failure, it sends the message: "DLE" character and "J" character. The message informs the data processing system that the terminal device is unable to complete the data transfer.

The technique used in determining a failed device is described in detail in the copending application titled "An Automatic Terminal Deactivation Device" of Robert E. Huettner and Edward B. Tymann. However, for the purposes of this application it is sufficient to state that when a device fails, the COMM DCA by monitoring a pair of lines switches its idle check release (RCICR) flip-flop in FIG. 8e to its ONE state indicating the failure.

Similar to the above, when the Idle Check control flip-flop 2516 of FIG. 8e switches to a ONE during a data transfer involving an output device (i.e. function RSSLV10 = 1), it switches RXDLJ flip-flop 2786 of block 2785 to a ONE. Accordingly, this forces function RXDLJ10 to a ONE which together with function RXMS110 activate an AND gate 2788. The gate 2788 conditions the character generator 2900 to transmit a DLE character. After, this character has been transmitted by the data set, functions RXDLJ10 and RXMS210 activate an AND gate 2789 to condition the character generator 2900 to transmit a J character. When the Message state counter is again switched to its first state, as explained herein, it forces function RXMFH10 to a ZERO which switches flip-flop 2786 to its ZERO state.

Message-Including Transfers of Memory Contents

Also, the flip-flop 2754 is used to condition the character generator 2900 to generate the message consisting of characters SOH, AS, IDCA address, STX, DATA and ETB. In particular, the flip-flop 2754 is switched to its ONE state via gates 2758, 2762, 2760 and 2756 by functions RSSOH10, RSMST10, MMSRF10 and RXSDXOO being ONES. The functions RXSOH10 and RXMS110 condition the character generator to generate an SOH character. Thereafter the functions RXSOH10 and RXMS210 cause the Receive Command logic of FIG. 8e to force transfer function RCSAS10 to a ONE causing the character generator to apply the system address AS character to the I/O register. And, after the AS character is transmitted, functions RXSOH10 and RXMS310 cause the command logic of FIG. 8e to force transfer functions RCLADIO and RCCOA10 to ONE so as to transfer the Input device address character to the I/O register 2960.

Next, the functions RXSOHIO, RXMS310 and increment function RXMS11A activate AND gate 2724 which in turn causes RXSDB flip-flop 2710 to be set to its ONE state via gate 2718 when the Memory logic of FIG. 8b forces memory function MMETB10 to a ONE. The function MMETB10 is forced to a ONE when the MMETB flip-flop 2310 of FIG. 8b switches to its ONE state when one of the memories has been completely loaded with data characters (i.e. either function MIETBIO or function M2ETB10 is a ONE) and when the contents of the filled memory are to be read out to the I/O register (i.e. MISF10 or M2SRF10 are ONES).

The flip-flop 2710 in turn forces function RXSDB10 to a ONE and together with function RXMS110 activates AND gate 2716 causing the character generator to apply an STX character to the I/O register 2960. When the STX character has been transmitted, function RXMS210 together with function RXSDB10 activates gate 2506 of FIG. 8e which in turn forces transfer function RCCOA10 to a ONE thereby permitting data characters to be transferred from memory into the I/O register 2960 as long as RXSDB flip-flop remains in its ONE state. When all of the data characters have been transferred, the Memory Switch 2200 forces function MMSBE10 to a ONE which together with functions RXSDB10 and RXMS210 force function RXMS310 to a ONE as described herein. The functions RXSDB10 and RXMS310 activate AND gate 2714 which causes the character generator to apply an ETB character to the I/O register. If the same data is to be retransmitted, retransmit function RCRPD10 is forced to a ONE which will activate gates 2758 and 2756 to switch RXSOH flip-flop 2754 to a ONE. Accordingly, the same message is retransmitted. However, upon receipt of a proper acknowledgement, the memories switch and an STX character is generated as the first character of the second block of data characters because RXSDB flip-flop 2710 is still a ONE which in turn inhibits AND gate 2762 preventing flip-flop 2752 from being switched to its ONE state.

It will be noted that when function MMETB10 is a ZERO then RXSDX flip-Flop 2708 switches to a ONE. This forces function RXSDX10 to a ONE which together with RXMA110 activates gate 2716 causing the character generator to generate an STX character. In a similar fashion, functions RXSDX10 and RXMS210 force function RCCOA10 to a ONE and enable data characters to be transferred to the I/O register 2960. And, when the transfer is complete, the functions RXSDX10 and RXMS310 activate AND gate 2711 causing the character generator to apply an ETX character to the I/O register. The flip-flop 2708 when set to its ONE state also causes an STX character to be generated as the first character of the second block of data characters.

Transmit Acknowledge Message

The flip-flop 2765 together with flip-flop 2771 and 2776 are operative to generate a message consisting of the characters AS, DLE and "0". The RXSAD flip-flop 2765 switches to its ONE state when the COMM DCA becomes active at which time the Bus Interface Logic of FIG. 8c forces function RBLAR10 to a ONE which activates an AND gate 2767 causing the aforementioned switching.

Initially, the function RXMFH10 will be a ZERO which will reset both flip-flops 2771 and 2777 to their ZERO states. The function RRSEL10 is a ONE indicating that a device has been selected by the remote data processing system, as explained herein, which causes the Message State Counter to be set to its first state (i.e. RXMS110 = 1) as described herein. Accordingly, functions RXSAD10 and RXMS110 cause the Receive Command Logic to force function RCSAS 10 to a ONE which condition the character generator to transfer the system Address AS character to the I/O register 2960.

When the AS character has been transmitted, the Message State counter is switched again to state 1 (i.e. RXMS210 = 1). When the device signals that it is ready, function RCDRY10 is forced to a ONE and this function together with function RRSEL10 activates an AND gate 2773. Also after the AS character is sent, and AND gate 2774 is activated when function RXSD110 is forced to a ONE by functions RXMS11A and RXSAD10 which activate an AND gate 2766 of block 2764. Both gates 2773 and 2774 cause flip-flop 2771 to be switched to its ONE state. This forces function RXDAO10 to a ONE which together with function RXMS110 activates an AND gate 2779a. The gate 2779a conditions the character generator 2900 to apply a DLE character to the I/O register 2960. After the DLE character is transmitted by the data set, the Message State counter is incremented to state 2 (i.e. RXMS210 = 1). The functions RXMS210 and RXDA010 activate an AND gate 2779b to condition the character generator 2900 to apply a "0" character code to the I/O register via the transfer bus.

Upon receipt of the message, the data processing system will initiate a data transfer. When the COMM DCA receives an STX character, it forces function RRCSX10 to a ONE which switches RXDOO flip-flop 2776 to its ONE state. And, when the COMM DCA receives the last character, it forces function RRLDR10 to a ONE which via RRMRS10 in turn causes flip-flop 2777 to be switched to its ONE state. The functions RXDA110 and RXMS110 condition the character generator 2900 via an AND gate 2778 to transfer a DLE character to the I/O register. When the DLE character has been transmitted, the Message State counter is incremented by one to its second state (i.e. RXMS210 = 1). The functions RXMS210 and RXDA110 activate an AND gate 2780 which conditions the character generator 2900 to transfer a "1" character to the transfer bus.

When the STX character of a next message is received, the COMM DCA resets RXDOO flip-flop 2776 to its ZERO state which in turn enables the RXDAO flip-flop 2771 to be switched to its ONE state when the COMM DCA receives the last character of the message at which time it will again force function RRLDR10 to a ONE. Accordingly, functions RXDA010 and RXMS110 will activate an AND gate 2770*a* which again cause the character generator to transfer the characters DLE and "0" to the I/O register. Accordingly, the COMM DCA generates the DLE, O and DLE, 1 character pairs alternately for each message. When the COMM DCA detects a parity error or block check error, it forces a function RXMAKOO to a ZERO which inhibits the generation of either of the above acknowledgement responses and sets another flip-flop not shown which conditions the character generator to apply a "NAK" character code output of transfer bus to the I/O register.

Message Step Increment Logic

Referring to FIG. 8*b*, it will be noted that the block 2850 includes a Message Step Logic Section 2852 and Message Step Increment Logic Section 2880. The Section 2802 generates the Message Step Set Function RXMSS10 which sets the Message State Counter of FIG. 8*b* to a count of ONE.

At the same time, function RXMSS10 forces function RXMFH10 to a ZERO which switches a number of the control flip-flops of FIG. 8*g* to their ZERO or reset states. The five stages of the Message State Counter of FIG. 8 are arranged to function as a ring counter wherein only one of its stages is a ONE at any given time. The counter stages are reset to ZEROS when a hold function RXMSH10 is forced to a ZERO when either function RXMSIOH or DATA SET REQUEST TO SEND function DDDRSOA is a ZERO. The function RXMSS10 is forced to a ONE by AND gate 2856 activated when the counter stages are all ZEROS together with function RXMSS1B being a ONE. The function RXMSSB is a ONE when message state counter MS5 is a ZERO (i.e. RXMS510 = 0), and when the output of either AND gate 2860 or AND 2862 is a ZERO. The output of AND gate 2862 is a ZERO when either functions RXOHIA and RXSDXIA are ONES or functions RXSDB1A and RXSCX1A are ONES. The output of AND gate 2860 id a ZERO when functions RXENQ1A and RXDLK1A are both ONES of function RXEOT1A and RXNAK1A are both ONES or when functions RRSEL10 and RXDLJ1A are ONES. Additionally, function RXMSS10 is forced to a ONE when increment function RXMSI1A is a ONE and a gate 2884 is activated by either functions RXSAD10 and RXMS110 or functions RXSOH10 and RXMS310.

The function RXMSI1A is forced to a ONE when an AND gate 2886 is activated by functions DDCHTOO and RXMSIB being forced to ONES. When the character is transferred to the I/O register 2960, the control 2970 forces function DDCHT10 to a ZERO which causes inverter gate 2838 to force function DDCHTOO to a ONE. This causes the Message State Counter to be incremented by one to its next highest state via gates 2838 and 2832 when function RXMSI1B is a ONE. When a block of characters have been transmitted, the function Set Read Memory Empty (MMRBE10) is forced to a ONE. The function MMETBOO is a ONE when an ETX character has been decoded. These functions together with function RCFMM10 activate gate 2840 causing the aforementioned incrementing of the Message State counter. As previously mentioned, the function RCFMM10 is a ONE when the Message Counter in message state 2 (i.e. RXMS210 = 1) and either function RXSDB10 or RXSDX10 is a ONE. Accordingly, after incrementing, the Message State Counter will be in Message State 3 (i.e. RXMS310 = 1).

When the Message State Counter is in other than Message State 2, the function RCFMMOO is a ONE. Accordingly, after a character is transmitted, function DDCHT10 goes to ZERO, and the AND gate 2886 is activated to increment the Message State Counter to its next state. The function DDCHT10 is delayed by one PDA pulse so as to have the increment function RXMSI1A at a ONE for one PDA pulse. When the COMM DCA switches from transmit to receive, function DDRSOA is forced to a ZERO which forces hold function RXMSH10 to a ZERO which resets all of the Message Counter States to ZEROS.

DESCRIPTION OF THE OVERALL OPERATION OF THE SYSTEM

With particular reference to the timing diagrams of FIGS. 9*a* and 9*b*, the operation of the COMM DCA as both an input device and output device will now be described. It is assumed that the system of FIG. 1 has been initialized wherein all pertinent control flip-flops have been reset to their ZERO states at which time the COMM DCA will be in a quiescent or inactive state As previously mentioned, the COMM DCA controls the terminal operations in conjunction with the device scanner 100 during the ON-LINE bus cycle phases of the bus cycles. While in the quiescent or inactive state, the COMM DCA monitors the communications line for characters and conditions the Bus Interface logic to force busy function RBBSYOO to ZERO. That is, referring to FIG. 8*c*, the function RCEND10 is normally at ZERO while function RCACTOO is a ONE because its associated active RCACT flip-flop 2546 is in its ZERO state when the COMM DCA is in its quiescent state. Accordingly, the fucntion RCACTOO activates gate 3078 and forces function RRBSLOP to ONE which in turn causes inverter gate 3072 to force busy function RBBSLOO to ZERO during each ON-LINE bus cycle as defined by function RBOFCOO being a ONE.

The ZERO output of gate 3072 applied to bus line OSB130Z inhibits each of the input devices connected to the bus 150 from responding to its address code when it is placed on the bus by the device scanner 100. In particular, referring to block 980 of FIG. 7*d*, it will be noted that when function IFBSYOO is a ZERO, it forces function IFARFIA to a ZERO which inhibits the device address response (IFARF) flip-flop 982 from switching to its ONE state when the address code is decoded by the device logic circuits. And, this prevents the device logic of block 780 of FIG. 7*b* from generating a response to its address code via ready line OSB170Z. Now, the COMM DCA remains in its quiescent state, until it begins to receive and tansfer characters from its I/O register 2960. However, before this occurs, the COMM DCA logic must determine that it is in synchronization with the communications line. It accomplishes this in a conventional manner by determining when it detects having received two "sync" characters in succession.

As mentioned, the TX/RX timing control block 2970 of FIG. 8 is operative to generate strobe pulses from the data set receive clock which are referenced as function DDSTRIO in FIG. 8 and applied to an input gate 2972 of the last state of the I/O register 2960. These pulses are used to sample the state of the Data In Line and switch the state of Flip-flop stage to reflect same. At the same time, these pulses increment the bit counter included within Control 2970. When the counter has advanced to a count of eight, the complete character assembled in the register 2960 is decoded by a decoder within control 2970 to determine whether it is a SYNC character. If it is, it will cause a first flip-flop within the control 2970 to be switched to a ONE and when the next character assembled is decoded as a SYNC character, the ONE output of the first flip-flop together with the decoder output will cause a second flip-flop to be switched to a ONE which forces function DDSY210 to a ONE denoting the fact that the COMM DCA is in "SYNC."

Once synchronization is achieved, the COMM DCA will be operative to transfer characters other than SYNC characters to the decoder 2402 via bus 2962 when enabled by transfer function RCDEC10. As shown by block 2555 of FIG. 8*e*, the function RCDEC10 is forced to a ONE by control 2970 generated character present function DDCHP10. The function DDCHP10 is generated in accordance with the equation: DCHP10 = BT8·RCDECOO·DDSYDOO·DDSYN20. That is, the function DDCHP10 is forced to a ONE when a complete character is assembled (bit counter is at a count of eight), the transfer function RCDEC10 is a ZERO (RCDECOO = 1), the character is not a sync character (DDSYDOO = 1), and the COMM DCA is "in sync" (DDSY210 = 1). None of the sync characters are transferred to any of the portions of the COMM DCA since they perform no purpose other than that of syncronization.

Normally, the data processing system generates a supervisory message consisting of SYNC, SYNC, SYNC, SYNC, EOT, AS AID/AOD and ENQ characters. Accordingly, once in synchronization, the COMM DCA applies the EOT character via input transfer bus as a first 2962 character to be decoded by the decoder 2402. The decoder 2402 responds to the EOT character by forcing function RRCET10 to a ONE which is applied to the Receive Command Logic section 2500. In response to function RRCET10, the EOT stored RCEOS flip-flop 2592 of FIG. 8e switches to its ONE state and in turn forces function RCEOS10 to 2 ONE. The function RCEOS10 conditions the logic block 2590 to force reset function RCRSTOO to a ZERO which resets the memory switch MMMSW flip-flop 2202 and the system slave RSSLV flip-flop 2666 to their ZERO or reset states. Additionally, the function RCEOS10 is applied to the Bus Interface Logic and enables block 2040 to subsequently release the devices when the COMM DCA switches to an active state (i.e. when RCAAL10 is forced to a ONE). In effect, the COMM DCA is placed in a control state upon its recognition of the EOT character.

Referring to FIG. 8*f*, it will be noted that both the master and slave flip-flops are both in their reset states, AND gate 2668 of block 2665 forces address mode function RSADM10 to a ONE. When the COMM DCA assembles the system address (AS) character in the I/O register 2960 and applies it to input bus 2962, the Receive Logic 2402 of FIG. 8d decodes the code by the RRADS AND gate 2410 of block 2405. Upon detecting its terminal address code, the gate 2410 forces function RRADS1B to a ONE which in turn activates gate 2408 when the COMM DCA is in an address mode (RSADM10 = 1), and bits 5 and 6 of the AS character are both ONES. Normally bit 5 is a ONE: however, bit 6 is only a ONE when the COMM DCA is to transmit information from an Input Device to the remote data processing system. And, bit 6 is a ZERO when the data processing system is to transmit data to an output device.

Since this transfer involves an input device, bit 6 is a ONE and function RRADSIA is a ONE. Additionally, bit 7 of the AS character will also be ZERO. Therefore, system address (RRADS) flip-flop 2406 is switched to a ONE, at time defined by transfer function RCDEC10.

The next character assembled in the I/O register 2960 and applied to bus 2962 is that of a device address code. This character will also have bit 5 a ONE which forces function DDCI510 to a ONE and together with the function RSADM10, and RRADS10 being ONES, activates AND gate 2434 which conditions one input of AND gates 2432 and 2423.

Since the address character is that of an input device, bits 6 and 7 are a ONE and a ZERO respectively. Acordingly, AND gate 2424 is activated which forces function RRAIDIA to a ONE and switches Address RRAID flip-flop 2421 to its ONE state. Additionally, function ARAIDIA enables transfer gate 2570 of the Receive logic of FIG. 8*e* so as to store the address code applied bus 2962 in the address register 2966.

When the COMM DCA assembles and applies an ENQ character to bus 2962, the decoder 2402 forces function RRCEQ10 to a ONE, and this function together with RRAIO10 activates gate 2417 which switches ENQ address RRENQ flip-flop to its ONE state which forces function RRENQ10 to a ONE. The "ENQ" character defines the end of the message character sequence.

The device scanner 100 during its scanning places the address code of the COMM DCA on the bus 150. This code corresponds to an all ZERO address code. When the COMM DCA address code is placed on the bus, the Bus interface logic address logic AND gates 3092 and 3094 of block 3090 becomes active and force functions RBBAD1A and RBBLZ10 to ONES. Since the device scanner's DCA flip-flop 300 is still in its ZERO state, function RMDAC10 is at a ZERO. Therefore, the functions RRBAD1A, RBBLZ10, and RBDACOO during an ON-LINE bus cycle (RBOFCOO = 1) activate AND gate 2522 of Active logic 2520 of FIG. 8e which forces functin RCBAD10 to a ONE. The function RCEQR10 will be a ONE because both functions RCEQR1A and RRENQ10 are ONES.

Figure 9A:
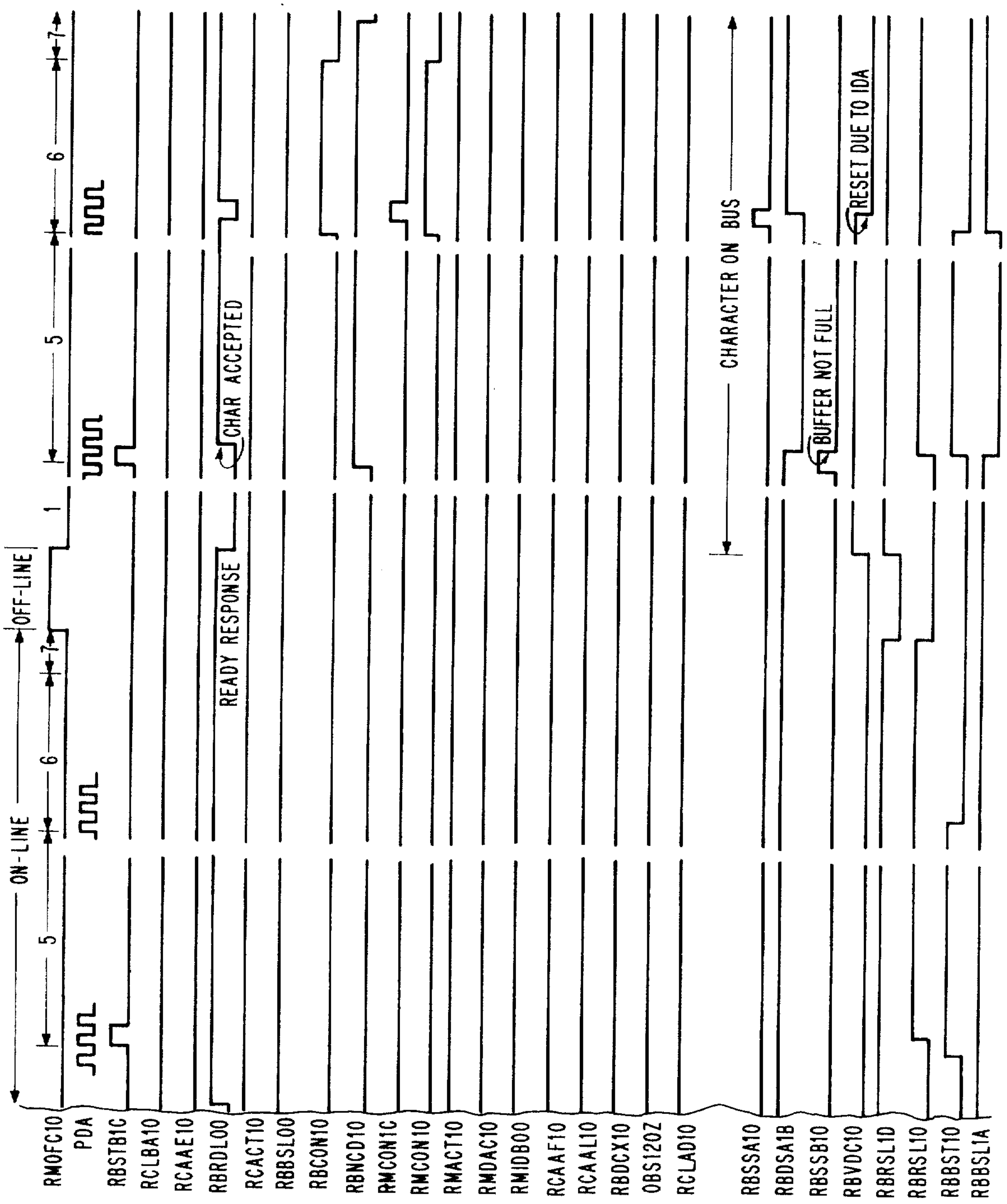
FIG. 9a is a timing diagram used to describe the operation for on-line processing of a data transfer by an input device of the terminal system of FIG. 1.

As illustrated in FIG. 9*a*, these three functions at strobe time (RBSTBIC) in turn activate gates 2528 and 2532 switching address RCAAE flip-flop 2544 to its ONE state. This forces function RCAAE10 to a ONE which switches active RCACT flip-flop 2546 to a ONE forcing function RCACT10 to a ONE and function RCACT00 to a ZERO. The function RCACT00 causes the Bus Busy transmit Logic 3070 to force the function RBBSL00 applied to line OSB130Z to a high level as shown in FIG. 9*a*. This enables the devices connected to the bus 150 to response to their address code when it is placed on the bus.

The function RCAAE10 also conditions the gate 3134 of the Ready logic 3120 of FIG. 8*c* to change the state of ready line OSB170Z from a ONE to a ZERO by forcing function RBRDL00 from its high voltage level to a zero volts level. As shown in FIG. 9*a*, the device scanner upon detecting the change in the line OSB170Z generates a control pulse RMCON1C and switches its RMACT flip-flop to a ONE which forces function RMACT10 to a ONE denoting the fact that there is an active input or output device. Here, the active device is the COMM DCA. Also, the scanner 100 at the end of the ON-LINE cycle switches its Data Cycle DCA flip-flop 300 to its ONE state to specify subsequent bus cycles as data cycles and not address cycles.

Referring to FIG. 3*c*, it will be noted that when the COMM DCA responds to its address code it forces function RMRRS10 to a ONE and the all ZERO code causes the AND gate to force function RMINRIC to a ONE. These functions cause flip-flop 398 to be switched to its ONE state which in turn forces function RMINROO to a ZERO. This in turn will inhibit the scanner 100, in particular the ETX decoder from causing the release of a device during a data transfer operation when an ETX character is applied to the bus 150.

Summarizing the above, when the address code of all ZEROS appear on the bus, the COMM DCA detects it and sends a ready response and disables the busy line. The scanner 100 recognizes the change of state in the line OSB170Z, generates pulse RMCON10, and switches its Active and Data cycle and inhibits ETX character Response flip-flops to their ONE states.

During the OFF-LINE bus cycle, when function RBOFC10 is a ONE, function RCAAE10 will switch RCAAF flip-flop 2542 to its ONE state forcing function RCAAF10 to a ONE. As shown by FIG. 9*a*, at the beginning of the next ON-LINE bus cycle (i.e. RBOFC00 = 1), function RCAAF10 causes RCAAL flip-flop 2540 to switch to a ONE which forces function RCAAL10 to a ONE. - Referring to the Release Bus Logic 3040 of FIG. 8*c*, it will be noted that functions RCAAL10 and RCEOS10 when both ONES, force function RBRLL00 applied to line OSB140Z to a ZERO. This releases all the devices which had up to this time been logically connected to the bus 150 and places the bus in an initial status.

Additionally, the function RCAAl10 causes the Data cycle control logic 3060 of FIG. 8*c* to force bus line OSB120Z to a ZERO by forcing function RBDCX00 to a Zero. A ZERO on-line OSB120Z specifies that this ON-LINE bus cycle is an Address cycle. At the same time, function RBDCX10 is forced to a ONE and this function condition gate 2557 of FIG. 8*e* to force transfer function RCLAD10 to a ONE which applies the address contents of the device address register 2966 of FIG. 8 via transfer bus 2984 to the Bus Interface logic of FIG. 8*c*. Also, the function RBDCX10 conditions the Bus transfer Logic 3050 to force function RBIDB00 from a ONE to a ZERO which applies the address code to bus lines OSB010Z through OSB090Z. Here, the COMM DCA is operative to assume control of the system and specify further address cycles.

Assuming that the input device being addressd is the card read/punch device, the DCA associated therewith upon decoding its address code will switch its address response IFARF flip-flop to its ONE state and therafter change the state of ready line OSB170Z. As shown in FIG. 9*a*, the device scanner 100 responds to the change in levels of the ready line by generating a second control pulse RMCON10. Referring to the Active logic 2520 of FIG. 8*e*, it will be noted that when RCAAF flip-flop 2542 switched to its ONE state during the OFF-LINE bus cycle, it caused RCAAE fli-flop 2542 to switch to its ZERO state by forcing hold function RCAAF00 to a ZERO as shown by FIG. 9*a*.

During the second address cycle (RDBAC00 = 1), AND gate 3082 of the Device Ready Receive Logic 3080 of FIG. 8*c*, is active and forecs function RBRIOOO to a ONE. This finction together with functions RBDAC00, RBBSY00, and RBCNL10 cause AND gate 3084 to be activated in turn forcing function RBDRY10 to a ONE. The function RBDRY10 in turn activates AND gate 2574 of FIG. 8*e* which forces function RCGOM10 to a ONE. Upon the receiving of the second control pulse, the Bus Control Timing Logic 3010 of FIG. 8*b* generates timing function RBCON1C. The functions RBCON1C and RCGOM10 activate AND gate 2662 which conditions the Master Logic 2652 of FIG. 8*f* so as to switch Master RSMST flip-flop 2654 to its ONE state which forces function RSMST10 to a ONE. This places the COMM DCA in a transmit or master status.

Referring to FIG. 8*c*, it will be noted that when in the transmit state, function RSMST00 is a ZERO and inhibits gate 3062 so as to force bus line OSB120Z high by forcing function RBDCX00 to a ONE. This enables the scanner 100 to now specify subsequent ON-LINE cycles as data cycles (RBDAC10 = 1). Also, the function MMMPC1A generated by the Logic section of FIG. 8*b* will have previously switched flip-flop 3024 to a ONE which forced function RBDSA to a ONE.

REferring to FIG. 8*b*, it will be noted that the second control pusle RBCONIC which caused the switching of the Master RSMST flip-flop 2654 to its ONE state, also at the same time activated gate 3398 together with function RBDRY10 which switches memory switch flip-flop 2202 to its ONE state forcing function MMMSW10 to a ONE. This in turn causes Write Memory 2 M2WMF flip-flop 2217 to switch to its ONE state conditioning the memory 2 for a writing operation.

At the same time, the function RBDRY00 while a ZERO inhibits Memory 1 Read (MIRMF) flip-flop 2206 from being switched to its ONE state. Since this memory has not been loaded with data characters, its contents will not be read out at this time as a result of its Read flip-flop 2206 being in its reset or ZERO state. At this time, Memory 2 is ready to have data characters written therein. And, at this time flip-flop 2300 is in its ZERO state which forces function MMWBFOS to a ONE. WIth M2WMF flip-flop 2217 in its ONE state, function M2WMF10 in a ONE and this function together with function RRSSB10 will activate AND gate 3034 of FIG. 8*c* to enable the transfer of characters along bus 3002 by forcing transfer function M2BTM10 to a ONE.

From the foregoing, it will be noted from FIG. 9*a* that the actual transfer begins when the Input Device places a data character onto the bus 150 and at the same time forces the function RBIDA10 to a ONE which in turn forces bus line OSB180Z to a ZERO. Depending on the speed of the device, several ON-LINE bus cycles may elapse before the device places a first character onto the bus 150. The device by forcing line OSB180Z to a zero volt level enables the logic 3048 of FIG. 8*c* to force valid data cycle function RBVDC10 to a ONE which in turn enables the Bus Strobe Logic 3020 of FIG. 8*c* to generate function RBSSB10. As mentioned, this function enables the transfer of the character on the bus into the input register 2142 of memory 2122 (i.e. memory 2).

As mentioned, the Bus Strobe Logic 3020 will only force function RBSSB10 to a ONE when valid data cycle function RBVDC10 switches to a ONE. At that time, the character applied to bus 3002 is transferred into the input register 2124 of the memory 2 when function M2BTM10 is forced to a ONE by function RBSSB10. Therefore, the character is written into a first memory storage location. At the same time, the COMM DCA signals that it is ready for a next character by forcing a change of state in ready line OSB170Z. In particular, the flip-flop 3122 of FIG. 8*c* will be switched to its ONE state each time function RBSTB1C is forced to a ONE because the memory being written into is not full (i.e. MMWBF1S = 0) and an ETX character has not been detected (i.e. RBETX10 = 0) on the bus 150. The flip-flop 3122 remains in its ONE state until the end of that ON-LINE bus cycle (i.e. when RBNCD10 = 0). The RBBST flip-flop 3130 will have been switched to its ONE state by function RBSSB10 and remains in this state until the scanner 100 generates another control pulse RBCON10 to force function RBCNL10 to a ONE in turn forcing hold function RBBSTOA to a ZERO.

As shown by FIG. 2, during the early portion of the ON-LINE cycle, function RBRDL00 is held at a ZERO as a result of functions RBVDC10, and RBBBT00 being ONES. Upon the receipt of a strobe RBSTB1C from the Scanner 100, the strobe logic 3020 generates function RBSSB10 which will switch RBBST flip-flop to its ONE state which forces function RBBST00 to a ZERO. Because function RBBSL0S is a ZERO (i.e. flip-flop 3122 switched to a ONE at strobe RBSTB1C) and function RBBST00 is a ZERO, function RBRDL00 is forced from zero volts to a high voltage level as shown by FIG. 9*a* signaling acceptance of the character.

The change of levels on bus line OSB170Z is detected by the scanner 100 which in turn generates a control pusle RBCON00. This pulse together with function RBNCD10 forces function RBCNL10 to a ONE which switches flip-flop 3130 to its ZERO state. Also, the bus control logic 3010 generates function RBCON1C which switches RBDSA flip-flop 3024 to its ONE state. The input device upon receipt of the control pulse RBCON00 changes the state of function RBIDA00 applied to line OSB180Z by forcing it to a ONE. This causes function RBIDA10 to a ZERO which in turn forces function RBVDC10 to a ZERO. The input device maintains line OSB180Z in this state until it places a next character on the bus 150 at which time it again forces RBIDA00 to ZERO which in turn causes function RBVDC10 to be forced to a ONE.

Although not shown, the AND gate 3049 which forces the function RBVDC10 to a ONE may have a parity function as further input wherein the valid data cycle function RBVC10 will not be generated until the character on the bus has good parity. Accordingly, in the absence of function RBVDC10 not being forced to a ONE, the COMM DCA will not cause a change of state in ready line OSB170Z. This could serve as an error indication. For further details as to how the scanner may deactivate a peripheral device under such circumstances, reference should be made to the copending application of Robert E. Huettner and Edward B. Tymann titled "An Automatic Terminal Deactivation Device" filed on even date herewith.

As mentioned, the character transferred into the Memory 2 input register 2142 will be written into the first storage location of the memory 2122. That is, initially memory 2 contains no information and therefore, the function M2LOD10 is forced to a ONE by logic equivalent to that of block 2227 of FIG. 8*b*. The function M2LOD10 causes all memory address counter stages to be switched to ZEROS. Accordingly, when transfer function M2BTM10 is forced to a ONE, this enables the Read/Write logic 2130 equivalent to that of FIG. 8*a* to initiate a read cycle followed by a write cycle wherein the first character is written into memory location specified by the ZERO contents of MAR 2148.

After the character has been written into the memory, in the manner previously described, increment function M2INC10 is forced to a ONE which in turn increments the MAR by ONE.

The COMM DCA continues to transfer characters from the bus 150 and write them into memory 2 until the memory is full. This, as mentioned, is defined by the state of Memory Pass complete M2MPC flip-flop of block 2292 of FIG. 8*b* which is equivalent to the logic 2272. This flip-flop switches to a ONE when either the top of Memory function M2TOM10 is generated by decoder 2152 of FIG. 8 or when an ETX character is decoded by the ETX Decode Logic 3100 of FIG. 8*c* which in turn switches RBETS flip-flop 3106 to its ONE state.

After M2MPC flip-flop switches to a ONE, it forces function M2MPC10 to a ONE which causes gate 2250 of FIG. 8*b* to switch the Memory Switch MMMSW flip-flop 2202 to its ZERO state when function MMMST10 is forced to a ONE. This switching of flip-flop 2202 forces function MMMSWOO to a ONE which enables AND gate 2218 to transfer characters from memory 2 along bus 2961 by forcing function MMM2G10 to a ONE. The function MMMWBF10 forced to a ONE by AND gate 2294 together with function MMMST10 activate AND gate 2296.

The function MMMST1D is forced to a ONE as follows. Referring to FIG. 8*b*, it will be noted that since memory 1 is available for writing, function MIBAV10 will be a ONE. This function together with function RRACK10 will force function MMBAVOO to a ZERO. The function RRACK10 is initially a ONE. That is, when the last character (i.e. ENQ character) of the message was received by the COMM DCA and the device signaled that it was ready, AND gate 2656 of FIG. 8*b* forced function RSMST1A to a ONE which in turn forced function RRACK10 to a ONE. Since the COMM DCA generates function RRACK10, RSSOH flip-flop remains in its ONE state as function DDSY210 is still a ZERO. Accordingly, function RSSOH00 is a ZERO.

The function RSSOH00 in turn enables function MMMST1D to be forced to a ONE thereby enabling the memories to switch. After a first block is transmitted, function RSSOH00 is a ONE and thereafter function MMMST1D will be a ONE only when function RBBSLOS is forced to a ZERO by the Bus Transmit Logic Block 3120 of FIG. 8*c* (i.e. when function MMBAV10 = 1).

The switching of flip-flop 2202 in turn causes Write 1 Memory M1WMF flip-flop 2207 and Read 2 Memory M2RMF flip-flop 2216 to be switched to their ONE states thereby conditioning memory 1 for a write operation and memory 2 for a read operation.

Referring to FIG. 8*b*, it will be noted that if function M2TOM10 was generated and an ETX character was not decoded (i.e. RBETS00 = 1), then M2ETB flip-flop 2314 will have been switched to its ONE state. Also, when the memories switch, the AND gate 2252 of FIG. **8*b* is activated by functions RBDRY00 and MMMST10 which force function MMSRF10 to a ONE. It will be noted that after the input device responds to its address code by changing the state of the ready line and the COMM DCA permits the scanner 100** to specify subsequent ON-LINE cycles as data cycles (i.e. RBDAC10 = 1) whereafter function RBDRY10 is forced to a ZERO (see FIG. 8*c*).

Referring to FIG. **8*g*, it will be noted that RXSOH flip-flop 2754 is switched to a ONE by function RXSOH1A when the memories switch at which time function MMSRF10 together with functions RXSOH1B, RXSDX00, and RXSDB00 force RXSOH1A to a ONE. When the flip-flop 2754 switches to a ONE, it forces functions RXSOH10 to a ONE which conditions the character generator 2900 to place an SOH character onto transfer bus 2955 which the I/O register 2960** stores upon the receipt of function DDCOT10.

Previously, when the COMM DCA receives an ENQ character from the data processing system, it forced RSTAD flip-flop 2416 of FIG. **8*f* to its ONE state which forces function RSTADOO to a ZERO. The function RSTAD00 in turn forces function RCRTA10 to a ONE which switched Receive to Transmit Allow flip-flop 2610 of the logic block 2590 of FIG. 8*e* to its ONE state. This in turn forces function RCRTF10 to a ONE which enables the data set Request to Send line. When the COMM DCA is not receiving data from the DATA-IN line, this forecs data set Clear to Send function DDDCS10 to a ONE at which time flip-flop 2610 is switched to a ZERO. Thereafter, the COMM DCA is ready to transmit characters via the data set. It will be noted that the control 2970 enables the contents of the I/O register to be applied to gate 2974 only when function DDTSD10 is 2 ONE. This function is forced to 2 ONE after the control 2970 has transmitted four SYNC characters via line SYNC IN. After the COMM DCA has completed its transmission of 4 SYNC characters, the control 2970** forces function DDTSD00 to a ZERO and function DDTSD10 to a ONE. This arrangement provides for synchronization purposes that each message transmitted by the COMM DCA is always prefixed by four SYNC characters.

After the SOH character is transmitted, the function DDCHT10 is forced to a ONE which causes the Message state counter to be incremented by increment function RXMSI10 to its second state which forces function RXMS210 to a ONE. The functions RXMS210 and RXSOH10 force function RCSAS10 to a ONE which causes the character generator to place the System Address Code onto the bus 2955 for storage by the I/O register. After the AS character is transmitted, function RXMSI10 again increments the Message state counter to its third state which forces function RXMS310 to a ONE. This function together with function RXSOH10 forces function RCLAD10 to a ONE which causes the IDCA address code to be applied to path 2955 whereafter it is stored to the I1O register and transmitted.

When functions RXMS310 and RXSOH10 are both ONES, the next time function RXMSI10 is a ONE it causes the Message Counter to be again set to its first state via gates 2834 and 2804. At this time, either flip-flop 2700 or 2710 will be switched to its ONE state. This, as mentioned, depends on whether an ETX character was detected or the top of Memory function M2TOM10 was generated. Assuming that the decoder 2152 forced function M2TOM10 to a ONE which in turn switched MMETB flip-flop 2310 to its ONE state, function MMETB10 will cause flip-flop 2710 to switch to its ONE state. Accordingly, function RXSBD10 is a ONE and it causes the character generator 2900 via gate 2716 to apply a STX character to bus 2955 which is stored in the I/O register and thereafer transmitted.

Upon completing the character transmission, increment function RXMSI10 is again forced to a ONE which increments the Message Counter to its second state which forces function RXMS210 to a ONE. The message counter remains in this state until the memory transfer is completed. When the transfer is completed, the function MMRBE10 is forced to a ONE. That is, referring to FIG. **8*b*, it will be noted that the function M2SBE10 will be forced to a ONE by logic 2256 equivalent to that of block 2252** having detected a ONE in the 10th bit position of the last character of the block of data. The function M2SBE10 will in turn force function M2LOD10 to a ONE causing the stages of the MAR to be reset to ZEROS and force function M2SBE1A to a ONE which switches functionMM-RBE10 to a ONE.

Referring to FIG. **8*g*, it will be noted that before function MMETBOO is forced to a ZERO the functions MMRBE10, MMETB00 and RCFMM10 together via gate 2840 force increment function RXMSI10 to a ONE which increments the Message Counter to its third state (i.e. RXMS310 = 1). The function MMETB00 will be a ONE because its associated flip-flop 2310 of FIG. 8*b* will have been switched to a ZERO initially. When function MMETB10 is forced to a ONE, this function together with function MMSRF10 switch RXSDB flip-flop 2710 to 2 ONE via gates 2732 and 2718. The functions RXMS310 and RXSDB10 condition the character generator 2900 to apply an ETB character onto bus 2995** whereafter it is stored in the I/O register and transmitted.

It will be appreciated that while the Memory 2 is transferring characters to the I/O register that characters can be written into the Memory 1 from the same input device until Memory 1 is full. At that time, the Memory 1 Pass complete flip-flop 2286 will be switched to its ONE state. Now, memory switching will take place only when a good acknowledgement is received from the data processing system which forces function RRACK10 to a ONE and there is a memory available (i.e. function M2BAV10 = 1). Accordingly, gate 2250 will cause the MMMSW flip-flop 2202 to be switched to its ONE state which in turn switches Memory 1 Read MIRMF flip-flop and Memory 2 Write M2WMF flip-flop to their ONE states. This conditions memory 1 for a read operation and memory 2 for a write operation.

In the event that a good acknowledgement is not received by the COMM DCA for a block of information, function RCRPD10 will be forced to a ONE by the Repeat Message logic 2590 AND gate 2602 in FIG. **8*e*. This will switch the Read and Write flip-flops of the memory whose contents were transmitted (i.e. memory 2) to their previous states so that the contents are transmitted again. At the same time, function RRACK10 will be a ZERO thereby inhibiting memory switching with the memory MMMSW flip-flop being held in its present state. At the same time, because neither memory is available for writing, function MMBAV10 will be a ZERO while function MMWBF1S is still a ONE because one of the memories is still full. Therefore, the flip-flop 3122 of FIG. 8***c* will remain in its ZERO state and will force the function RBRDL00 to a ZERO to signal not ready via ready line OSB070Z when the input device initiates a valid data cycle by causing function RBVDC10 to be a ONE. With the ready line remaining in this state, no new information will be written into the memory conditioned for writing (i.e. memory 1).

The above switching continues with each good acknowledgement until the input device depletes its media. As described in the copending application of Robert E. Huettner and Edward B. Tymann titled "Remote Terminal System," the device controller in response to an out of media signal from its device will release the input device from the bus 150 by switching the release line to a ZERO. When this happens, the Bus Interface logic section will force function RBREL10 to a ONE which in turn activates AND gate 3043 of FIG. 8*c* forcing function RBBRS10 to a ONE.

Referring to FIG. 8*e*, it will be noted that function RBBRS10 causes flip-flop 2624 to switch to its ONE state. Previously, the Bus Logic section upon detecting either an ETX character or the top of memory function associated with the memory being written into will switch the Memory Pass Complete flip-flop to a ONE. This causes the memories to switch when the information contents from one of the memories has been transmitted and the COMM DCA receives a good acknowledgement which forces function RRACK10 to a ONE. The function RCPLC10 after the memories switch will switch the Memory Pass flip-flop to its ZERO state as well as the corresponding Memory Write flip-flop to its ZERO state. Thereafter, function RCEND10 forces RXEOT flip-flop to its ONE state when the memory written into last has been read out to the I/O register 2960 which forces function MMRBE10 to a ONE which in turn forces function RXEOT10 to a ONE. When the COMM DCA transmits the last data character, it will condition the character generator 2900 via RXSDX flip-flop 2708 of FIG. 8*g* to send an ETX character during message state 3. This is followed by a block check character whereafter the function DDDRS0A is forced to a ZERO which resets the message counter stages to all ZEROS.

The function RXEOT1A conditions the Message Step Logic 2802 of FIG. 8*h* to switch the Message state counter to its first state (i.e. RXMS110 = 1). And, the functions RXEOT10 and RXMS110 contition th character generator to apply an EOT character onto bus 2995 for storage in the I/O register 2960. However, since the transmit data set flip-flop will have been reset to a ZERO, the EOT character is not transmitted until the COMM DCA again enters the transmit mode. This happens when a good acknowledgement is received from the data processing system which forces either function RRDA000 or RRDA100 to a ONE which switches RCTRF flip-flop to a ONE. After CLEAR TO SEND function comes high and four SYNC characters are transmitted, the EOT character is transmitted.

The sending of the EOT character terminates the COMM DCA transmission. Additionally, function RXEOT10 inhibits AND gate 2618 of FIG. 8*e* which forces reset function RCRST00 to a ZERO and function RCRST10 to a ONE. These functions are applied to the pertinent control flip-flops within the system and cause them to be switched to their ZERO states.

Output Device Data Transfer

Figure 9B:
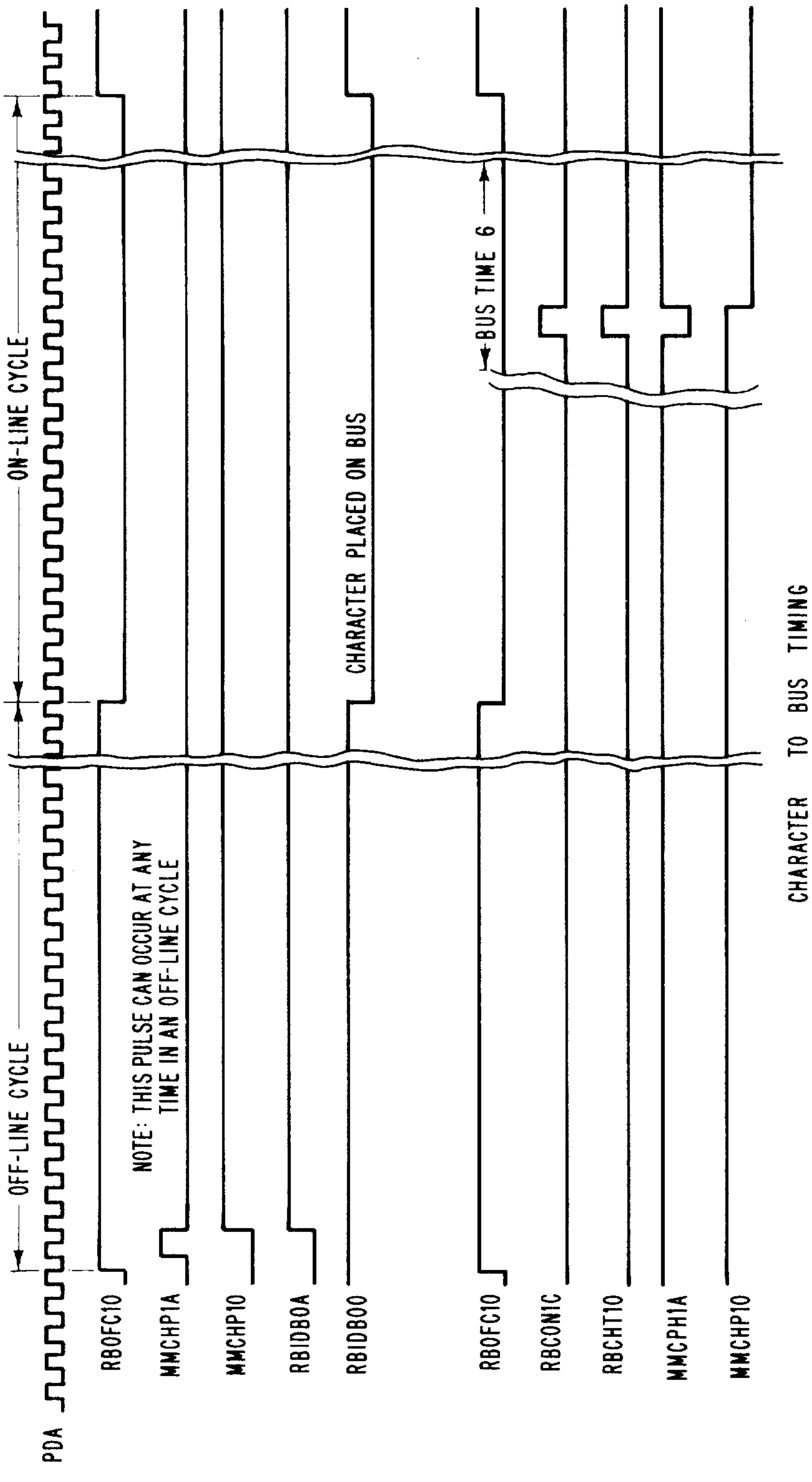
FIG. 9b is a timing diagram used to describe the operation for on-line processing of a data transfer to an output device of the terminal system of FIG. 1.

FIG. 9*b* shows the timing diagram for a character transfer involving an output device. It will be noted that initially the COMM DCA performs the same operations relative to processing the message from the remote data processing system. One difference is that since the operation involves an output device, bit 6 of the device address code will be a ZERO. Accordingly, flip-flop 2431 will be switched to its ONE state in lieu of flip-flop 2422. Upon the receipt of the ENQ character, function RRAOD10 together with RRENQ10 causes ENQ flip-flop 2416 to be switched to its ONE state.

As previously explained, the COMM DCA upon decoding its address code, will switch its active RCACT flip-flop to its ONE state which in turn will release the busy line, the bus ready transmit and bus data cycle transmit functions. The COMM DCA as shown in FIG. 9*a* places the output device address code on the bus 150 and monitors the ready line. Assuming the device is ready, it will signal ready via function RBDRY00 on line OSB170Z. This will activate AND gate 3136 of logic block 3120 of FIG. 8*c* forcing function RBDDD10 to a ONE. The function RBDDD10 conditions the Message Logic section of FIG. 8*g* to generate the requisite functions for transmitting the message characters 4 SYNC, AS, DLE and "0". By sending the DLE and 0 characters, the COMM DCA indicates that it is ready to receive (i.e the output device selected is ready to receive data).

The data processing system will then send 4 SYNC characters, an STX character and the information characters followed by either an ETX or ETB character.

As previously described, when the COMM DCA achieves synchronization with the communication line, it then begins to transfer all information characters except "SYNC" characters which it eliminates.

The first character to be transferred to the decoder 2404 will be a STX character. This character when decoded forces funciton RRCSX10 to a ONE. From FIG. 8*a*, it will be noted that functions RRCSX10 and RSTAD10 cause the System Slave RSSLV flip-flop 2666 to switch to its ONE state which forces fucntion RSSLV10 to a ONE. This places the COMM DCA in its receive state.

The memory logic of FIG. 8*b* will have been initialized wherein the Memory switch MMMSW flip-flop 2202 will have been switched to its ONE state which will condition memory 2 for a writing operation. Since at the time of a first switching function RBDRY00 is a ZERO, the read memory 1 flip-flop 2206 is not switched to its ONE state. Since the system will have been cleared initially, the logic blocks 2227 and 2237 will have forced functions M1LOD10 and M2LOD10 to ONES which reset the MARS of Memory 1 and Memory 2 respectively to all ZEROS.

The Control 2970 forces function DDCHP10 to a ONE when a character has been assembled in the I/O register 2960. This in turn forces function RCDEC10 to a ONE which will switch RCSCI flip-flop 2564 of FIG. 8*e* to a ONE because when the sTX character was received, the STX flip-flop of FIG. 8 was switched to a ONE which forced function RRSTX10 to a ONE. This flip-flop remains in its ONE state until the docoder 2402 receives either an ETX or ETB and an EOT character at which time it will cause the STX flip-flop 2446 of FIG. 8*d* to be switched to its ZERO state.

The functions RCSCI10 and M2WMF10 activate AND gate 2562 forcing function M2CTM10 to a ONE enabling the character in the I/O register to be transferred via bus 2964 into the input register 2142 of memory 2122 of FIG. 8.

It will be noted that RCSCI flip-flop 2564 switches to a ZERO a PDA pulse later and hence transfer function M2CTM10 endures from one PDA pulse. The Read/-Write logic 2130 of FIG. 8*a* writes the character into the memory 2122 and causes the MAR to be incremented by one. When the next character is assembled, it will be in the same manner transferred into the input register 2142 and written into the memory 2122.

The above transfer operation continues until the COMM DCA receives either an ETX or ETB character. As mentioned, the first data block includes an STX character, the text characters follow by a terminating character ETX or ETB and a block check character. The ETX character is used as a terminating character if the block is less than the size of the memory. If the message is transmitted as a series of blocks (i.e. the system is operating in the batch mode) the ETB character is used to terminate all blocks except the last block.

When either the ETX or ETB character is applied to the decoder 2404 via bus 2962, it forces function RRCEX10 to a ONE which forces RREBD flip-flop 2450 of FIG. 8*d* to its ONE state. Referring to FIG. 8*d*, it will be noted that this in turn activates AND gate 2452 which in turn switches RRLDR flip-flop 2454 to its ONE state upon the receipt of a next character which is the block check character.

The COMM DCA is operative to transfer the ETX character from the I/O register 2960 and write into the memory 2122. However, the ETB character will not be transferred since function RRCEB00 will be switched to a ZERO and inhibit RCSCI flip-flop 2564 from being switched to its ONE state to enable the transfer by forcing function M2CTM10 to a ONE. At the same time, function M2CTM10 by being a ZERO inhibits the Read/Write logic equivalent to FIG. 8*a* from generating the Read/Write cycles and the subsequent incrementing of the MAR 2148.

Referring to FIG. 8*a*, it will be noted that when function RRLDR10 switches to a ONE, the Read/Wrige logic 2130 initiates a Read/Write cycle at which time functions RRLDR10, RCERC00 and M2WMF10 activate gate 2144 of FIG. 8 to write a flag bit into the 10th bit position of the next addressed character storage location. The fucntion RCERC00 is a ONE when the COMM DCA has determined that the check character compares with the one it generates by conventional apparatus (not shown). Simultaneously therewith, the Message Logic section of FIG. 8*g* is conditioned to transmit the message SYNC, SYNC, SYNCN, DLE and "1" acknowledging the receipt of the first block. In particular, referring to FIG. 8*g*, it will be noted that RXDOO flip-fop 2776 is in its ONE state. The reason is upon receipt of the STX character, function RRCXS10 caused the flip-flop 2776 to be switched to a ONE. Accordingly, when function RRLDR10 is forced to a ONE, it forces functions RRMRS10 to a ONE which together with functions RXDOO10 and RRCEROO switch RXDA1 flip-flop 2777 to a ONE. When the data set is conditioned to transmit, the control 2970 will transfer four SYNC characters and thereafter enable the transfer of a "DLE" character followed by a "1" character. In the manner described, the character generator 2900 will transmit the DLE and 1 characters respectively to the I/O register 2960 as the Logic section of FIG. 8*h* increments the Message Counter through message states 1 and 2.

When the RRLDR flip-flop switches to a ONE and forces function RRLDRIS to a ONE, the memory switching logic switches memories. In particular, the M2MPC flip-flop of logic 2292 will have been switched to a ONE. The function RCEDM10 is forced to a ONE when function RRLDR10 forced function RRMRS10 to a ONE causing RCRTF flip-flop to switch to a ONE at the end of character defined function RTT9S10 whereafter functions RCRTF10 and RSSLV10 force function RCEDM10 to a ONE. Accordingly, function M2MPC10 is forced to a ONE and activates gate 2235 which resets the AMR stages to ZEROS via function M2LOD10. Also, functions M2MPC10 and M2WMF10 condition gate 2294 to force function MMWBF10 to a ONE which activates AND gate 2242. Therefore, when function RRLDR1S is forced to a ONE, gate 2250 develops a pulse which switches memory switch flip-flop 2202 to its ONE state which in turn conditions memory 2202 for a write operation and memory 2120 for a read operation. Now, the COMM DCA is operative to load memory 2022 with characters of a second block as received via I/O register 2960. Simultaneous therewith, the COMM DCA transfer characters from memory 2120 onto the bus 150 which are stored in the memory of the selected output device controller (DCA) and thereafter printed by the DCA's associated device.

The FIG. 9*b* shows the pertinent functions involved in transferring a character from memory 2122 to the bus 150. Referring to FIG. 9*b*, it will be noted that function MMCHP1A is forced to a ONE when the memory (i.e. memory 2122) has loaded a complete character into its input register 2142. The function MMCHP1A switches flip-flop 2264 of FIG. 8*b* to a ONE. The function MMCHP10 conditions AND gate 2258 so as to apply the character stored in the register 2142 to bus 2984 via bus gating logic 2980. This same character is then applied to the bus 150 when function RBIDBOO is forced to a ZERO.

Referring to FIG. 8*c*, it will be noted that during an OFF-LINE bus cycle (RBOFC10 = 1), function MMCHP10 switches flip-flop 3054 to a ONE and during the following ON-LINE bus cycle (RBOFCOO = 1), gate 3052 is activated to force function RBIDBOO to A ZERO. As shown in FIG. 9*b*, the function RBIDBOO enables the data character to be applied to the lines OSBO10Z through OSBO9OZ of bus 150 through their respective LTR circuits. And, the function RBIDBOO is also applied to line OSB18OZ which signals the output devices connected to the bus 150 that the COMM DCA has applied a character to the bus.

As previously described, when the DCA of the output device writes the character in its memory, it will change the state of the ready line. And, the sacnner 100 will generate a control pulse RBCON10. As shown in FIG. 9*b*, the logic block 3010 of FIG. 8*c* will generate pulse RBCON1C and this pulse conditions the logic block 3060 to activate AND gate 3066 which forces bus character taken function RBCHT10 to a ONE. The function RBCHT10 conditions the gate 2262 to FIG. 8b to force its output to a ZERO which switches MMCHP flip-flop 2264 to its ZERO state.

The above operations are repeated for each character until a flag or sentinel bit is detected whereupon the read operation is terminated. That is, referring to FIG. 8b, the flag bit forces function M2SBE10 to a ONE which switches M2BFE flip-flop to a ONE and resets the memory MAR to ZEROS via function M2LOD10. At the same time, function M2SBE10 inhibits flip-flop 2264 from being switched to a ONE. Accordingly, this prevents the assembled character from being transferred to bus 150.

When the writing operation of memory 2022 is complete, the memory switching section of FIG. 8b will cause the memories to switch whereafter the contents of memory 2022 will be transferred to the bus 150 and new information will be written into memory 2122.

Again, the COMM DCA is operative to acknowledge the receipt of the second block of information by generating the message: SYNC, SYNC, SYNC, SYNC, DLE and O. That is, referring to FIG. 8g, it will be noted that the STX character will have caused RXDOO flip-flop 2776 to be switched to its ZERO state. Therefor, when function RRLDR10 is forced to a ONE, RXDAO flip-flop 2771 is switched to its ONE state. The function RXDA)10 conditions the character generator 2990 to transmit the DLE and "0" character as the Message Counter sequences through states 1 and 2.

The aforementioned transfers and acknowledgements continue until the remote data processing system terminates transmission by sending the message characters SYNC, SYNC, SYNC, SYNC and EOT. When the decoder 2402 decodes the EOT character, it forces function RRCET10 to a ONE which switches RCEOS flip-flop 2592 of FIG. 8e to its ONE state. In the manner previously described, this forces reset functions RCRSTOO and RCRST10 to a ZERO and ONE respectively which cause the COMM DCA to switch to a control state. That is, all the control flip-flops are switches to their ZERO states when the COMM DCA receives the EOT character.

In summary, the invention has been shown to provide a method and apparatus for coupling a remote terminal system to a communications channel. In such instances, the system is coupled to the channel by a communications apparatus which is capable of operating as both an input device and an output device. Additionally, the communications apparatus performs the functions heretofore performed by the central control element of the system.

Since the communications apparatus is attached and removed to and from the remote system as an additional device without modification to the system, the invention facilitates expansion of the communication capabilities of the system. Those skilled in the art will readily appreciate that single system may be expanded a variety of different communication facilities attachable thereto as the existing data handling devices. However, it will be appreciated that the invention should be in no way construed to be limited to the type of communications facility described. The modular communications apparatus may be coupled to any type of communications channel interface both synchronous and asynchronous.

Additionally, the invention provides a technique for automatically blocking the data characters transmitted to and from the data handling devices of the system when End of Text characters or the equivalent is not inserted between the input media. When the data characters transmitted exceed a predetermined number, the apparatus of the invention segments the characters into blocks of a predetermined size. As described, the size of the blocks is easily adjusted.

The foregoing arrangement eliminates the need to restrict the input media transmitted and received by asynchronous devices in some way so as to make it compatible with the size of the memory store of the apparatus of the present invention. Additionally, the present invention facilitates the transfer of data characters between the various devices of the system and the communications apparatus by including a memory store within each of the device controllers of the terminal system.

Further, it will be appreciated that while the illustrated embodiment provided for transmission of header information in certain instances that with the addition of few logic circuits the same apparatus can be adapted to transmit header information in all instances in which an ETX character has been transmitted in the previous message. For example, in the preferred embodiment, an additional bistable device can be arranged to store an indication from the Message Logic (i.e. RXSDX flip-flop has been switched to a ONE) that the ETX character was transmitted. And, the output of this device together with functions indicating that the previous transmitted message was accepted at the appropriate time will condition the pertinent message logic circuits (i.e. RSSOH10) to transmit the header information.

To prevent undue burdening the description with matter within the ken of those skilled in the art, a block diagram approach has been followed, with a detailed functional description of each block and specific identification of the circuitry it represents. The individual engineer is free to select elements and components such as flip-flop circuits, shift register, etc. from his own background or from available standard references such as Arithmetic Operations in Digital Computers by R. K. Richards (Van Nostrand Publishing Company), Copyright, 1965 Computer Design Fundamentals by Chu (McGraw-Hill Book Company, Inc.), Copyright, 1962 and Pulse, Digital and Switching Waveforms by Millman and Taub (McGraw-Hill Book Company, Inc.) Copyright, 1965.

While in accordance with the provisions and statutes there has been illustrated and described the best form of the invention known, certain changes may be made to the system described without departing from the spirit of the invention as set forth in the appended claims and that in some cases, certain features of the invention may be used to advantage without a corresponding use of other features.

Having described the invention, what is claimed as new and novel and for which it is desired to secure Letters Patent is:

1. A method of transferring messages comprising a plurality of data characters between a remote station and a communications channel under control of an attachable addressable communication control means in response to a request including a coded address designating one of a plurality of device control means transmitted by said channel wherein said remote station includes a plurality of data handling devices coupled through said plurality of addressable device control means to a common bus, device scanning means coupled to said bus, said scanning means being operative to generate a plurality of different address codes corresponding to coded addresses of said addressable device control means and said communication control means and control signals defining address time intervals and data time intervals for signalling the application of address codes and data characters respectively to said bus, and said messages being transferred by said attachable addressable communications control means coupled to said common bus and to said channel, said method comprising the steps of:

receiving said request from said channel;

storing a representation of said request in said communications control means;

monitoring said bus in response to said request for a predetermined one of said address codes corresponding to the coded address of said communications control means generated by said scanning means during one of said address intervals;

activating said communications control means for processing said request in response to detecting said predetermined one of said plurality of different address codes;

generating a first control signal from said communications control means for inhibiting said scanning means from generating said data time interval control signals during subsequent data time intervals; and, transmitting during another address time interval the address code corresponding to one of said addressable device control means of one of said data handling devices stored as part of said request from said communications control means to said bus to initiate a transfer of data characters between said one of said devices and said channel.

2. The method of claim 1 further comprising the steps of generating a second control signal by said communications control means in response to a control signal from said addressed device signaling that it is ready to execute a data transfer operation, and transferring said data characters between said one of said devices and communication control means during said data time intervals in response to said second control signal in accordance with said request under the control of said scanning means.

3. The method of claim 2 further comprising the step of automatically segmenting into blocks data characters transferred between said one of said data handling devices and said communications channel during said data transfer operation when said communication control means has detected that a predetermined number of characters constituting a block have been transmitted in the absence of a transmission of a character having a predetermined bit pattern.

4. A data processing terminal system including a bus, a plurality of data handling devices, a plurality of addressable device control means coupled to said bus, each of said addressable control means being adapted to respond to a respective address code for interconnecting at least one of said devices for a transfer of data characters between said bus and said one device, and device scanning means coupled to said bus for generating different address codes, each of the plurality of said address codes corresponding to a coded address of a different one of said plurality of said addressable control means, and said scanning means including means for generating on said bus control signals defining address and data time intervals for indicating respectively the application of address codes and data characters to said bus, said system further including an addressable communications control means coupled to said bus for interconnecting said system to a communications channel, said scanning means being operative to generate a predetermined address code corresponding to a coded address of said communications control means and said communications control means comprising:

receive control means coupled to said communications channel, said receive control means including means for receiving a request including an address code designating one of said addressable device control means from said channel and means for storing a representation of said request;

bus control means coupled to said receive control means and to said bus, said bus control means including first means conditioned by said stored representation to sample said bus during said address time intervals for said predetermined address code corresponding to said coded address of a said communications control means and in response thereto generate a first signal and second means responsive to said first signal to inhibit said scanning means from applying said data time interval control signals to said bus, and said bus control means further including logic means operative during a subsequent address time interval to supply to said bus the address code corresponding to one of said addressable device control means of a selected one of said devices for initiating a data transfer operation in accordance with said request.

5. The system of claim 4 wherein said device scanning means further includes timing means for generating signals defining alternately occurring ON-LINE and OFF-LINE bus cycle intervals, said bus control means being conditioned to monitor said bus and transfer characters between said bus and said communication control means only during address and data cycles corresponding to ON-LINE bus cycle intervals.

6. The system of claim 4 wherein said communications control means further includes memory means, said memory means including; first and second addressable memory storage means, each of said addressable storage means including a predetermined number of character storage locations, first and second programmable means, each being coupled to said first and second said storage means respectively for detecting when said storage means has been loaded with a predetermined number of characters and memory switching means, said switching means being coupled to said first and second memory storage means and to said bus control means, said memory switching means including means for sensing the availability of each of said memory storage means, said switching means being conditioned by said bus control means and said programmable means to switch memory storage means upon detecting when one of said memories is filled and the other of said memories is available whereby the writing of characters into one of said memory storage means and the reading of characters from the other of said memory storage means proceeds simultaneously.

7. The system of claim 6 wherein each of said programmable means is operative to generate a first control signal indicating said corresponding memory storage means is full when said storage means associated therewith has been loaded with said predetermined number of characters and wherein said bus control means includes decoding means operative to generate a second control signal indicating said storage means is full in response to a character having a predetermined bit pattern being applied to said bus, said switching means being operative in response to said first control signal and in the absence of said second control signal to condition said memory storage means to transmit said characters in blocks each of which include said predetermined number of characters.

8. The system of claim 4 wherein said first means of said communications bus control means includes address decoding means operative to generate said first signal upon decoding said predetermined address code corresponding to an all ZERO coded addresss.

9. A remote data terminal system coupled to a communications line, said system comprising:

a bus;

a plurality of devices;

a plurality of addressable control means, each of said addressable control means being coupled to said bus and to at least one of said devices for transferring characters between said bus and said device;

line control means for transmitting and receiving characters to and from said communication line;

first and second memory means selectively coupled to said bus and to said line control means, each of said memory means including a fixed maximum number of character storage locations, each location consisting of a fixed number of bit positions, each of said memory means further including memory address register means coupled for addressing storage locations in each said memory means and output register means coupled to transmit and receive characters to and from addressed storage locations of said memory means respectively; and, memory switching means coupled to said first and second memory means and to said bus, said memory switching means including means for selectively coupling said output register means of said first and second memory means to transfer characters between said bus and said line control means, said memory switching means further including first sensing means coupled to said memory address register means of said first and second memory means for detecting when any one of said memory means has received and thereafter transmitted a predetermined number of characters and second sensing means for detecting the occurrence of a character having a predetermined bit pattern within the characters being transferred between said line control means and said bus, said memory switching means being operative in the absence of said second sensing means detecting said character to condition one of said memory means to receive up to said fixed maximum number characters from either said line control means or bus, said memory switching means further including logic means coupled to said first and second means and being conditioned by said first and second sensing means to generate a control signal to condition each of said memory means for switching and for transferring the contents of said one memory means alternately to said line control means and said bus in a manner so that transfer of characters between said first and second memory means and said line control means and bus respectively occur simultaneously and wherein said characters are blocked into segments whose length are defined by said predetermined number of characters in the absence of said sensing means detecting said character.

10. The terminal system of claim 9 further including receive control means coupled to said line control means for decoding characters received from said line and said logic means being coupled to be conditioned by said receive control means upon the decoding of an acknowledgment message from said line signaling a previous errorless transmission of data characters to generate said control signal when conditioned by either said first or second sensing means.

11. The terminal of claim 10 wherein said receive control means includes means operative upon decoding a message indicating that the transmission of said data characters as being in error to inhibit the generation of said control signal and to condition a predetermined one of said memory means to retransmit said characters previously transmitted.

12. The terminal system of claim 10 wherein said first sensing means includes programmable means for selecting different values for said predetermined number of characters which correspond to a number less than or equal to said maximum number of characters.

13. The terminal system of claim 12 wherein said programmable means includes jumper means coupled to said address register means of said first and second memory means for establishing a predetermined address and decoder means coupled to said jumper means, said decoder means being operative to generate a control signal for conditioning said logic means upon detecting that said address register means stores said predetermined address corresponding to said predetermined number of characters.

14. A terminal system comprising:

a bus including a plurality of data and control lines;

a plurality of peripheral devices;

a plurality of addressable device control means, each of said control means being coupled to said bus and arranged for interconnecting at least one of said devices to transfer data characters between said device and said bus;

device control scanning means coupled to said bus, said scanning means including addressing means for generating a plurality of different address codes on said bus, a number of said plurality of said address codes representing coded addresses of a particular class of said devices and said scanning means further including control means for generating bistate control signals for application to at least one of said control lines, different states of said control signals defining address and data intervals respectively for signaling when address codes and data characters are to be applied to said bus; and, an addressable communication control means coupled to said bus for interconnecting said bus to a communications channel, said communications means including: address decoding means for decoding a predetermined address code within said plurality of address codes generated by said scanning addressing means; control means coupled for said channel for receiving requests from said channel, said control means including means for storing a representation of said request, said means being coupled to said address decoding means for conditioning said decoding means to activate said communications means for a data transfer operation upon decoding of said predetermined address code; and, logic means coupled to said bus and to said control means for generating control signals for application to said control lines, said logic means being conditioned by said control means upon the activation of said communications means to apply said control signal to at least one of said control lines to selectively disable said device control scanning addressing means from addressing of any one of said addressable control means for activation of a device for a data transfer operation, said means of said control means selectively conditioning said communications control means to operate as either an input device or output device to transfer data characters between said channel and a designated one of said peripheral devices in accordance with said request.

15. The system of claim 14 wherein said particular class of said devices are input devices.

16. The system of claim 14 wherein said predetermined address code corresponding to on all ZERO coded address.

17. The system of claim 14 wherein said device control scanning means further includes address and character response decoding means coupled to said bus, said response decoding means being operative in response to signals representative of device responses signaling acceptance of said address codes and data characters applied to said bus to generate control signals acknowledging receipt of said signals and wherein said logic means of said communication control means includes means operative to selectively apply a control signal to a predetermined one of said control lines for enabling said address and character response decoding means to generate said control signals when said communication control means applies one of said address codes to said bus to activate said designated one of said devices.

18. The system of claim 17 wherein said means of said logic means includes means for selectively switching said predetermined one of said control lines to first and second states to prevent the activation and to enable the activation respectively of said peripheral devices, said first and second states defining said bus as being in a busy and non busy state respectively.

19. The system of claim 17 wherein said device control scanning means includes timing means coupled to said response decoding means for generating signals defining alternately occurring ON-LINE and OFF-LINE bus cycle intervals, said address and character response decoding means being conditioned by said timing signals to decode said responses to said address codes only during said ON-LINE bus cycle intervals.

20. The system of claim 19 wherein said scanning means further includes decoding means coupled to said bus for decoding a character having a predetermined bit pattern and release control means coupled to said decoding means, and to said bus, said decoding means being operative upon decoding said character to selectively condition said release control means to apply signals to said bus to enable said device control scanning means to generate signals on said bus to release said device and reinitiate the generation of said address codes when enabled by said logic means.

21. The system of claim 20 wherein said addressable device control means coupled to each of said input peripheral devices includes release control means coupled to said bus and to said device associated therewith, said release control means being conditioned by an out of media signal from said device indicating that said device has transferred an entire supply of data characters to apply a control signal to said bus, and said decoding means of said scanning means being conditioned by said control signal to reinitiate said generation of said address codes.

* * * * *

UNITED STATES PATENT OFFICE

CERTIFICATE OF CORRECTION

Patent No. 3,771,134 Dated November 6, 1973

Inventor(s) Robert E. Huettner, Edward B. Tymann & Richard Nolin

It is certified that error appears in the above-identified patent and that said Letters Patent are hereby corrected as shown below:

Column 66, line 25, delete "a".

Column 66, line 66, delete "proceeds" and insert --proceed--.

Column 67, line 20, delete "addresss" and insert --address--.

Column 68, line 3, delete "transfer" and insert --transfers--.

Column 68, line 67, delete "for" and insert --to--.

Column 69, line 27, after "to" insert --an--.

Signed and sealed this 8th day of October 1974.

(SEAL)
Attest:

McCOY M. GIBSON JR.
Attesting Officer

C. MARSHALL DANN
Commissioner of Patents